(12) United States Patent
Tokuchi

(10) Patent No.: US 10,347,026 B2
(45) Date of Patent: Jul. 9, 2019

(54) INFORMATION PROCESSING APPARATUS WITH LOCATION BASED DISPLAY

(71) Applicant: FUJI XEROX CO., LTD., Tokyo (JP)

(72) Inventor: Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/699,361

(22) Filed: Sep. 8, 2017

(65) Prior Publication Data

US 2018/0232923 A1 Aug. 16, 2018

(30) Foreign Application Priority Data

Feb. 10, 2017 (JP) ................. 2017-023381

(51) Int. Cl.
- G06K 9/00 (2006.01)
- G06T 11/60 (2006.01)
- G06T 3/40 (2006.01)
- G06T 7/80 (2017.01)
- G06T 3/20 (2006.01)
- B25J 9/16 (2006.01)

(52) U.S. Cl.
CPC ............... *G06T 11/60* (2013.01); *G06T 3/40* (2013.01); *G06T 7/80* (2017.01); *B25J 9/1676* (2013.01); *G05B 2219/32014* (2013.01); *G05B 2219/39082* (2013.01); *G05B 2219/40202* (2013.01); *G05B 2219/40478* (2013.01); *G05B 2219/49137* (2013.01); *G06T 3/20* (2013.01); *G06T 2207/30244* (2013.01)

(58) Field of Classification Search
CPC ...... B25J 13/088; B25J 9/1674; B25J 9/1676; B25J 9/1697; B25J 9/1689; G05B 2219/39082; G05B 2219/40202; G05B 2219/40478; G05B 2219/49137; G06T 7/80; G06T 2207/30244
USPC ......................................... 382/153; 901/1, 47
See application file for complete search history.

(56) References Cited

U.S. PATENT DOCUMENTS

| | | | |
|---|---|---|---|
| 2011/0311127 A1* | 12/2011 | Mizutani | B25J 9/1676 382/153 |
| 2015/0073596 A1* | 3/2015 | Fudaba | B25J 3/04 700/259 |
| 2017/0210017 A1* | 7/2017 | Yamamoto | B25J 19/06 |

FOREIGN PATENT DOCUMENTS

| | | |
|---|---|---|
| JP | 6-149339 A | 5/1994 |
| JP | 2006-142480 A | 6/2006 |
| JP | 2009-123061 A | 6/2009 |

* cited by examiner

*Primary Examiner* — Jin Cheng Wang
(74) *Attorney, Agent, or Firm* — Sughrue Mion, PLLC

(57) ABSTRACT

An information processing apparatus includes a display controller that, when position information on a movable object is changed, changes a display size of an image associated with the movable object and displays the image.

27 Claims, 52 Drawing Sheets

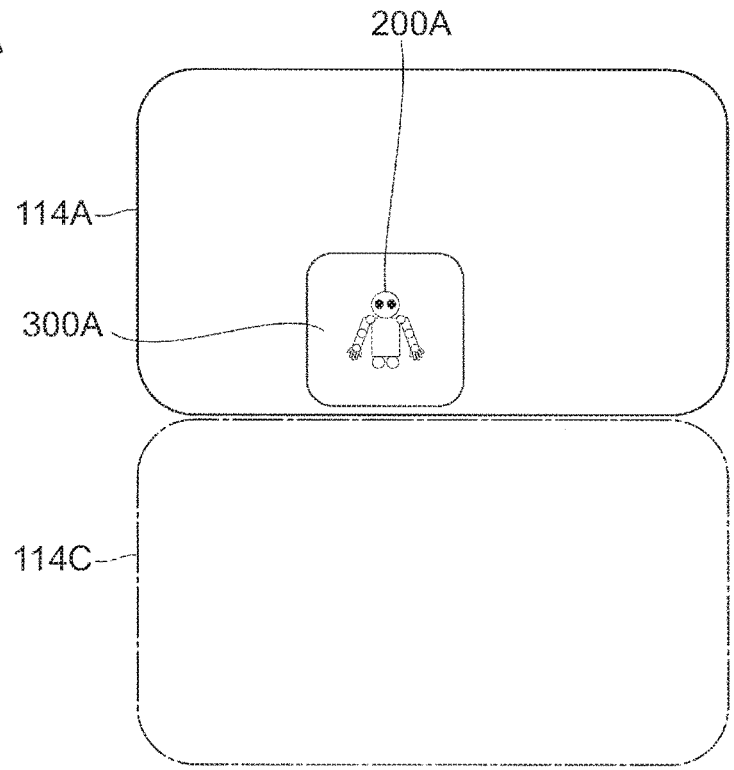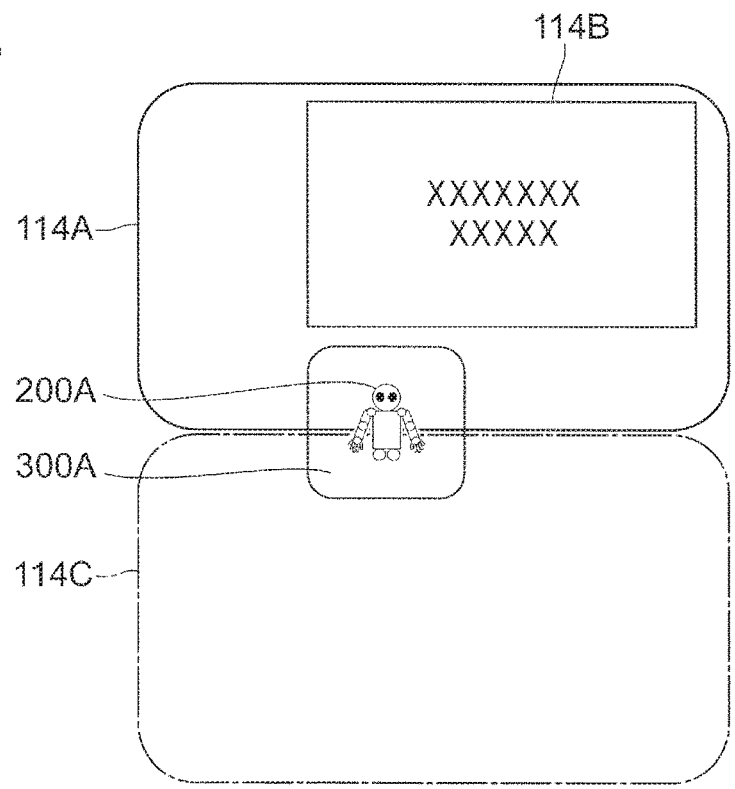

CONTINUOUS CHANGE

STEP-WISE CHANGE IN ACCORDANCE WITH DISTANCE RANGE

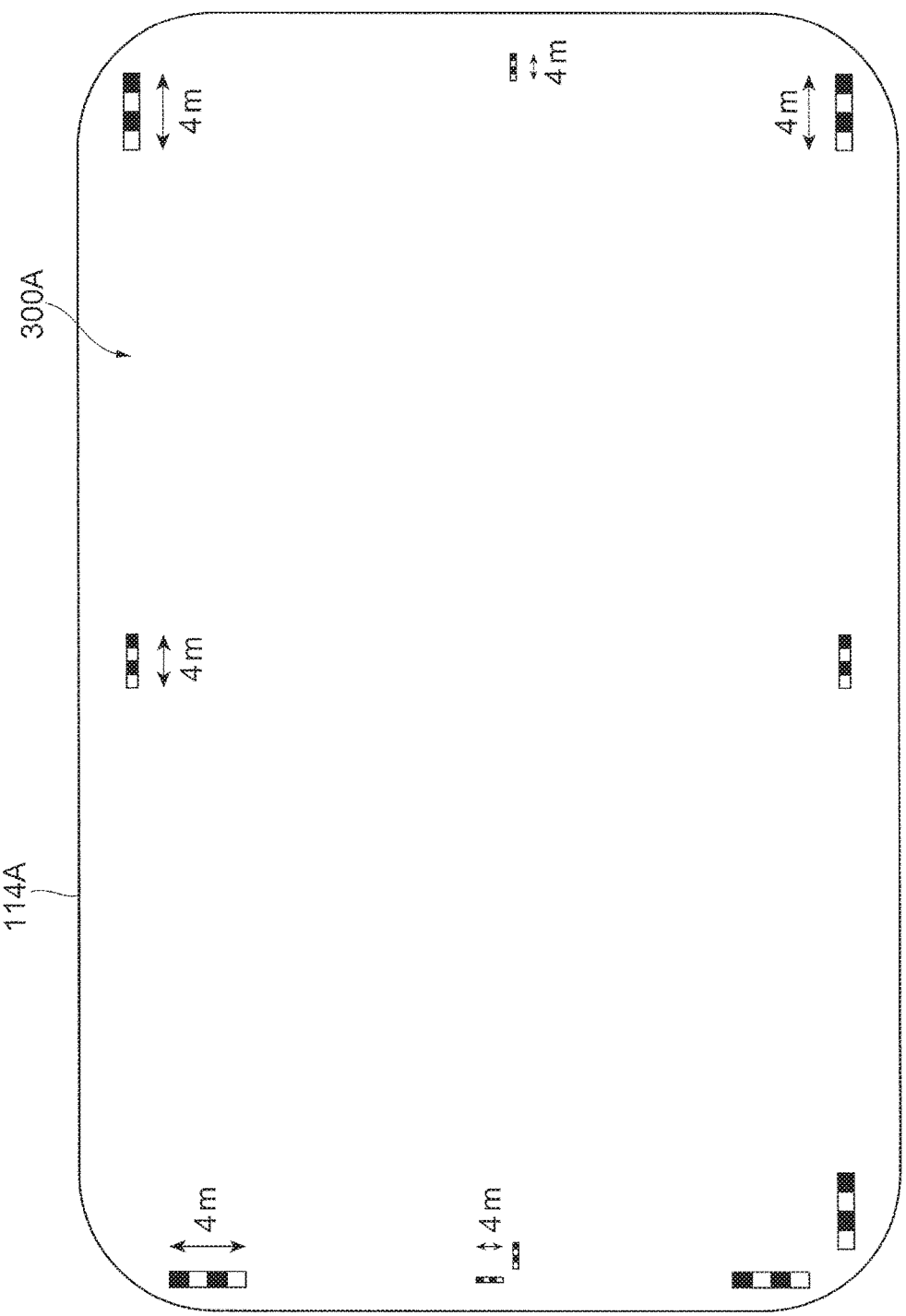

INFORMATION PROCESSING APPARATUS WITH LOCATION BASED DISPLAY

CROSS-REFERENCE TO RELATED APPLICATIONS

This application is based on and claims priority under 35 USC 119 from Japanese Patent Application No. 2017-023381 filed Feb. 10, 2017.

BACKGROUND

Technical Field

The present invention relates to an information processing apparatus, an information processing system, and a storage medium.

SUMMARY

According to an aspect of the invention, there is provided an information processing apparatus including a display controller that, when position information on a movable object is changed, changes a display size of an image associated with the movable object and displays the image.

BRIEF DESCRIPTION OF THE DRAWINGS

An exemplary embodiment of the present invention will be described in detail based on the following figures, wherein:

FIGS. 21A and 21B are illustrations explaining an example of moving the virtual management area to a position bridging the display screen and the virtual management screen when another work screen is displayed on the display screen, FIG. 21A illustrating the display position of the virtual management area before the other work screen is displayed, FIG. 21B illustrating the display position of the virtual management area after the other work screen is displayed;

FIG. 24 illustrates an example in which display scales (scale bars) are displayed at respective portions of the virtual management area;

FIG. 44C illustrating a display example after the display area of the other work screen is changed;

DETAILED DESCRIPTION

An exemplary embodiment of the present invention is described below in detail with reference to the accompanying drawings.

System Configuration Example

Figure 1:
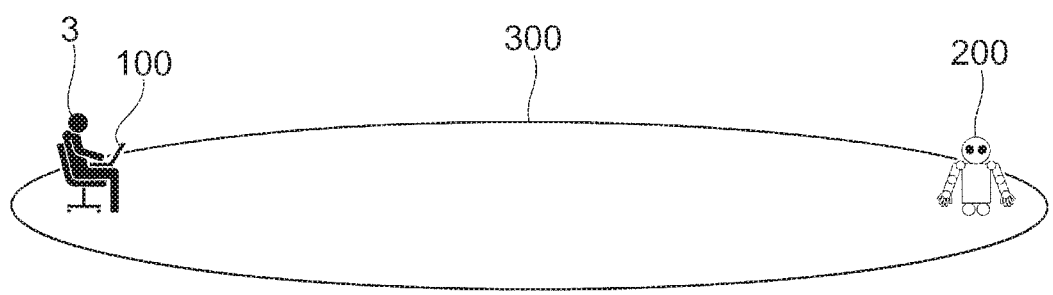
FIG. 1 illustrates a conceptual configuration of an information processing system as an example of an exemplary embodiment.

FIG. 1 illustrates a conceptual configuration of an information processing system 1 as an example of the exemplary embodiment. The information processing system 1 includes an information terminal 100 that is operated by a user 3, and a robot 200 under management of the user 3. The information terminal 100 is an example of an information processing apparatus. The robot 200 is an example of a movable object.

While FIG. 1 illustrates a notebook computer as an example of the information terminal 100, the information terminal 100 may be any type of device as long as the device has a function of displaying position information on the robot 200 in cooperation with a display device mounted on the information terminal 100 or an external display device. For example, the information terminal 100 may be (1) an image displaying apparatus, an image recording apparatus, or an image reproducing apparatus, such as a desktop computer, a tablet computer, a smartwatch, a smartphone, a digital camera, a video camera, or a monitor; or an electronic apparatus such as a game machine, (2) a home electrical appliance, such as a refrigerator, a cooker, or a washing machine, (3) a house facility such as a monitor for a home electrical appliance, (4) a vehicle such as a car, or (5) a machine tool.

In this exemplary embodiment, a "movable object" may be an object the position of which is not fixed in a real space. For example, the movable object includes a portable article, such as a doll like a stuffed animal or a toy, a decoration, a notebook computer, a tablet computer, a smartwatch, a smartphone, a digital camera, a video camera, a voice recorder, and medical equipment; and a transportation apparatus that moves in the real space by a self-propelled mechanism with or without a person aboard, such as a car, a train, a ship, an airplane, and a drone. Also, the movable object includes a vehicle that moves by human power, such as a bicycle or a baby buggy. Movement of the movable object includes movement in plane, in line, in the horizontal direction, in the vertical direction, in an indoor environment, in an outdoor environment, on the ground, under the ground, in the water, in the air, and in the body.

In FIG. 1, the user 3 grasps the location and operating state of the robot 200 in the management area 300 with use of a processing function that is executed by the information terminal 100. The management area 300 is an area that is determined in the real space for managing the location and state of a movable object to be managed. The management area 300 includes a physically determined area (for example, a building, a floor of an office or a shop, a room or a section divided by a wall or a partition), an area physically determined in relation to a reference point, and an area determined by designation of the user. The reference point may be an object that may be physically specified, such as a structure, an article, a person, an animal, or a plant. The relationship to the reference point includes a section including the reference point, a room including the reference point, a floor including the reference point, a building including the reference point, a region including the reference point, and the distance from the reference point.

Figure 2:
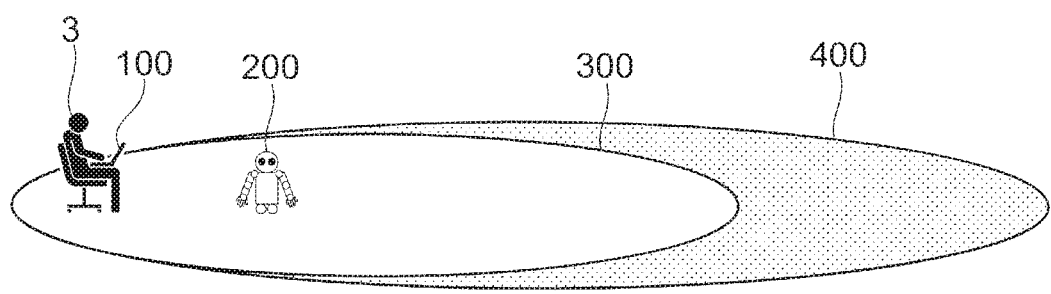
FIG. 2 illustrates an example of determining a management area to include a user.
Figure 3:
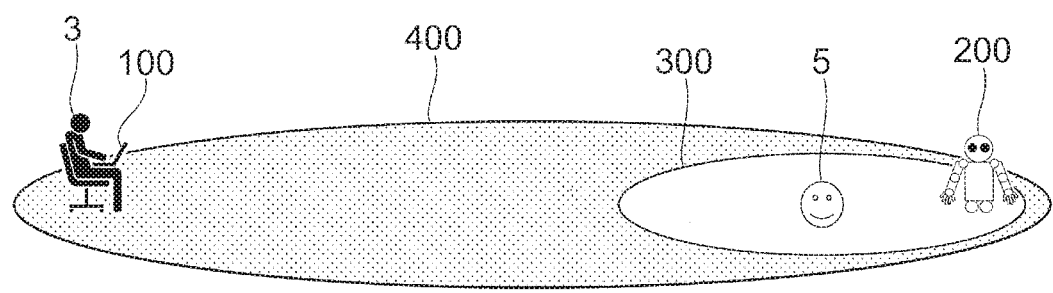
FIG. 3 illustrates an example of determining a certain distance or a certain range from a reference point, as the management area.

FIGS. 2 and 3 illustrate an example in which a portion of a real space 400 that gives the maximum movable range of the movable object is set as the management area 300. FIG. 2 illustrates an example of determining the management area 300 to include the user 3. FIG. 3 illustrates an example of determining a certain distance or a certain range from a reference point 5, as the management area 300. FIG. 3 illustrates an example of the management area 300 in which a child or a pet to be protected, or a precious metal or the like to be guarded against thieves is designated as the reference point 5. The reference point 5 is not limited to a fixed point, and may be a moving point. If the reference point 5 is a moving point, the range of the management area 300 moves along with the movement of the reference point 5.

Figure 4:
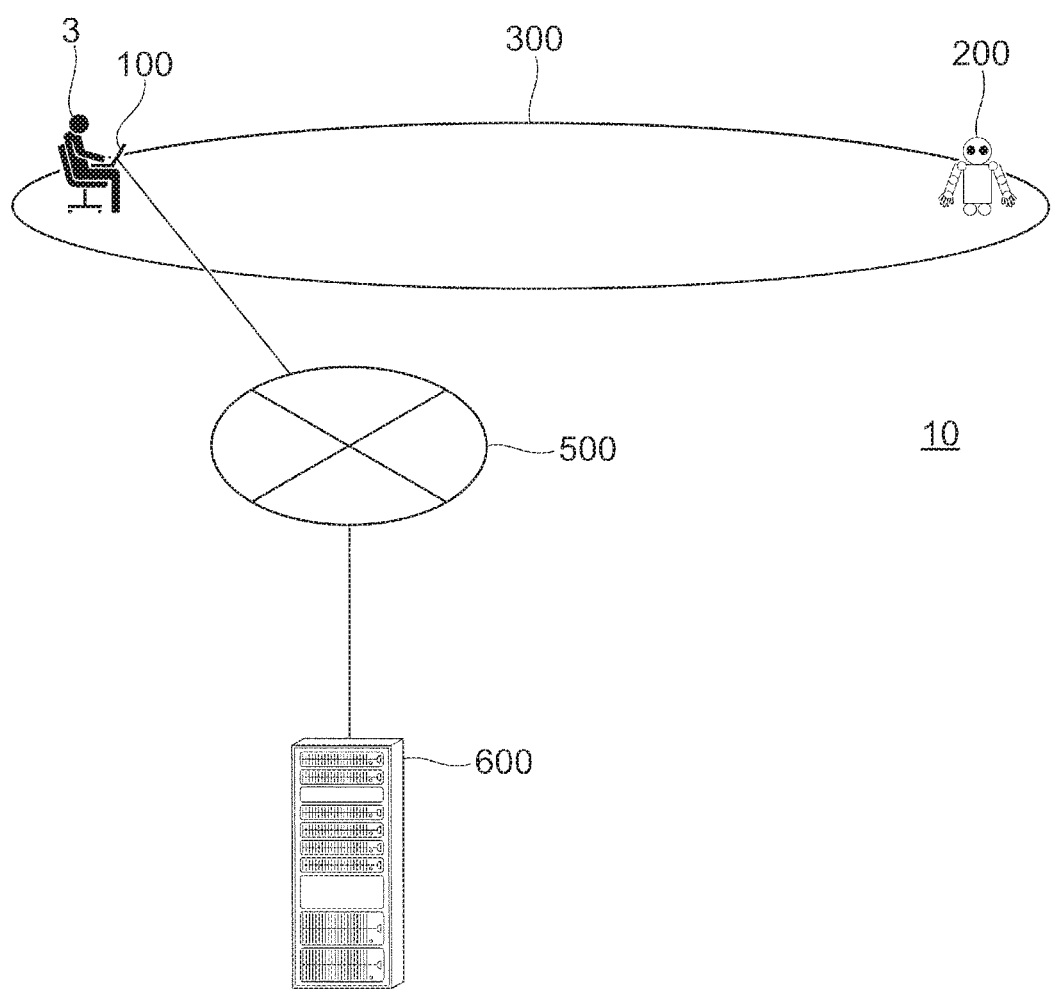
FIG. 4 illustrates a conceptual configuration of an information processing system as another example of the exemplary embodiment.

FIG. 4 illustrates a conceptual configuration of an information processing system 10 as another example of the exemplary embodiment. In FIG. 4, the same reference sign is applied to a portion corresponding to a portion in FIG. 1. In the information processing system 10, an information terminal 100 is connected to a server 600 through a network 500. This point is the difference between the information processing system 10 and the information processing system 1 (see FIG. 1). In the information processing system 10, the location and operating state of the robot 200 are provided to the information terminal 100 through the processing function that is executed by the server 600. Hence, the information terminal 100 in FIG. 4 is used as an input/output device. The processing function (described later) is executed by the server 600. In terms of this, the server 600 is an example of an information processing apparatus.

Robot Configuration
External Configuration

Figure 5:
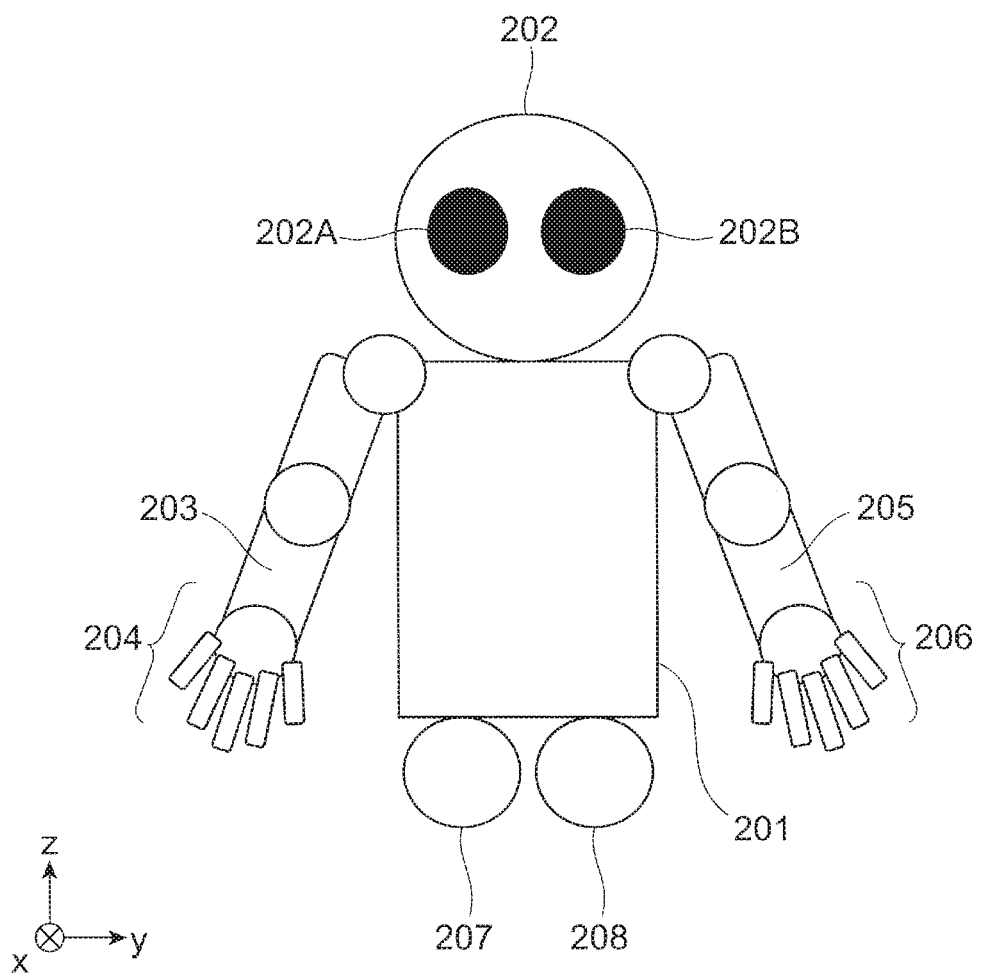
FIG. 5 is an illustration explaining an external configuration of a robot to be used in this exemplary embodiment.

FIG. 5 is an illustration explaining an external configuration of the robot 200 to be used in this exemplary embodiment. The robot 200 is a form of a doll or a toy. The external configuration of the robot 200 is not limited to a human-shaped robot illustrated in FIG. 5, and may be a robot expressing an animal, such as a dog or a cat; a plant, such as a flower or a tree; or a conveyance, such as a car (including a train) or an airplane, as a theme. The conveyance according to this exemplary embodiment includes one with a person aboard and one without a person aboard.

The human-shaped robot 200 illustrated as an example in FIG. 5 includes a body 201, a head 202, arms 203 and 205, hands 204 and 206, and legs 207 and 208. The body 201 according to this exemplary embodiment stores an electronic component for signal processing. The body 201 may have a display device and/or audio equipment mounted thereon. If the robot 200 is a simple doll, the body 201 is filled with padding.

The head 202 according to this exemplary embodiment is coupled to the body 201 via a joint mechanism provided at a neck portion. In this exemplary embodiment, the joint mechanism is rotatable around three axes. The rotation around three axes includes yaw (rotation around z-axis), roll (rotation around x-axis), and pitch (rotation around y-axis). The joint mechanism does not have to be rotatable around all the three axes, and may be rotatable only around one axis or two axes. The rotation may be provided manually, or may be provided by rotational driving with a motor (not shown). Alternatively, the head 202 may be fixed to the body 201. The head 202 has eyes 202A and 202B. The eyes 202A and 202B may be arranged for decoration, or each may include therein, for example, an imaging device, a projector, and/or a lamp. The head 202 may also have movable ears.

The arms 203 and 205 according to this exemplary embodiment are coupled to the body 201 via joint mechanisms. Upper and front arms of the arms 203 and 205 are coupled to one another via joint mechanisms. In this exemplary embodiment, each of the joint mechanisms may be rotated around multiple axes or a single axis similarly to the head 202. The rotation around the axis/axes may be provided manually or may be provided by rotational driving with a motor (not shown). Alternatively, the arms 203 and 205 may be fixed to the body 201. If the arms 203 and 205 are bent at a predetermined angle, the arms 203 and 205 may be used for carrying an object.

The hands 204 and 206 are coupled to the arms 203 and 205 via joint mechanisms provided at wrist portions. Palms and fingers of the hands 204 and 206 are coupled via joint mechanisms. In this exemplary embodiment, each of the joint mechanisms may be rotated around multiple axes or a single axis similarly to the head 202. The rotation around the axis/axes may be provided manually or may be provided by rotational driving with a motor (not shown). In this exemplary embodiment, the hands 204 and 206 may grab an object by opening and closing the fingers. Alternatively, the hands 204 and 206 may be fixed to the arms 203 and 205.

The legs 207 and 208 may be coupled to the body 201 via joint mechanisms, or may be attached to the body 201 while serving as self-propelled mechanisms, such as wheels or crawlers. If the legs 207 and 208 are coupled to the body 201 via the joint mechanisms, the joint mechanisms may be rotated around multiple axes or a single axis similarly to the head 202. The rotation around the axis/axes may be provided manually or may be provided by rotational driving with a motor (not shown). Alternatively, the legs 207 and 208 may be fixed to the body 201.

Hardware Configuration

Figure 6:
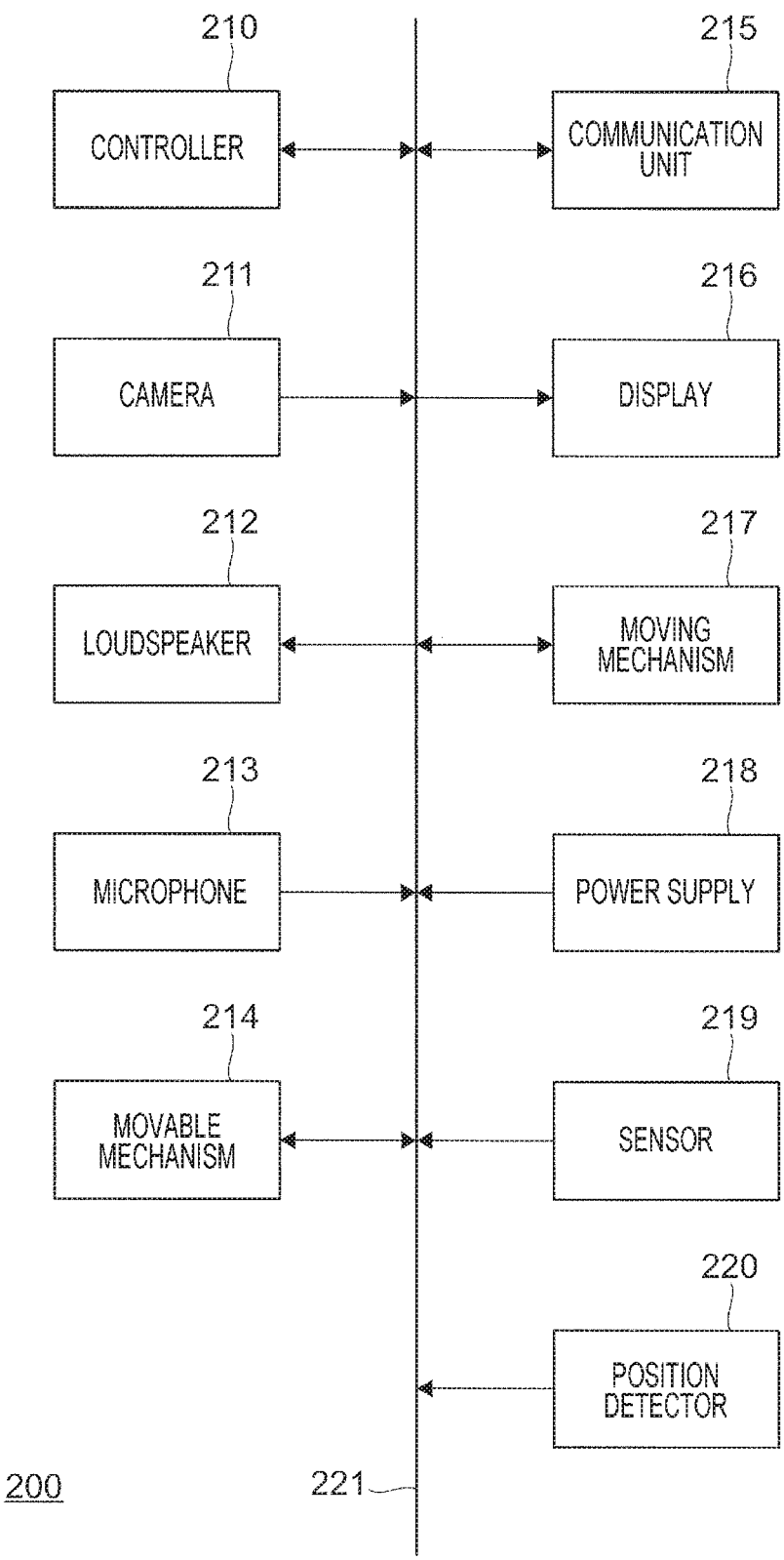
FIG. 6 is an illustration explaining a hardware configuration of the robot according to this exemplary embodiment.

FIG. 6 is an illustration explaining a hardware configuration of the robot 200 according to this exemplary embodiment. The robot 200 includes a controller 210 that controls the movement of the entire apparatus, a camera 211 that captures a still image or a movie, a loudspeaker 212 that reproduces conversation voices, songs, or effect sounds, a microphone 213 used for input or acquisition of a sound, a movable mechanism 214 such as the joint mechanisms, a communication unit 215 used for communication with an external apparatus, a display 216 that displays an image, a moving mechanism 217 that moves the entire apparatus, a power supply 218 that supplies electric power to respective units, a sensor 219 used for collecting the states of the respective units and peripheral information, and a position detector 220 used for acquiring position information. The respective units are connected to one another, for example, by a bus 221.

The hardware configuration illustrated in FIG. 6 is merely an example. The robot 200 does not have to have all the above-described members mounted thereon. The robot 200 may additionally have a member (not shown) mounted thereon. For example, the robot 200 may have a power button, a memory (hard disk device, semiconductor memory, etc.), and/or a heat source (including cooling source) mounted thereon.

The controller 210 is a computer, and includes a central processing unit (CPU), a read only memory (ROM), and a random access memory (RAM). The ROM stores a program that is executed by the CPU. The CPU reads out the program stored in the ROM, and executes the program while using the RAM as a work area. The CPU controls the operations of the respective units forming the robot 200 through the execution of the program.

The controller 210 has a function of processing information acquired through, for example, the camera 211, the microphone 213, and the sensor 219, according to the program. The information in this case includes, for example, a sense of vision, a sense of hearing, a sense of touch, a sense of taste, a sense of smell, a sense of equilibrium, and a temperature. The sense of vision is provided by processing of recognizing an image captured by the camera 211. The sense of hearing is provided by processing of recognizing a sound acquired by the microphone 213. The sense of touch includes, for example, senses of superficial part (sense of touch, sense of pain, sense of temperature), senses of deep part (sense of pressure, sense of position, sense of vibration, etc.), and senses of cortex (sense of two-point discrimination, ability of stereoscopic discrimination, etc.). The controller 210 may discriminate the senses of touch. The sense of touch, sense of taste, sense of smell, sense of equilibrium, and temperature may be provided by detecting information with various sensors 219. The temperature includes an ambient temperature, an internal temperature, and a body temperature of a human or an animal. Further, the information to be acquired by the controller 210 may include brain waves of a human or an animal. In this case, for the brain waves, information output from a brain wave detecting device attached to a human etc. may be received by the communication unit 215.

The controller 210 has functions of recognizing acquired information and processing the information. The functions are provided by the stored program or a program that is executed by an external computer connected through the communication unit 215. The recognition processing may employ machine learning on the basis of artificial intelligence. By employing that technology, determination results close to those of humans may be obtained. Recently, neural-network deep learning is being developed. The accuracy of recognition is also increased by reinforcement learning, in which a partial learning field is enhanced. The controller 210 may further have a function of collecting information through retrieval from the Internet and communication with an external computer and finding a solution according to the similarity to the retrieved phenomenon if an uncertain situation occurs.

The controller 210 executes various operations on the basis of the recognition results and processing results. For example, the controller 210 may use the loudspeaker 212 to output a voice, may use the communication unit 215 to transmit a message, or may use the display 216 to output an image. The controller 210 may establish communication with the user by using the input/output of these pieces of information and the movement of the movable mechanism 214. Application examples of communication include, for example, service to a customer and progress of a meeting. Also, the controller 210 may have a function of recording the communication and a function of creating the minutes.

If an external apparatus not able to establish communication is present, the controller 210 may specify a controller prepared for remote control on the external apparatus by using image recognition (for example, recognition of the shape or characters written on the remote controller), and may transmit an instruction to the external apparatus through an operation on the specified controller.

In this exemplary embodiment, the camera 211 is disposed at one or both of the positions of the eyes 202A and 202B (see FIG. 5). If a projector is used as the display 216, the projector may be disposed, for example, in one or both of the eyes 202A and 202B (see FIG. 5). Alternatively, the projector may be disposed in the body 201 or the head 202.

The movable mechanism 214 is also used for the purpose of expressing emotion, in addition to transport of an object. If the movable mechanism 214 is used for transport of an object, the movable mechanism 214 provides, for example, a motion of grabbing, holding, or supporting the object through deformation of the arms 203 and 205 and the hands 204 and 206. If the movable mechanism 214 is used for expressing emotion, the movable mechanism 214 executes a motion of inclining the head, looking up, looking around (moving eyes), raising the hands, or pointing out a finger through driving of the head 202, the arms 203 and 205, etc. (see FIG. 5).

The communication unit 215 according to this exemplary embodiment communicates with the outside by a wireless system. The robot 200 has mounted thereon communication units 215 by a number corresponding to the number of communication schemes used by external apparatuses expected as communication targets. The communication schemes may include, for example, infrared communication, visible-light communication, near field radio communication, Wi-Fi (registered trademark), Bluetooth (registered trademark), RFID (registered trademark), ZigBee (registered trademark), IEEE802.11a (registered trademark), MulteFire, and Low Power Wide Area (LPWA). The band used for radio communication includes a short wavelength band (for example, 800 MHz to 920 MHz), a long wavelength band (for example, 2.4 GHz, 5 GHz), and other bands. A communication cable may be used for connection between the communication units 215 and the external apparatuses.

As an application example of such a communication function, the robot 200 may have a settlement function using virtual currency. The settlement function may be previous-payment system that allows settlement within a range of previously deposited money amount, credit card settlement system of post-payment, or debit-card settlement system for payment from a designated account. The currency may be virtual currency such as Bitcoin (registered trademark). The body 201 of the robot 200 may have a space for storing cash, and may have a function of outputting a required amount of money for settlement according to its necessity, a function of opening and closing a panel to allow a person to take out the stored cash, and/or other functions. There may be also a function of borrowing cash from a person in cooperation with the loudspeaker 212.

The display 216 is used for providing visual communication with the user. In this exemplary embodiment, the display 216 displays characters and figures. If the display 216 is disposed at the head 202, the display 216 may display a facial expression.

While the moving mechanism 217 uses wheels and crawlers in this exemplary embodiment, the robot 200 may be moved by the force of the air using a propeller or a blowing function with compressed air. While the power supply 218 uses a secondary battery in this exemplary embodiment, the power supply 218 may use any of a primary battery, a fuel cell, and a solar cell as long as the battery may generate electric power. Alternatively, instead of the power supply 218, a configuration of receiving power supply from the outside through a power supply cable may be employed.

In this exemplary embodiment, the robot 200 includes the position detector 220. The position detector 220 uses, for example, a method of reading point information from a global positioning system (GPS) signal; a method of indoor messaging system (IMES) that determines the indoor position by using a signal equivalent to the signal of GPS; a Wi-Fi position determining method of determining the position using the intensities, arrival times, etc., of radio waves transmitted from plural Wi-Fi access points; a base-station position determining method of determining the position using the direction and delay time of a response to a signal periodically generated from a base station; a sound-wave position determining method of determining the position by receiving an ultrasonic wave in an inaudible range; a Bluetooth position determining method of determining the position by receiving a radio wave from a beacon using Bluetooth; a visible-light position determining method of determining the position by using position information transmitted according to blinking of illumination light of, for example, a light emitting diode (LED); or an autonomous navigation method of determining the current position by using an acceleration sensor, a gyro sensor, or another sensor.

Figure 7:
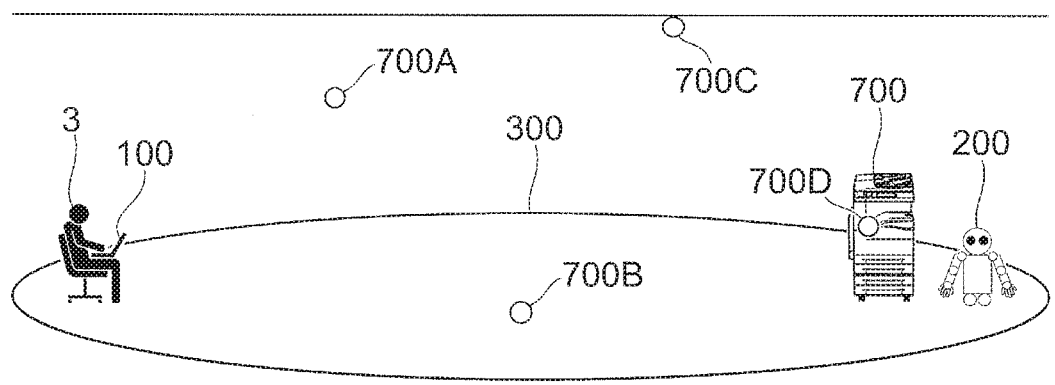
FIG. 7 is an illustration explaining a position determining method using a beacon.

FIG. 7 is an illustration explaining a position determining method using a beacon. In FIG. 7, an oscillator 700A is disposed on a wall, an oscillator 700B is disposed on a floor, an oscillator 700C is disposed on a ceiling, and an oscillator 700D is disposed in an image forming apparatus 700. Each of the oscillators 700A to 700D emits a beacon that is modulated in accordance with specific position information. The position detecting technology may use indoor technology and outdoor technology. If the robot 200 is used in both indoor and outdoor environments, the robot 200 may have two types of position detectors 220 for indoor use and outdoor use. The detected or estimated position information is informed to the information terminal 100 or the server 600 via the communication unit 215.

Figure 8:
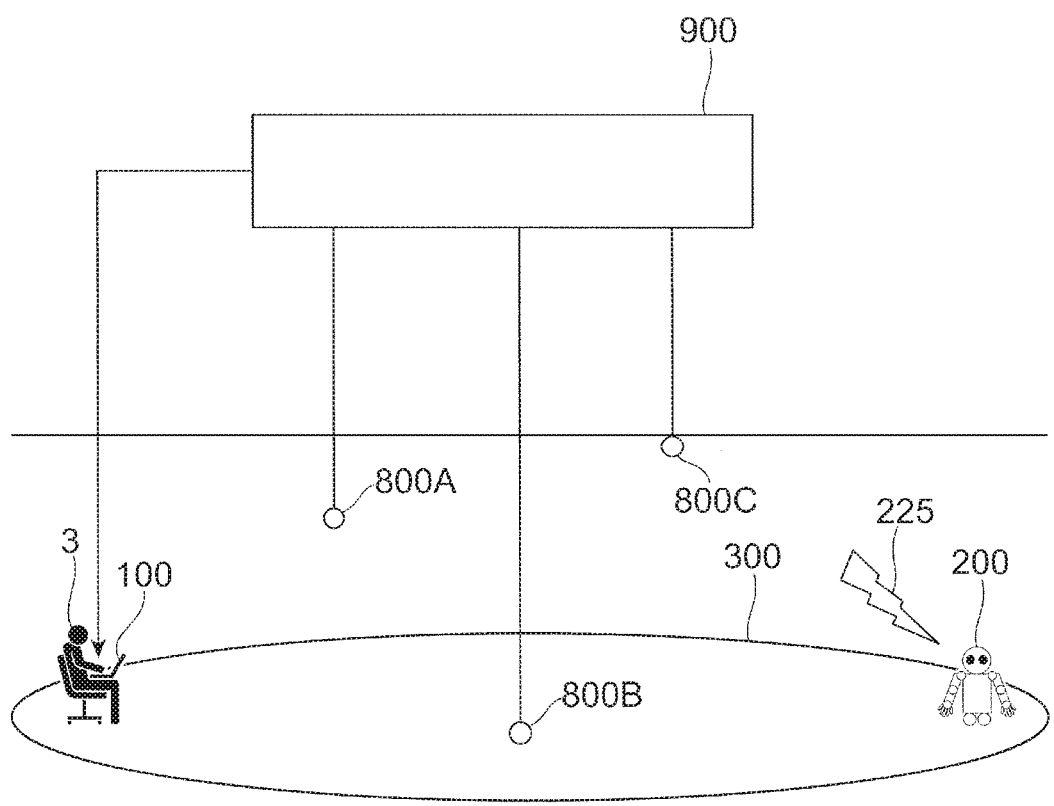
FIG. 8 is an illustration explaining a method of determining the position of the robot using a communication radio wave transmitted from the robot.

While the robot 200 has the position detector 220 mounted thereon in this exemplary embodiment, if the position detector 220 is not mounted, the position information on the robot 200 may be acquired or estimated through an external facility. FIG. 8 is an illustration explaining a method of determining the position of the robot 200 using a communication radio wave transmitted from the robot 200. Radio waves 225 transmitted from the robot 200 are received by access points 800A, 800B, and 800C whose positions are known. A position determining unit 900 determines the position of the robot 200 by using the intensities and delay times of the radio waves 225 received by the access points 800A, 800B, and 800C. The measured position information is informed from the position determining unit 900 to the information terminal 100 or the server 600. Alternatively, the information terminal 100 or the server 600 may execute the function as the position determining unit 900.

Otherwise, position information on a reading device (reader) having near field radio communication established with the robot 200 may be used as the position of the robot 200. If an image captured by a monitoring camera or the like disposed in indoor or outdoor environment includes an image of the robot 200, the position of the monitoring camera capturing the robot 200 may be used as the position of the robot 200. To detect the robot 200, image recognition technology is used. The method of using the monitoring camera in this case may be applied to a case where the robot 200 is a doll without an electronic component.

Configurations of Information Terminal and Server

Configurations of the information terminal 100 and the server 600 are described below. The configuration of the information terminal 100 is described now.

Hardware Configuration

Figure 9:
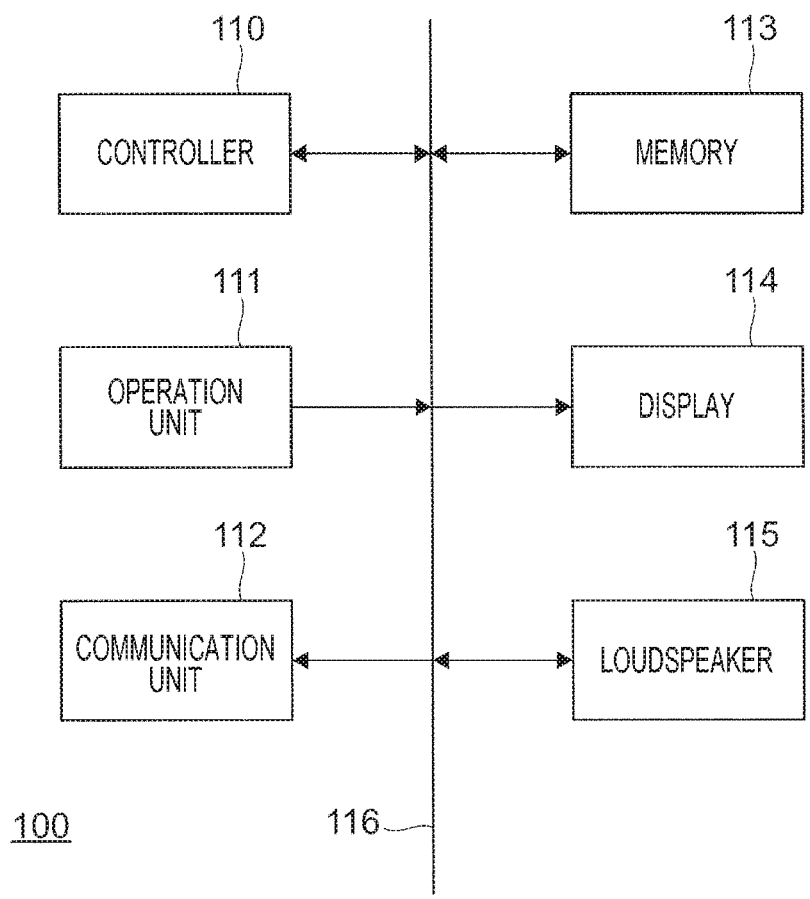
FIG. 9 is an illustration explaining a hardware configuration of an information terminal according to this exemplary embodiment.

FIG. 9 is an illustration explaining a hardware configuration of the information terminal 100 according to this exemplary embodiment. The information terminal 100 includes a controller 110 that controls the movement of the entire apparatus, an operation unit 111 that receives an operation input from the user, a communication unit 112 used for communication with an external apparatus, a memory 113 used for storing various data, a display 114 that displays a work screen corresponding to any of various applications, and a loudspeaker 115 that outputs voices, songs, and effect sounds. The respective units are connected to one another through, for example, a bus 116.

The hardware configuration illustrated in FIG. 9 is merely an example. The information terminal 100 does not have to have all the above-described members mounted thereon. Also, the information terminal 100 may have an additional member (not shown) mounted thereon. The server 600 is only required to have the controller 110, the communication unit 112, and the memory 113 mounted thereon.

The controller 110 is a computer, and includes a central processing unit (CPU), a read only memory (ROM), and a random access memory (RAM). The ROM stores a program that is executed by the CPU. The CPU reads out the program stored in the ROM, and executes the program while using the RAM as a work area. The CPU controls the operations of the respective units forming the information terminal 100 through the execution of the program. The controller 110 according to this exemplary embodiment is an example of a display controller. A function as the display controller will be described later.

The operation unit 111 uses a mouse, a keyboard, a touch panel, etc. The touch panel is disposed on a front surface of the display 114. The communication unit 112 is a device for communicating with an external apparatus by a wire system or a wireless system. The communication unit 112 according to this exemplary embodiment communicates with the external apparatus by a wireless system. An example of the external apparatus is the robot 200. The memory 113 is a hard disk device or another memory with a large capacity. The program that is executed by the CPU may be stored in the memory 113.

The display 114 uses, for example, a liquid crystal display panel or an organic electroluminescence (EL) display panel. Alternatively, the display 114 may be a monitor externally attached to the information terminal 100.

Software Configuration

Figure 10:
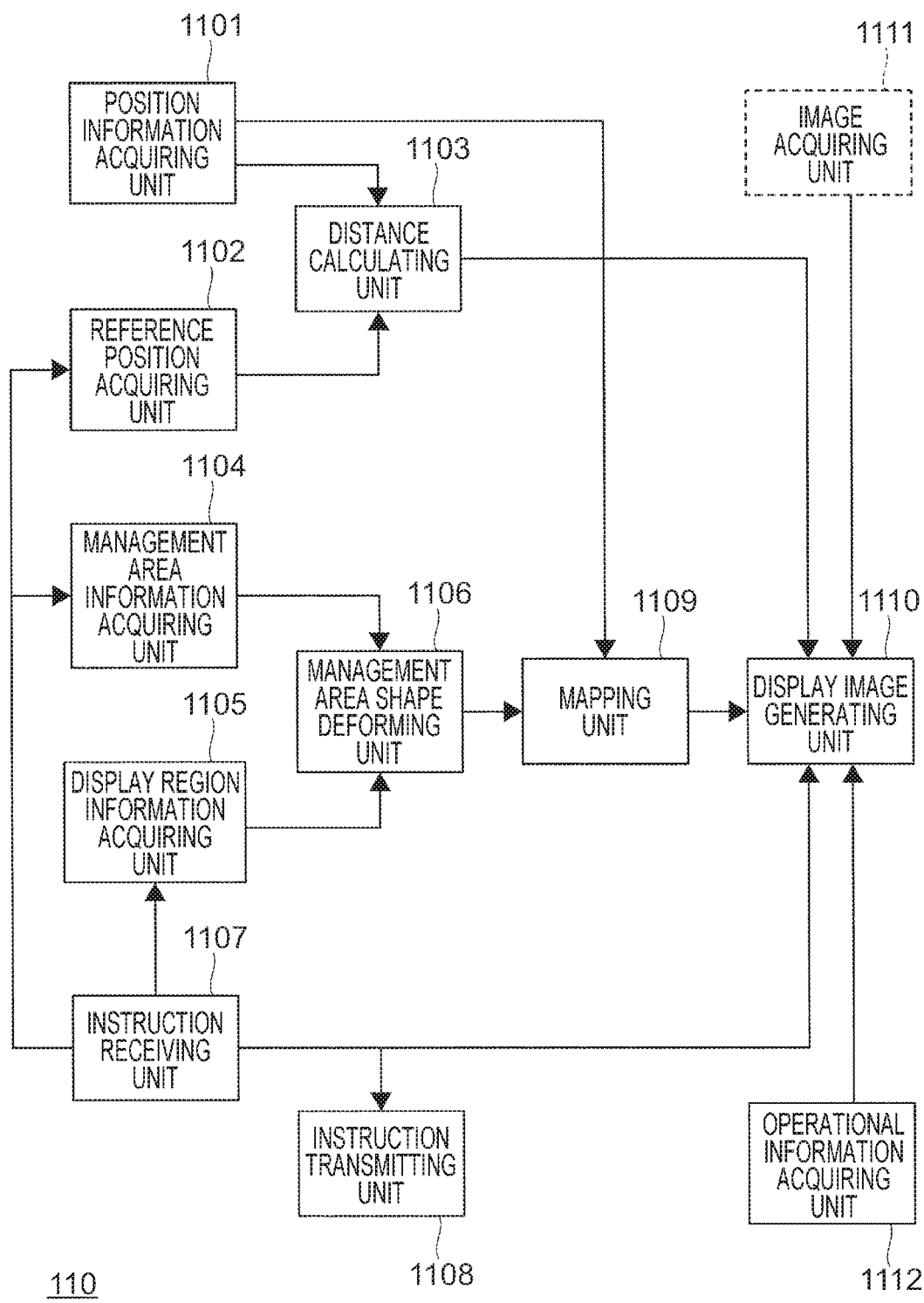
FIG. 10 is an illustration explaining a software configuration of the information terminal according to this exemplary embodiment.

FIG. 10 is an illustration explaining a software configuration of the information terminal 100 according to this exemplary embodiment. The software configuration illustrated in FIG. 10 is provided by the controller 110 executing the program.

The controller 110 includes a position information acquiring unit 1101 that acquires position information on the robot 200 in the real space 400 (see FIGS. 2 and 3), a reference position acquiring unit 1102 that acquires a reference position used for position management of the robot 200, and a distance calculating unit 1103 that calculates the distance of the robot 200 from the reference position.

The position information acquiring unit 1101 may acquire position information on the robot 200 through the communication unit 112 (see FIG. 9), or may calculate position information on the robot 200 on the basis of reception intensity, delay time, etc., at a radio base station. The reference position acquiring unit 1102 acquires which one of the position of the user who operates the information terminal 100, the center position of the management area 300, and the reference point 5 (see FIG. 3) designated by the user serves as the reference position. Information on the reference position is given from an instruction receiving unit 1107.

Figure 11:
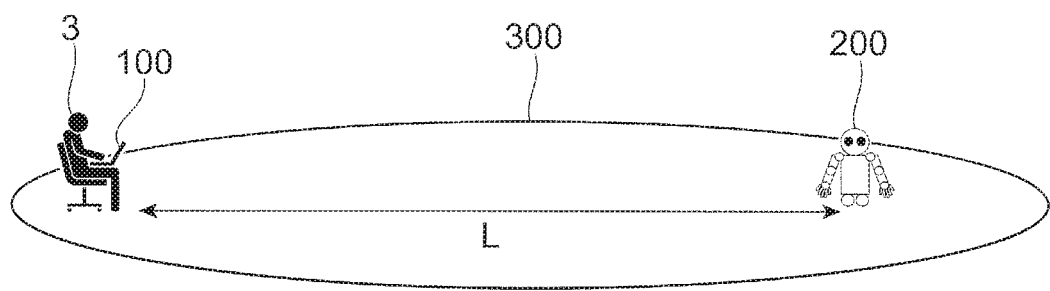
FIG. 11 is an illustration explaining the distance between the user and the robot.
Figure 12:
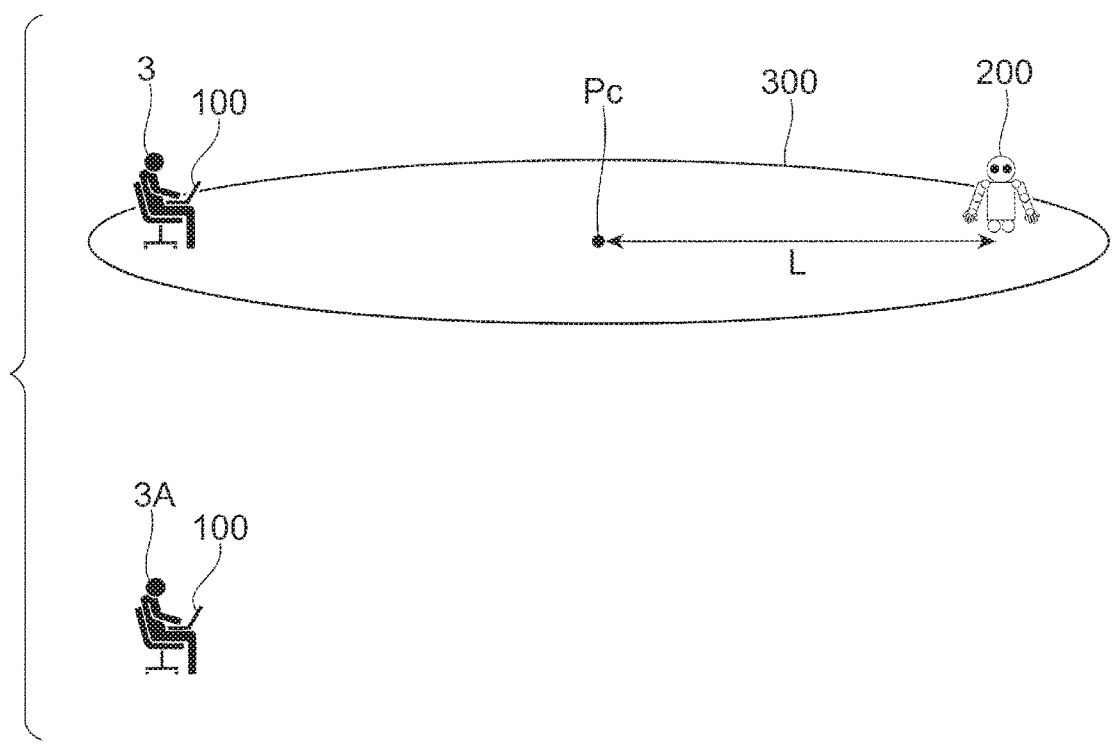
FIG. 12 is an illustration explaining the distance between the center position of the management area and the robot.
Figure 13:
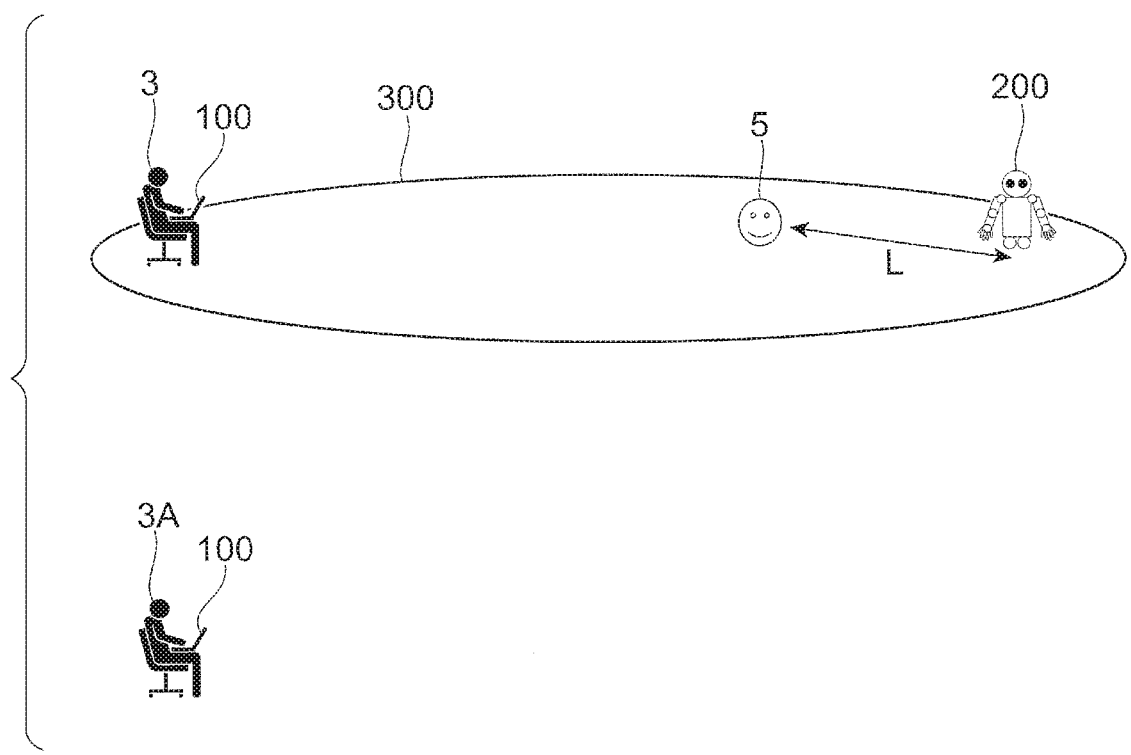
FIG. 13 is an illustration explaining the distance between the reference point of, for example, a child or a pet, and the robot.

The distance calculating unit 1103 calculates a distance L between the reference position and the robot 200. Examples of the distance L are illustrated in FIGS. 11 to 13. FIG. 11 is an illustration explaining a distance L between the user 3 and the robot 200. In this case, the user 3 and the robot 200 are located in the management area 300. FIG. 12 is an illustration explaining a distance L between a center position Pc of the management area 300 and the robot 200. In this case, the user 3 may be located in the management area 300 or may be located outside the management area 300 like a user 3A. FIG. 13 is an illustration explaining a distance L between the reference point 5, such as a child or a pet, and the robot 200. In this case, the user 3 may be located in the management area 300 or may be located outside the management area 300 like the user 3A.

Referring back to the description on FIG. 10, the controller 110 includes a management area information acquiring unit 1104 that acquires position information on the management area 300 (see FIGS. 1 to 4) that determines a management range of the robot 200, a display region information acquiring unit 1105 that acquires information on a display region to be used for displaying the management area 300 on the screen of the display 114 (see FIG. 9), and a management area shape deforming unit 1106 that deforms the shape of the management area 300 disposed on the screen in accordance with the shape of the acquired display region.

The management area information acquiring unit 1104 acquires, for example, layout information on the management area 300 designated by the user, from a database or the like (not illustrated). The database may be stored in the memory 113 (see FIG. 9) or may be stored in an external memory connected through the communication unit 112 (see FIG. 9). The management area information acquiring unit 1104 according to this exemplary embodiment also acquires layout information, information on equipment disposed or present in the real space, and information on a landmark or the like necessary for grasping the position, as information on the management area 300.

The management area information acquiring unit 1104 according to this exemplary embodiment outputs at least the layout information included in the acquired information on the management area 300 to the management area shape deforming unit 1106. Alternatively, the management area information acquiring unit 1104 may output other information in addition to the layout to the management area shape deforming unit 1106. The layout information is not limited to precise and accurate information at a level of design or map, and may be brief information expressing a rough shape.

The layout information may include information useful for grasping the region in the management area 300, for example, the name of department or team, the name of shop, etc. The equipment or landmark may be expressed by a symbol or mark indicative of a conceptual image on a display screen 114A. It is desirable not to excessively increase the amount of information to be displayed to grasp the positional relationship. To grasp the positional relationship, it is enough to understand the rough layout and the positional relationship in the layout. Hence, information to be actually displayed included in the information on the equipment or landmark may be selected by a display image generating unit 1110. Information relating to setting or selection of the management area 300 is given from the instruction receiving unit 1107.

The display region information acquiring unit 1105 acquires information on the display region that is able to be used for displaying the management area 300. The display region information acquiring unit 1105 acquires physical information on the display screen 114A (for example, 7-inch display, resolution, etc.), and also acquires information relating to the size and arrangement position of another work screen received through the instruction receiving unit 1107. When the other work screen is not displayed on the display screen 114A, the entire screen of the display 114 (display screen 114A) may be used for displaying the management area on display (hereinafter, referred to as "virtual management area"). The user may set or adjust the maximum range that is able to be used for displaying the virtual management area. If the other work screen is displayed on the display screen 114A, a portion of the display screen 114A without the other work screen is used for displaying the virtual management area 300A.

Figure 14A:
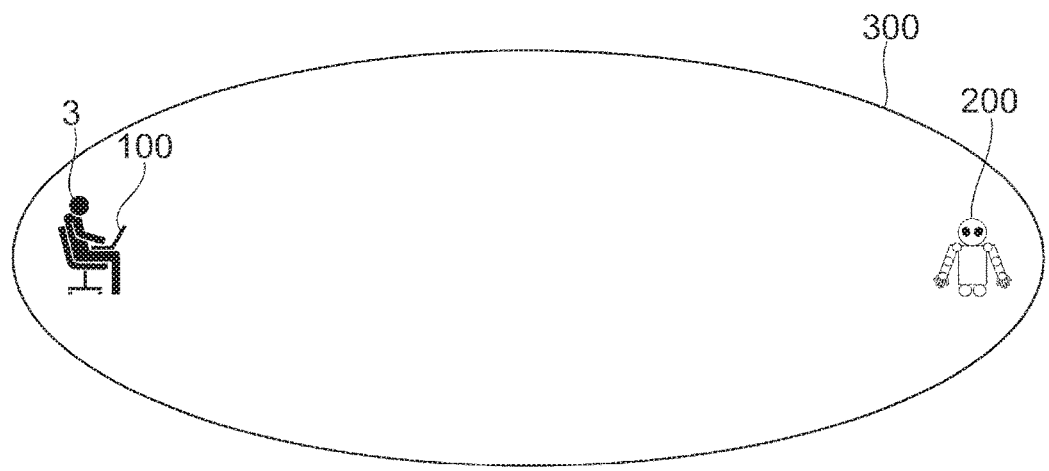
FIGS. 14A and 14B are illustrations explaining deformation processing when the management area in a real space has an ellipsoidal shape and a display screen of a display has a substantially quadrangular shape, FIG. 14A illustrating the shape of the management area in the real space, FIG. 14B illustrating the direction and magnitude of deformation on a partial region basis to be applied to a virtual management area on display.

The management area shape deforming unit 1106 deforms the layout information on the management area 300 into, for example, ones illustrated in FIGS. 14A to 17B. FIGS. 14A and 14B are illustrations explaining deformation processing when the management area 300 in the real space has an ellipsoidal shape and the display screen 114A of the display 114 has a substantially quadrangular shape, FIG. 14A illustrating the shape of the management area 300 in the real space, FIG. 14B illustrating the direction and magnitude of deformation on a partial region basis to be applied to the virtual management area 300A. The direction and length of an arrow represent the direction and amount of deformation.

Figure 14B:
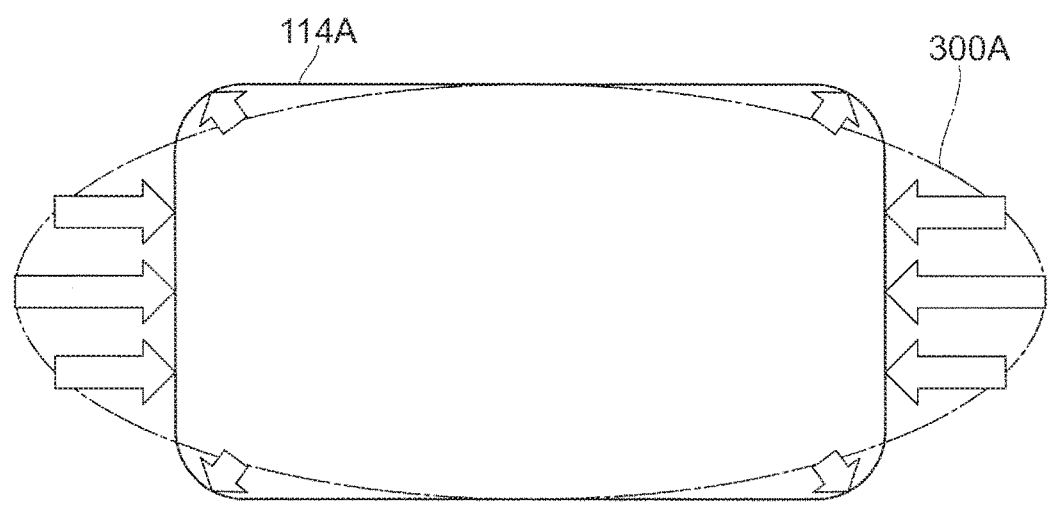

In the case of FIGS. 14A and 14B, the management area shape deforming unit 1106 non-linearly deforms the entire virtual management area 300A given from the management area information acquiring unit 1104 so that the virtual management area 300A after deformation is aligned with the shape of the display screen 114A (for example, 5-inch display). The virtual management area 300A after deformation is an example of a display region to be used for a position indication of an image associated with the robot 200 (image 200A described later in FIG. 19B etc.). Since the deformation is non-linear, the layout before deformation is not similar to the layout after deformation.

In the example in FIGS. 14A and 14B, compression conversion is applied in the horizontal direction in which a portion of the region protrudes from the display screen 114A, and expansion conversion is applied to four corner regions of the display screen 114A, in the virtual management area 300A. In this way, the deformation processing illustrated in FIGS. 14A and 14B are uneven deformation to which compression conversion and expansion conversion are applied in accordance with the region. The virtual management area 300A after deformation includes a compressed region and an expanded region in a mixed manner. That is, the virtual management area 300A illustrated in FIG. 14B has regions with different scales in a mixed manner. The deformation of the virtual management area 300A by the management area shape deforming unit 1106 may be deformation that allows information to be saved to grasp a rough distance of the robot 200 from the reference point and a rough direction of the robot 200 with respect to the reference point.

The method of providing such deformation is not limited to one and may be any of various methods. For example, the deformation amount in each region may be larger as the position of the region is farther from the center of the display screen 114A and may be smaller as the position of the region is closer to the center of the display screen 114A. Also, the amount to be compressed or the amount to be expanded may be specified for each direction or region, and the deformation amount in the direction or region may be determined in accordance with the specified amount to be compressed or the specified amount to be expanded.

If the shape of the virtual management area 300A given from the management area information acquiring unit 1104 is similar to the shape of the display screen 114A, the management area shape deforming unit 1106 may convert the virtual management area 300A by similarity conversion.

Even if the shape of the virtual management area 300A given from the management area information acquiring unit 1104 is similar to the shape of the display screen 114A, a partial region of the virtual management area 300A may be non-linearly deformed.

Figure 15A:
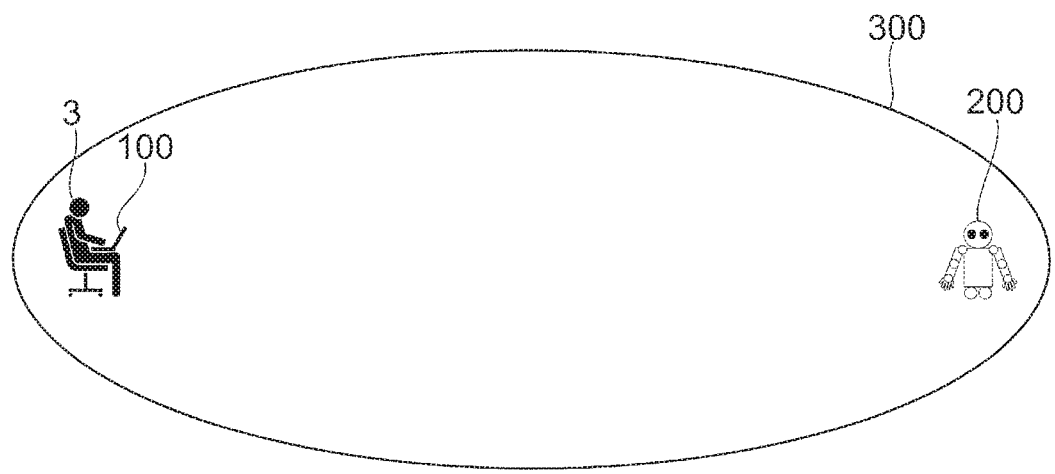
FIGS. 15A and 15B are illustrations explaining an example of deforming the virtual management area so that an end portion of the management area corresponding to the position of the user is located at the left end of the screen, FIG. 15A illustrating the shape of the management area in the real space, FIG. 15B illustrating the direction and magnitude of deformation on a partial region basis to be applied to the virtual management area.
Figure 15B:
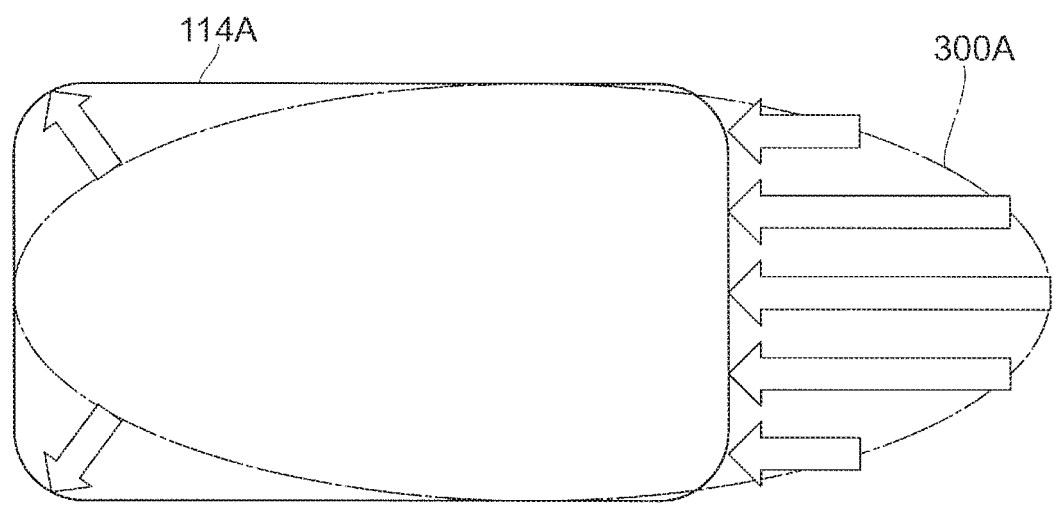

FIGS. 15A and 15B are illustrations explaining an example of deforming the virtual management area 300A so that an end portion of the management area 300 corresponding to the position of the user 3 is located at the left end of the screen, FIG. 15A illustrating the shape of the management area 300 in the real space, FIG. 15B illustrating the direction and magnitude of deformation on a partial region basis to be applied to the virtual management area 300A on display. The direction and length of an arrow represent the direction and amount of deformation.

In the example in FIGS. 15A and 15B, compression deformation toward the left end is applied in the horizontal direction in which a portion of the region protrudes from the display screen 114A, and expansion conversion is applied to upper left corner and lower left corner regions of the display screen 114A, in the virtual management area 300A. Also by this deformation method, the virtual management area 300A is deformed into a substantially quadrangular shape similar to the display screen 114A. However, the distribution in terms of the correspondence between the point in the real space and the point on the display screen differs from that of the example in FIGS. 14A and 14B.

Figure 16A:
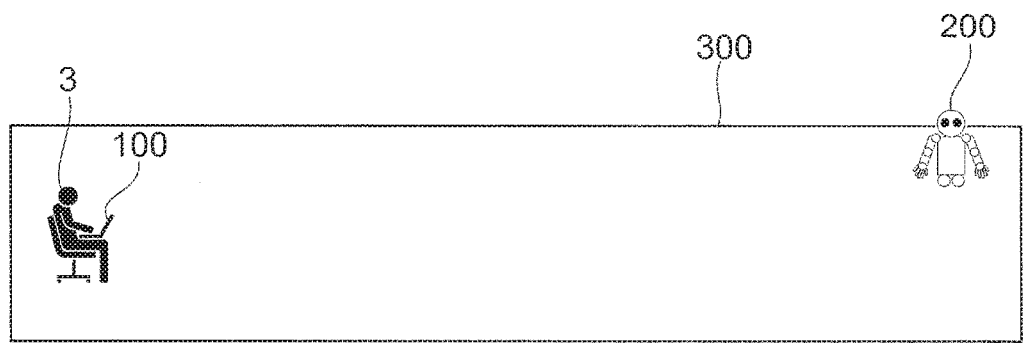
FIGS. 16A and 16B are illustrations explaining deformation processing when the management area in the real space has a rectangular shape being long in one direction (for example, narrow and long path) and the display screen of the display has a substantially quadrangular shape, FIG. 16A illustrating the shape of the management area in the real space, FIG. 16B illustrating the direction and magnitude of deformation on a partial region basis to be applied to the virtual management area.
Figure 16B:
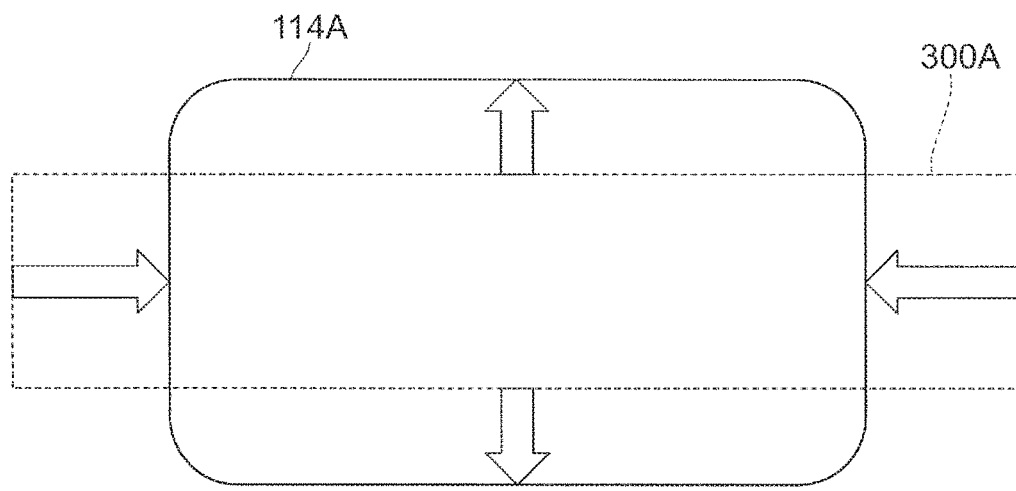

FIGS. 16A and 16B are illustrations explaining deformation processing when the management area 300 in the real space has a rectangular shape being long in one direction (for example, narrow and long path) and the display screen 114A of the display 114 has a substantially quadrangular shape, FIG. 16A illustrating the shape of the management area 300 in the real space, FIG. 16B illustrating the direction and magnitude of deformation on a partial region basis to be applied to the virtual management area 300A. The direction and length of an arrow represent the direction and amount of deformation.

In the example in FIGS. 16A and 16B, compression conversion is applied in the horizontal direction in which a portion of the region protrudes from the display screen 114A, and expansion conversion is applied in the up-down direction of the display screen 114A, in the virtual management area 300A. Even in the case of the long rectangular shape being long in the one direction as illustrated in FIGS. 16A and 16B, the virtual management area 300A may be deformed so that the end portion of the management area 300 where the user 3 is located is located at the left end of the screen as illustrated in FIGS. 15A and 15B.

Figure 17A:
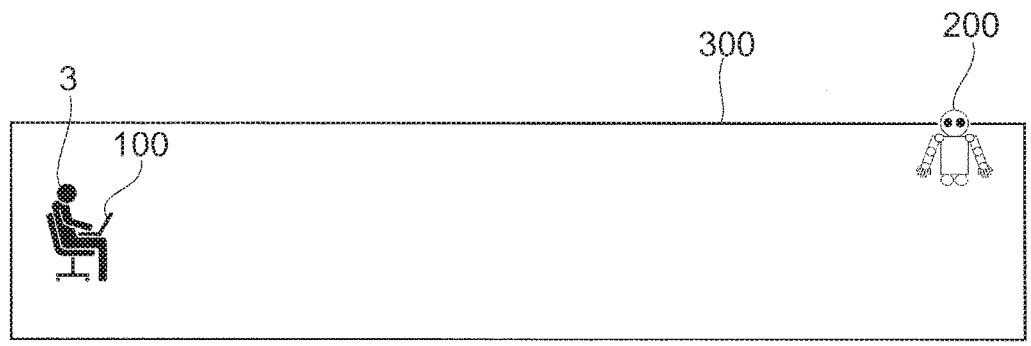
FIGS. 17A and 17B are illustrations explaining an example in which the shape of the virtual management area after deformation is not aligned with the shape of the display screen, FIG. 15A illustrating the shape of the management area in the real space, FIG. 15B illustrating the direction and magnitude of deformation on a partial region basis to be applied to the virtual management area.
Figure 17B:
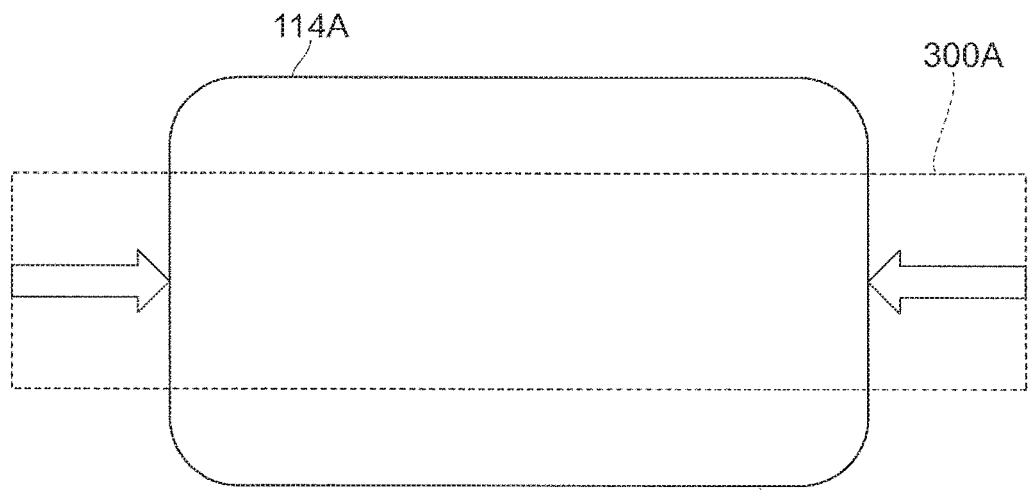

In the examples of the deformation illustrated in FIGS. 14A to 16B, the shape of the virtual management area 300A after deformation is aligned with the shape of the display screen 114A; however, the shape of the virtual management area 300A after deformation may not be aligned with the shape of the display screen 114A. FIGS. 17A and 17B are illustrations explaining an example in which the shape of the virtual management area 300A after deformation is not aligned with the shape of the display screen 114A, FIG. 17A illustrating the shape of the management area 300 in the real space, FIG. 17B illustrating the direction and magnitude of deformation on a partial region basis to be applied to the virtual management area 300A. FIGS. 17A and 17B illustrate a case in which the management area 300 in the real space has a rectangular shape being long in one direction (for example, narrow and long path) and the display screen 114A has a substantially quadrangular shape.

In the example in FIGS. 17A and 17B, the virtual management area 300A is compressed only in the horizontal direction in which a region protruding from the display screen 114A is present. Hence, blank portions are generated in the up-down direction of the virtual management area 300A, on the display screen 114A. However, the virtual management area 300A is compressed to be accommodated in the display screen 114A in the left-right direction. Therefore, the deformation illustrated in FIGS. 17A and 17B is also an example of "deformation in accordance with the shape of the display region" in the claim.

Figure 18A:
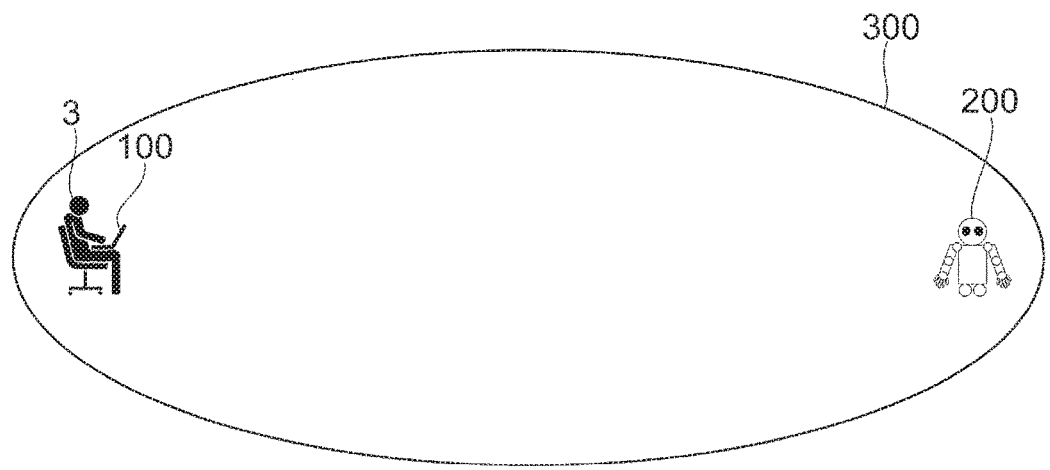
FIGS. 18A and 18B are illustrations explaining an example of deforming the virtual management area so that, when another work screen is displayed on the display screen, the virtual management area does not overlap the other work screen, FIG. 18A illustrating the shape of the management area in the real space, FIG. 18B illustrating the direction and magnitude of deformation on a partial region basis to be applied to the virtual management area.
Figure 18B:
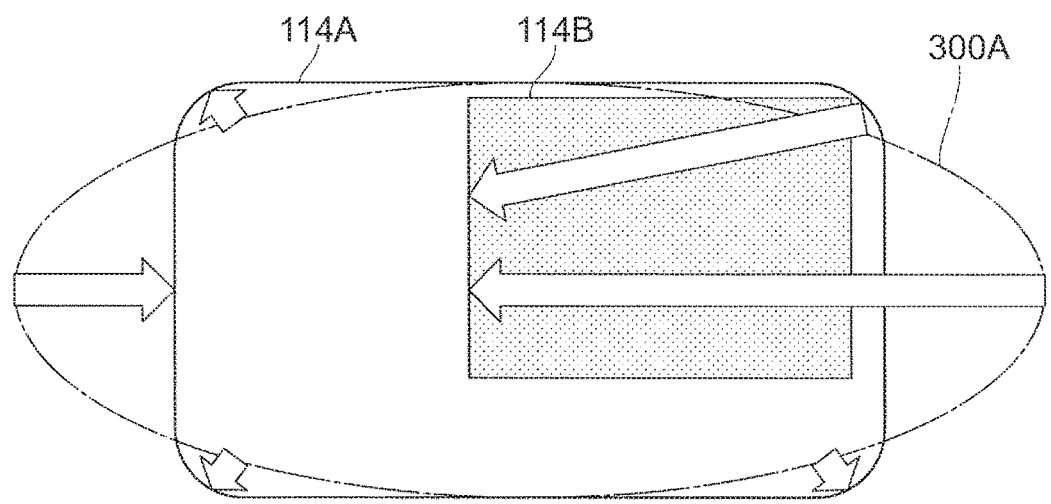

A deformation example of the virtual management area 300A when another work screen is being displayed or is additionally displayed on the display screen 114A is described next. FIGS. 18A and 18B are illustrations explaining an example of deforming the virtual management area 300A so that, when another work screen 114B is displayed on the display screen 114A, the virtual management area 300A does not overlap the other work screen, FIG. 18A illustrating the shape of the management area 300 in the real space, FIG. 18B illustrating the direction and magnitude of deformation on a partial region basis to be applied to the virtual management area 300A. The other work screen 114B in this case is an example of "another work region" in the claim.

In FIGS. 18A and 18B, the virtual management area 300A, which had an ellipsoidal shape before deformation, is deformed into an L shape. The shape of the virtual management area 300A is changed in association with the change in shape of the other work screen 114B when the shape of the other work screen 114B is changed or the other work screen 114B is closed.

Referring back to the description on FIG. 10, the controller 110 has a function serving as the instruction receiving unit 1107 that receives an instruction from the user 3. The instruction in this case includes the above-described designation for the reference position and designation for the management area 300.

The controller 110 also functions as an instruction transmitting unit 1108 that transmits an instruction content for an external apparatus (for example, robot 200) from among instructions received by the instruction receiving unit 1107 by using the communication unit 112. For example, on the display screen 114A, an image indicative of a function to be executed by the robot 200 is moved to be superposed on the image 200A associated with the robot 200 (see FIGS. 19A and 19B), the instruction transmitting unit 1108 transmits a command that instructs execution of the corresponding function to the robot 200. In this case, "the image indicative of the function to be executed by the robot 200" is an example of "another image" in the claim.

The controller 110 functions as a mapping unit 1109 that maps position information about the robot 200 and the user 3 (or 3A) given from the position information acquiring unit 1101, in the virtual management area 300A displayed on the display screen 114A. The mapping unit 1109 also has a function of determining whether or not the robot 200 and the user 3 (or 3A) are located within the management area 300.

The mapping unit 1109 according to this exemplary embodiment acquires information on the deformation processing executed by the management area shape deforming unit 1106, or acquires information relating to the correspondence of coordinates between the management area 300 and the virtual management area 300A, and executes processing of mapping (associating) the positions of the robot 200 and the user 3 in the virtual management area 300A. At mapping processing, the resolution of the display 114 is also considered. Hence, the mapping positions of the robot 200 and the user 3 may be different if the resolution is different although the size of the display is the same.

Further, the controller 110 functions as the display image generating unit 1110 that generates an image of the virtual management area 300A on the basis of the virtual management area 300A with the position information on the robot 200 mapped. The display image generating unit 1110 displays the position of the robot 200 on the virtual management area 300A by using an icon, an image, etc.

Figure 19A:
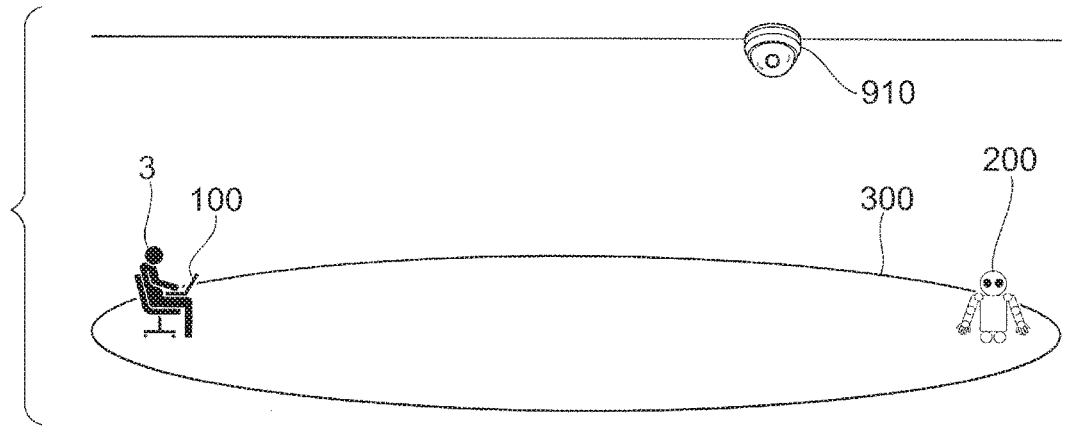
FIGS. 19A and 19B are illustrations explaining an example of using a real image for a position indication of the robot on the display screen, FIG. 19A illustrating an arrangement example of a camera, FIG. 19B illustrating a display example in the virtual management area.
Figure 19B:
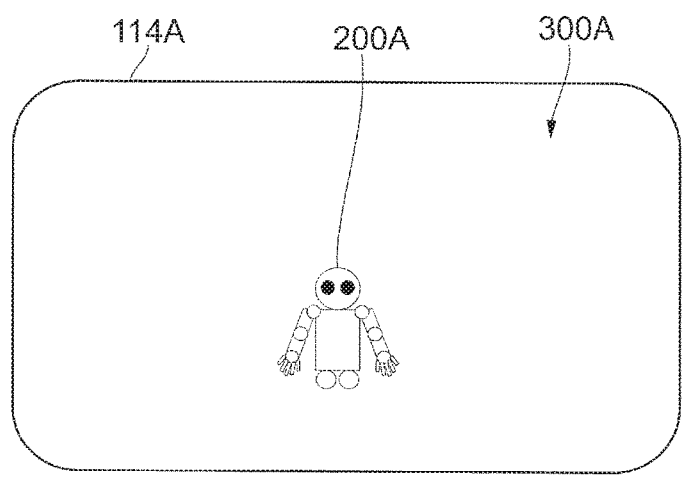

If an image of the robot 200 captured by a camera disposed in the management area 300 is given from an image acquiring unit 1111, the display image generating unit 1110 may display an actual image of the robot 200 instead of an icon. FIGS. 19A and 19B are illustrations explaining an example of using a real image for a position indication of the robot 200 on the display screen 114A, FIG. 19A illustrating an arrangement example of a camera 910, FIG. 19B illustrating a display example in the virtual management area 300A. By using the real image (image 200A), even if plural articles are managed in the virtual management area 300A, the user 3 may easily grasp the positions of the articles.

The display image generating unit 1110 may input distance information from the distance calculating unit 1103. In this case, the display image generating unit 1110 may display the numerical value indicative of the distance on the display screen 114A. A display example is described later. The display image generating unit 1110 may change the display size of the image 200A in accordance with the distance. A display example is described later.

In a case where a work screen other than the virtual management area 300A (another work screen 114B) is displayed on the screen, the display image generating unit 1110 may have a function of moving the display position to avoid the other work screen 114B while the display size of the virtual management area 300A is not changed. FIGS. 20A to 23C illustrate moving examples of the display position.

Figure 20A:
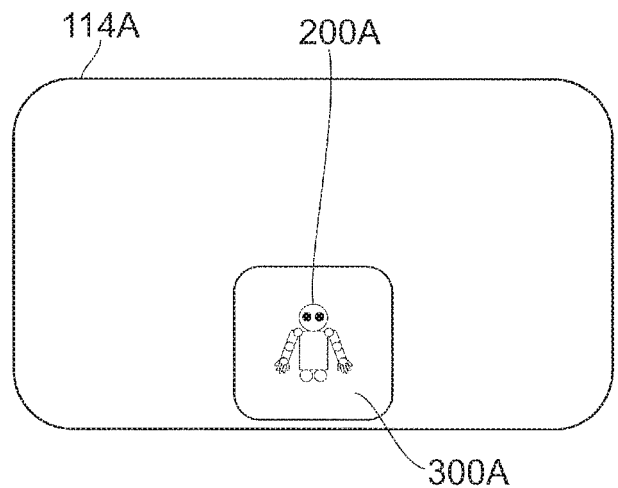
FIGS. 20A and 20B are illustrations explaining an example of moving the virtual management area within the display screen when another work screen is displayed on the display screen, FIG. 20A illustrating the display position of the virtual management area before the other work screen is displayed, FIG. 20B illustrating the display position of the virtual management area after the other work screen is displayed.
Figure 20B:
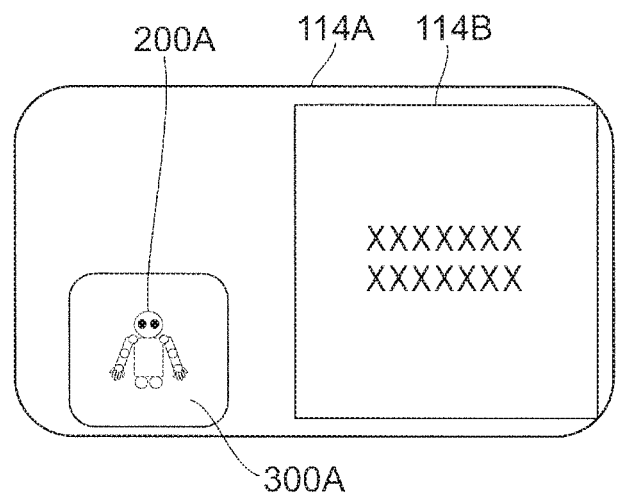

FIGS. 20A and 20B are illustrations explaining an example of moving the virtual management area 300A within the display screen 114A when another work screen 114B is displayed on the display screen 114A, FIG. 20A illustrating the display position of the virtual management area 300A before the other work screen 114B is displayed, FIG. 20B illustrating the display position of the virtual management area 300A after the other work screen 114B is displayed.

FIGS. 21A and 21B are illustrations explaining an example of moving the virtual management area 300A to a position bridging the display screen 114A and a virtual management screen 114C when another work screen 114B is displayed on the display screen 114A, FIG. 21A illustrating the display position of the virtual management area 300A before the other work screen 114B is displayed, FIG. 21B illustrating the display position of the virtual management area 300A after the other work screen 114B is displayed. The virtual management screen 114C is a non-display page located outside the physical display screen 114A. The non-display page is an example of a virtual space. FIGS. 21A and 21B illustrate an example of a single non-display page; however, the number of non-display pages may be plural.

In the example in FIGS. 21A and 21B, the display position of the virtual management area 300A is moved while the shape thereof is not changed; however, the shape of the virtual management area 300A may be changed in accordance with another newly displayed work screen 114B and then the display position may be moved. For example, if the virtual management area 300A is simply deformed in accordance with the other work screen 114B, the display area of the virtual management area 300A may be excessively decreased, and it may be difficult to recognize the position of the robot 200. Hence, the virtual management area 300A may be deformed so that the display area thereof does not become smaller than a predetermined area. Then, the display position of the virtual management area 300A may be moved.

Figure 22A:
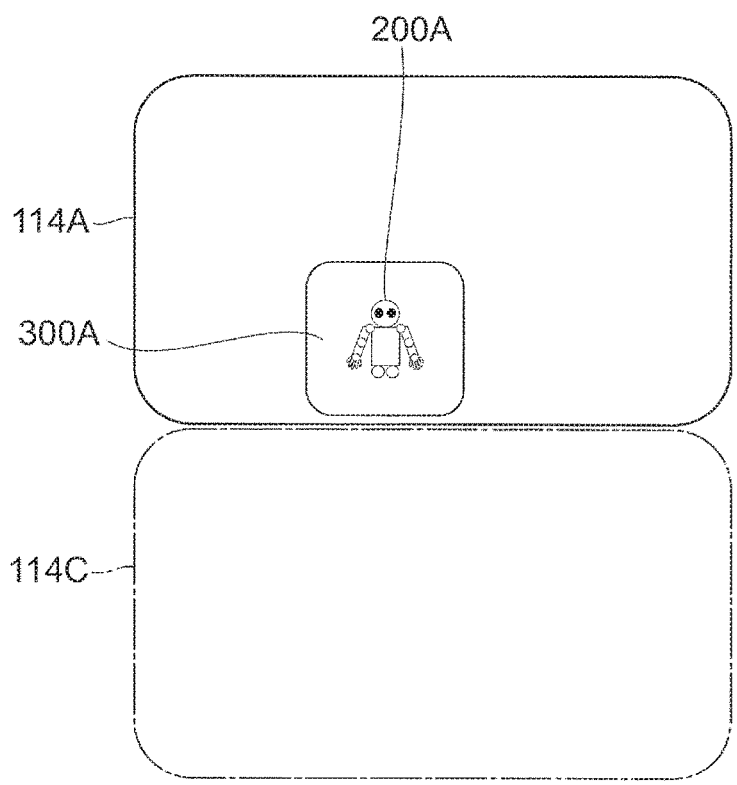
FIGS. 22A and 22B are illustrations explaining an example of moving the virtual management area to the virtual management screen when another work screen is displayed on the display screen, FIG. 22A illustrating the display position of the virtual management area before the other work screen is displayed, FIG. 22B illustrating the display position of the virtual management area after the other work screen is displayed.
Figure 22B:
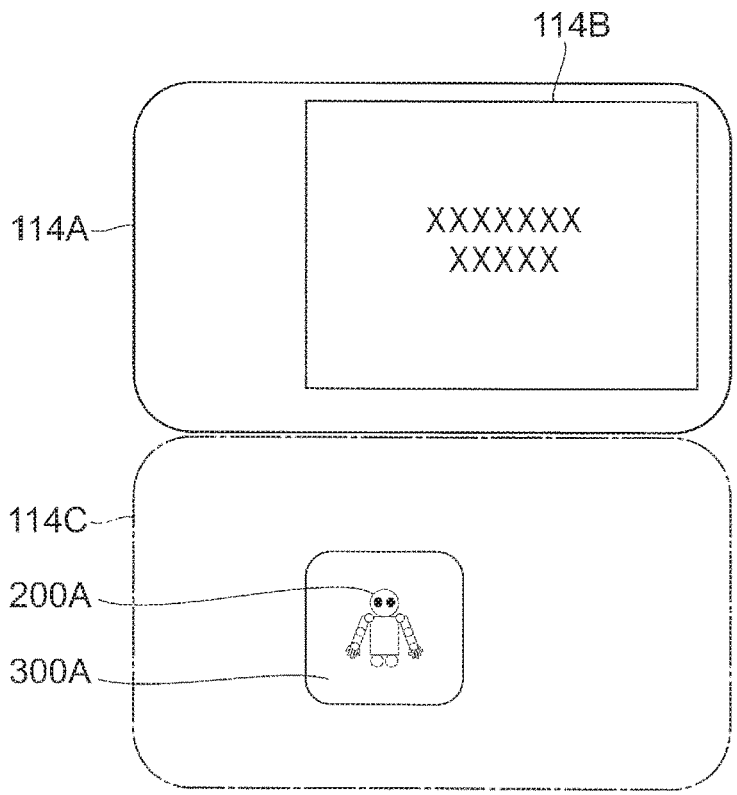

FIGS. 22A and 22B are illustrations explaining an example of moving the virtual management area 300A to the virtual management screen 114C when another work screen 114B is displayed on the display screen 114A, FIG. 22A illustrating the display position of the virtual management area 300A before the other work screen 114B is displayed, FIG. 22B illustrating the display position of the virtual management area 300A after the other work screen 114B is displayed. Also in this case, the shape of the virtual management area 300A may be changed, and then the display position thereof may be moved.

Figure 23A:
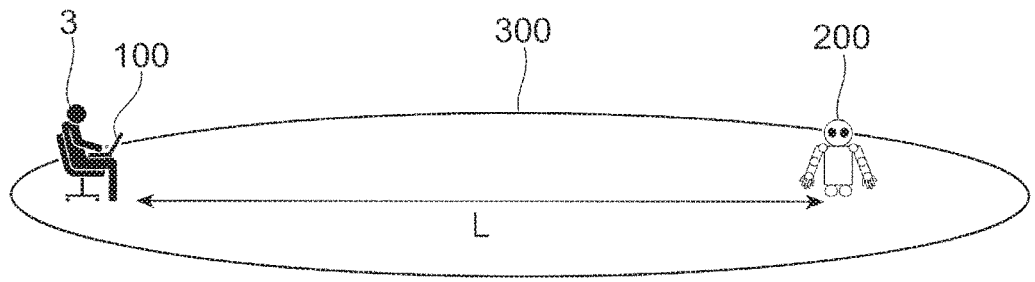
FIGS. 23A to 23C are illustrations explaining an example of changing the display size of an image associated with the robot in accordance with the distance, FIG. 23A illustrating the relationship of the distance between the user and the robot in the real space, FIG. 23B illustrating a case where the change in display size is continuous, FIG. 23C illustrating a case where the change in display size is step-wise.
Figure 23B:
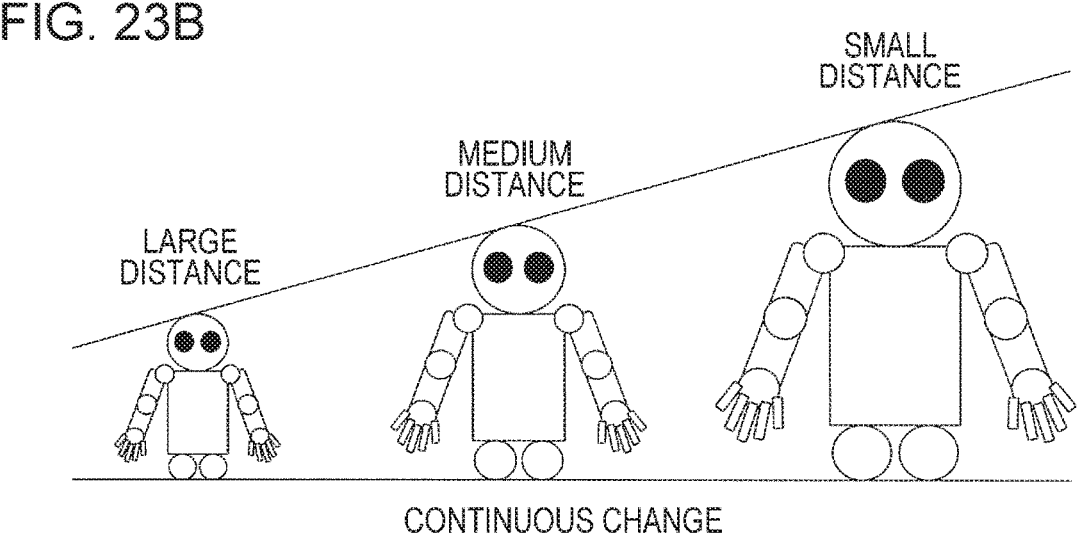
Figure 23C:
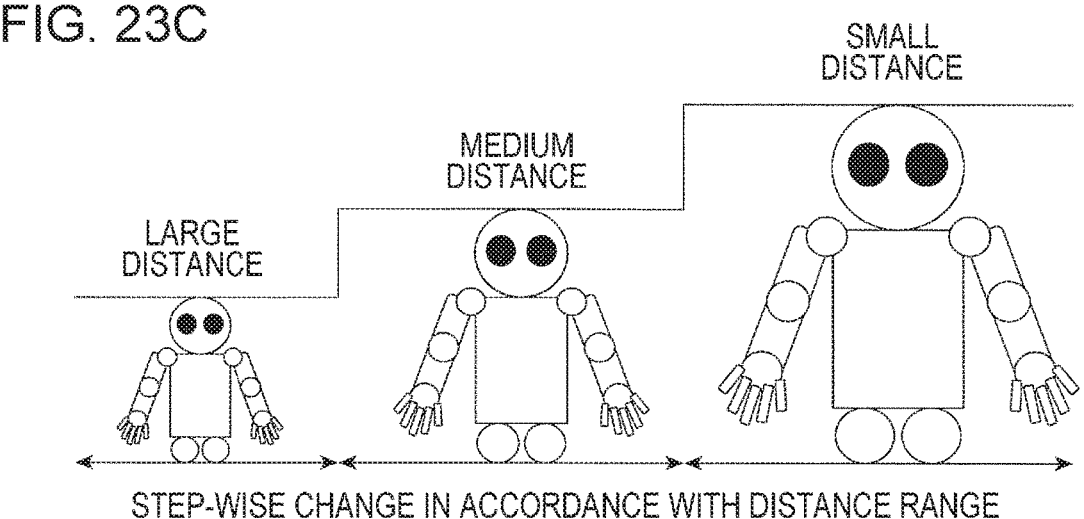

The display image generating unit 1110 may have a function of changing the display size of an image 200A associated with the robot 200 in accordance with the distance from the reference position. FIGS. 23A to 23C are illustrations explaining an example of changing the display size of an image 200A associated with the robot 200 in accordance with a distance L, FIG. 23A illustrating the relationship of the distance L between the user 3 and the robot 200 in the real space, FIG. 23B illustrating a case where the change in display size is continuous, FIG. 23C illustrating a case where the change in display size is step-wise.

As illustrated in FIGS. 23A to 23C, the display image generating unit 1110 displays an image 200A with a larger display size as the distance L is decreased, and displays an image 200A with a smaller display size as the distance L is increased. By changing the display size, the user 3 easily grasps the position of the robot 200. The step-wise change in display size may be provided by comparison between the distance L and a threshold. For example, the display image generating unit 1110 changes the display size of the image 200A at a timing at which the distance L exceeds the threshold (two timings at which the distance L exceeds the threshold to the larger side and at which the distance L exceeds the threshold to the smaller side). In this exemplary embodiment, the function of changing the display size of the image 200A is used in combination with the function of deforming the virtual management area 300A in accordance with the shape of the display screen 114A. However, the display size of the image 200A may be changed irrespective of the deformation of the shape of the display region.

Although it may be grasped whether the robot 200 is close or far by the change in display size on the display screen 114A, the actual distance is not clear. To recognize the distance, it is required to display the display scale and distance information for respective positions in the virtual management area 300A. FIG. 24 illustrates an example in which display scales (scale bars) are displayed at respective portions of the virtual management area 300A. In the example of FIG. 24, the compression ratio in a cross-shaped region at the center of the screen is higher than that of four corner portions of the display screen 114A. The display scales are an example of scale information, and is used as supplemental information for the position of the robot 200 in the real space 400, corresponding to the image 200A mapped on the display screen 114A.

Figure 25A:
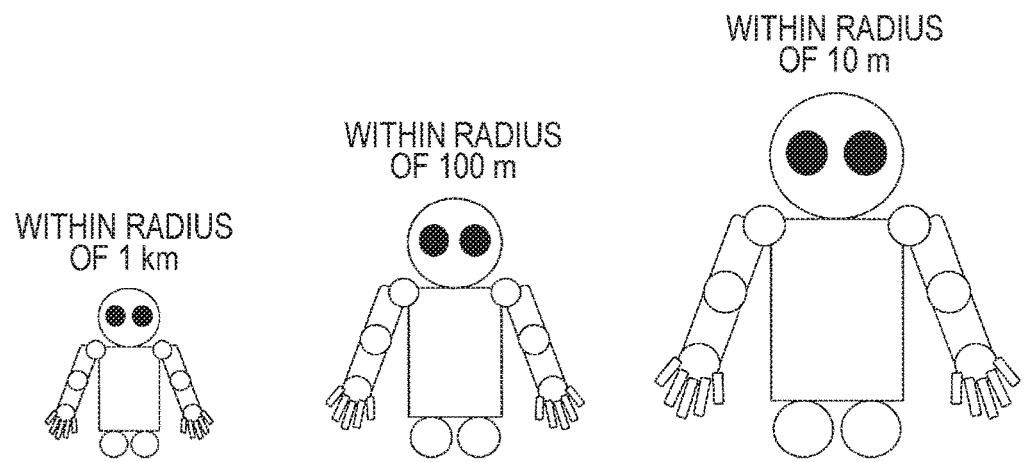
FIGS. 25A and 25B are illustrations explaining an example of displaying distance information indicated by the display size on the screen, FIG. 25A illustrating samples for correspondence between the display size and distance, FIG. 25B illustrating an example of displaying a guide for the distance near an image.
Figure 25B:
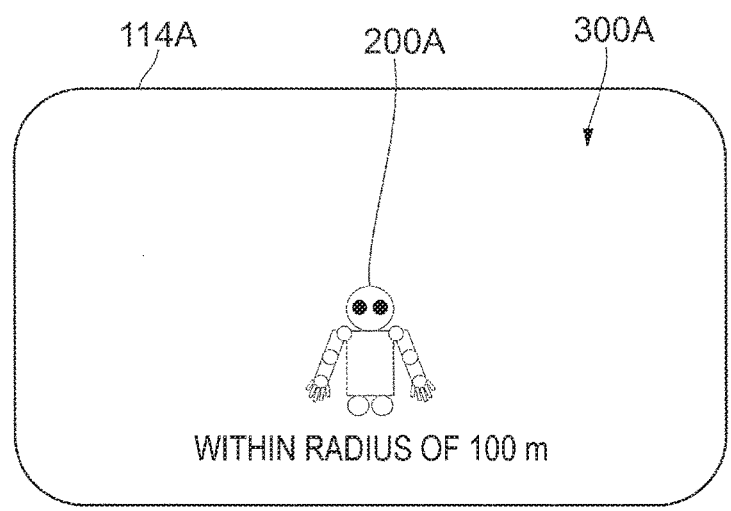
Figure 26A:
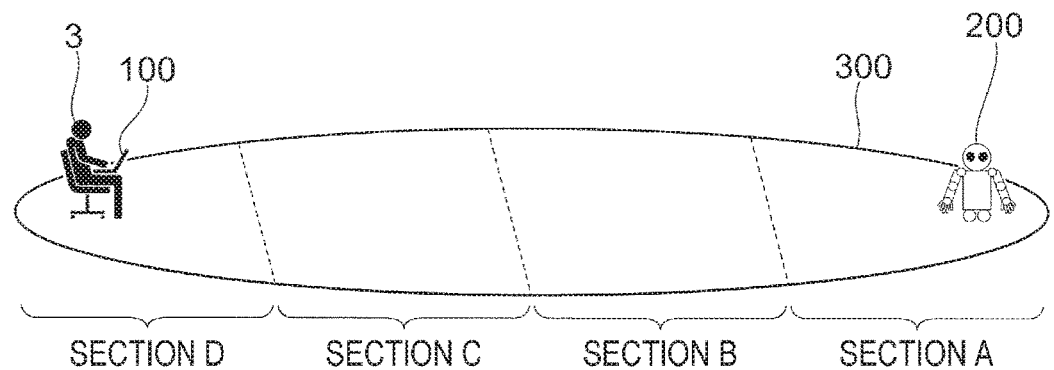
FIGS. 26A and 26B are illustrations explaining an example in which the position of the robot is indicated by using a specific area name, FIG. 26A illustrating area names determined in the management area, FIG. 26B illustrating a display example of displaying an area name of an area where the robot is present in the virtual management area.
Figure 26B:
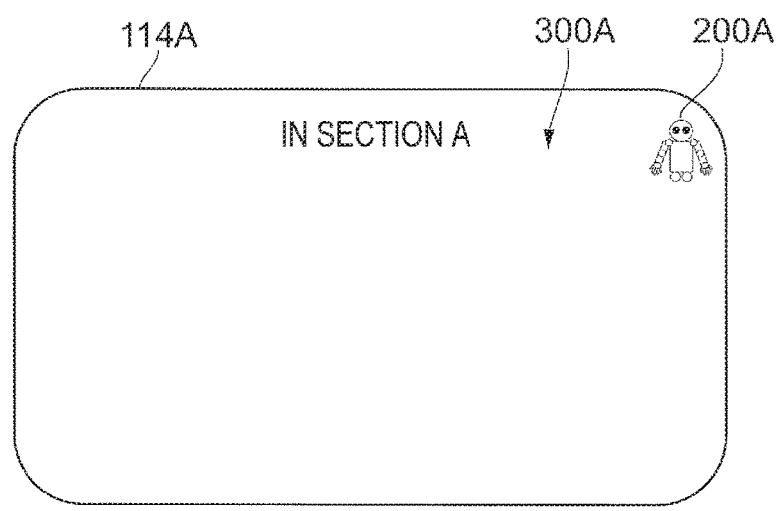

FIGS. 25A and 25B are illustrations explaining an example of displaying distance information indicated by the display size on the screen, FIG. 25A illustrating samples for correspondence between the display size and distance, FIG. 25B illustrating an example of displaying a guide for the distance near the image 200A. FIGS. 26A and 26B are illustrations explaining an example in which the position of the robot 200 is indicated by using a specific area name, FIG. 26A illustrating area names determined in the management area 300, FIG. 26B illustrating a display example of displaying an area name of an area where the robot 200 is present in the virtual management area 300A. FIG. 26B illustrates that the robot 200 is in section A by using characters.

Figure 27A:
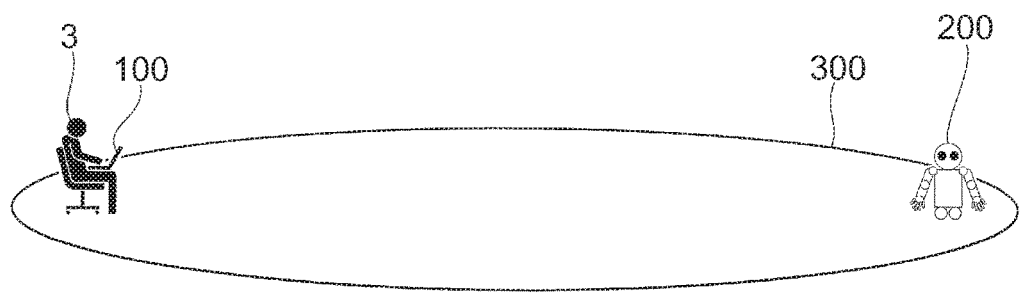
FIGS. 27A and 27B are illustrations explaining an example in which the distance to the robot is displayed on the screen, FIG. 27A illustrating the position of the robot in the management area, FIG. 27B illustrating a display example of displaying the distance to the robot by using a numerical value in the virtual management area.
Figure 27B:
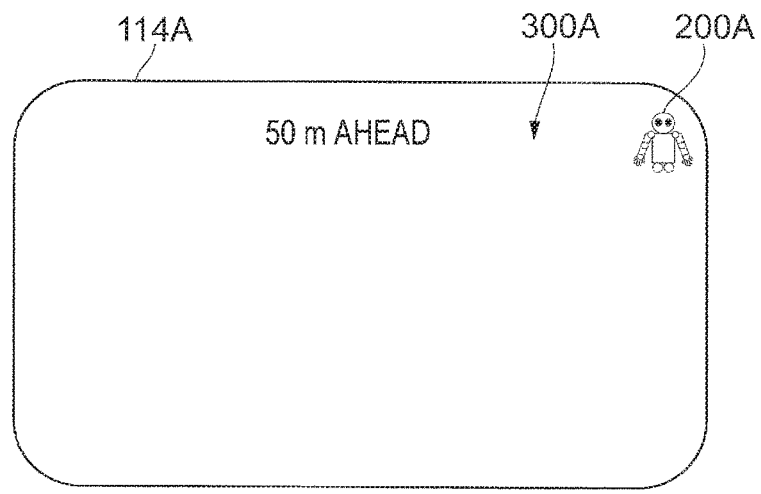

FIGS. 27A and 27B are illustrations explaining an example in which the distance to the robot 200 is displayed on the screen, FIG. 27A illustrating the position of the robot 200 in the management area 300, FIG. 27B illustrating a display example of displaying the distance L to the robot 200 in the virtual management area 300A by using a numerical value. By a combination of such display functions, the user 3 may easily grasp the position of the robot 200 and may recognize the more accurate position of the robot 200.

Figure 28A:
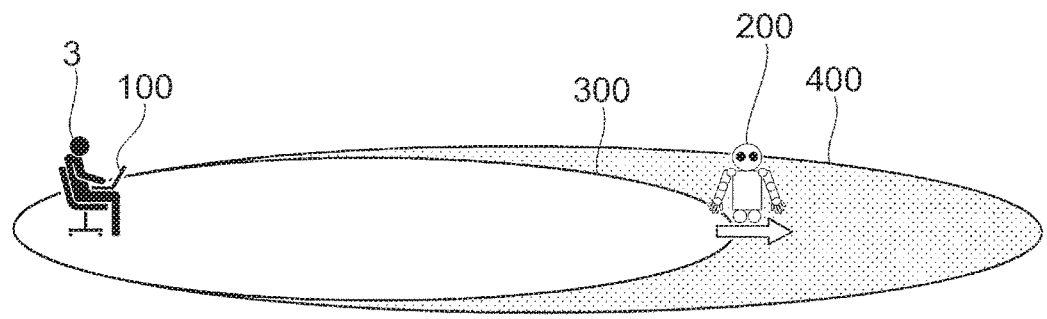
FIGS. 28A to 28C are illustrations explaining an example of a screen for an advance notice about the robot moving outside the management area, FIG. 28A illustrating the positional relationship between the management area and the robot, FIG. 28B illustrating an example of an advance notice screen displayed on the display screen, FIG. 28C illustrating display after the advance notice is displayed.
Figure 28B:
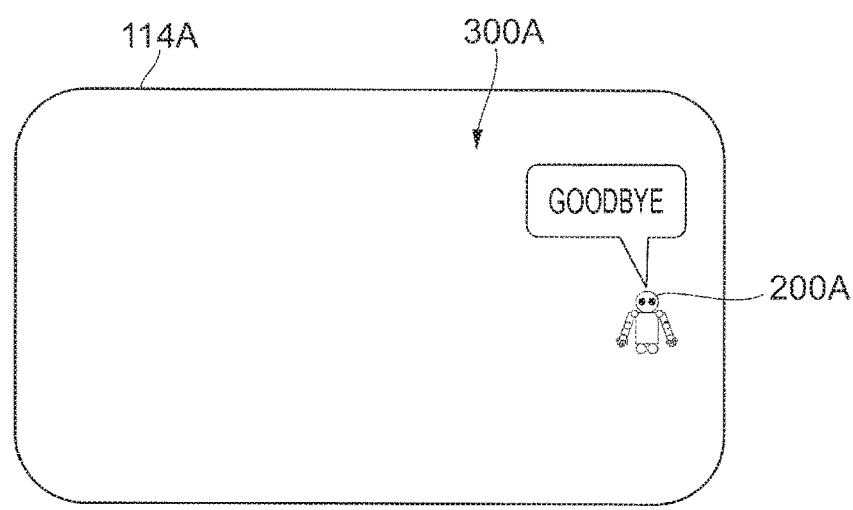
Figure 28C:
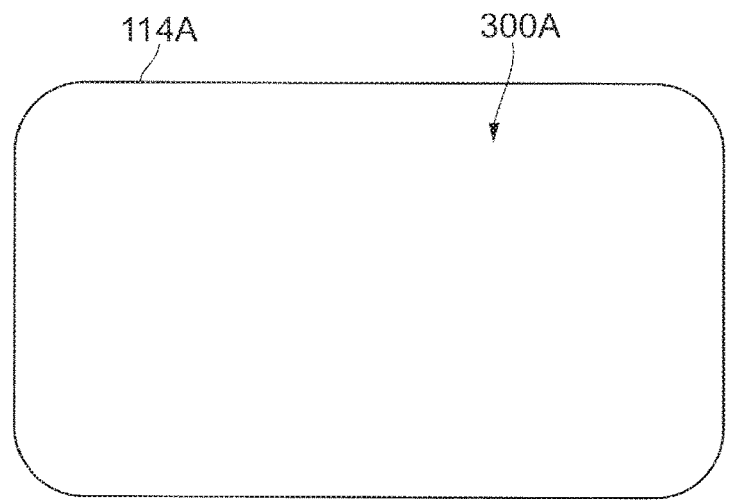

Also, the display image generating unit 1110 may have a function of making an advance notice on the display screen, indicative of that the robot 200 moves outside the management area 300. FIGS. 28A to 28C are illustrations explaining an example of a screen for an advance notice about the robot 200 moving outside the management area 300, FIG. 28A illustrating the positional relationship between the management area 300 and the robot 200, FIG. 28B illustrating an example of an advance notice screen displayed on the display screen 114A, FIG. 28C illustrating display after the advance notice is displayed. In this exemplary embodiment, the "advance notice" represents an announcement or an indication about that the image 200A disappears from the display screen 114A. In the example in FIGS. 28A to 28B, a situation in which the robot 200 exits from the management area 300 is indicated by characters "Goodbye," and then, the image 200A disappears from the screen. Hence, the user 3 may recognize that the robot 200 moves outside the management area 300, on the display screen 114A.

Figure 29A:
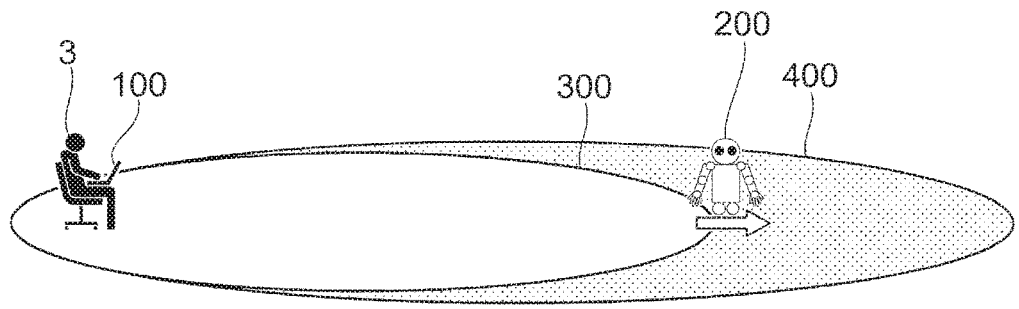
FIGS. 29A to 29C are illustrations explaining another example of a screen for an advance notice about the robot moving outside the management area, FIG. 29A illustrating the positional relationship between the management area and the robot, FIG. 29B illustrating an example of an advance notice screen displayed on the display screen, FIG. 29C illustrating display after the advance notice is displayed.
Figure 29B:
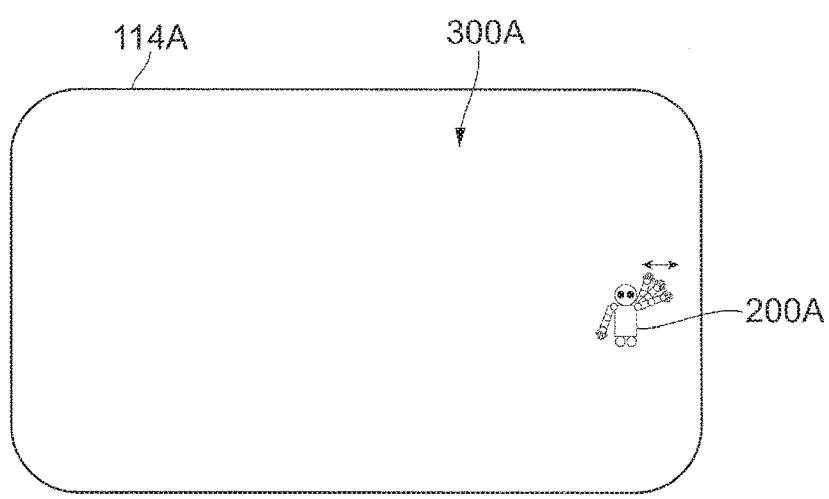
Figure 29C:
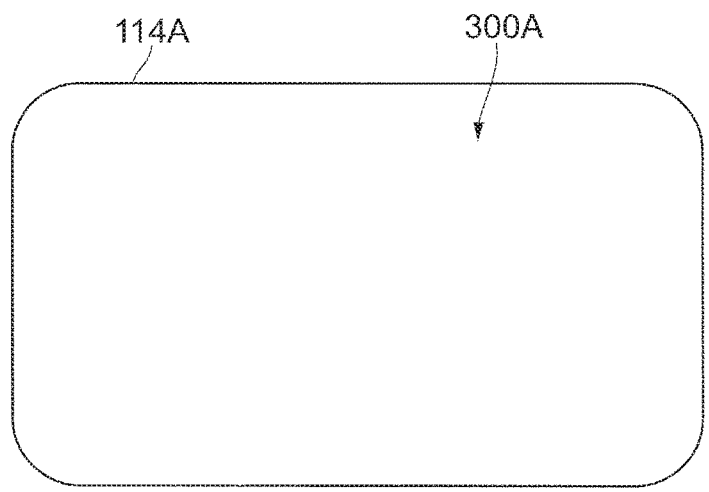

FIGS. 29A to 29C are illustrations explaining another example of the screen for an advance notice about the robot 200 moving outside the management area 300, FIG. 29A illustrating the positional relationship between the management area 300 and the robot 200, FIG. 29B illustrating an example of an advance notice screen displayed on the display screen 114A, FIG. 29C illustrating display after the advance notice is displayed. In the example in FIGS. 29A to 29B, a situation in which the robot 200 moves outside the management area 300 is indicated by a hand waving action, and then, the image 200A disappears from the screen. Hence, the user 3 may recognize that the robot 200 moves outside the management area 300, on the display screen 114A.

Figure 30A:
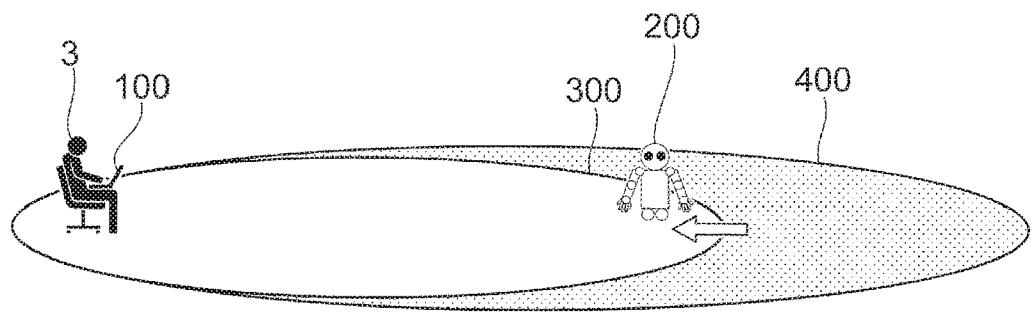
FIGS. 30A to 30C are illustrations explaining an example of a screen for an advance notice about the robot returning to the management area, FIG. 30A illustrating the positional relationship between the management area and the robot, FIG. 30B illustrating an example of an advance notice screen displayed on the display screen, FIG. 30C illustrating display after the advance notice is displayed.
Figure 30B:
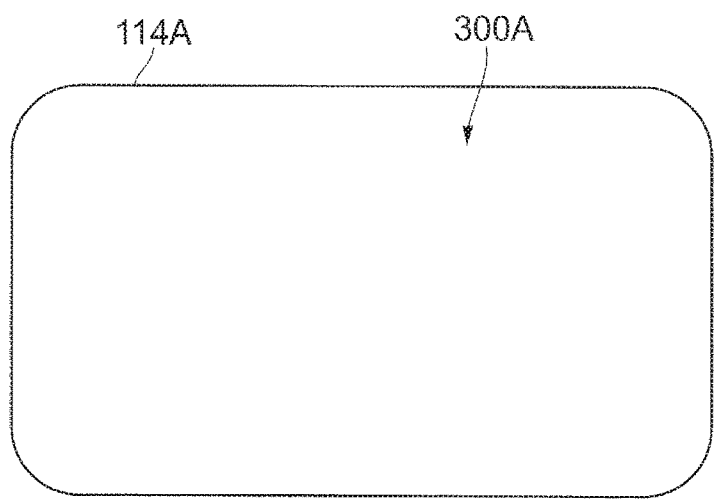
Figure 30C:
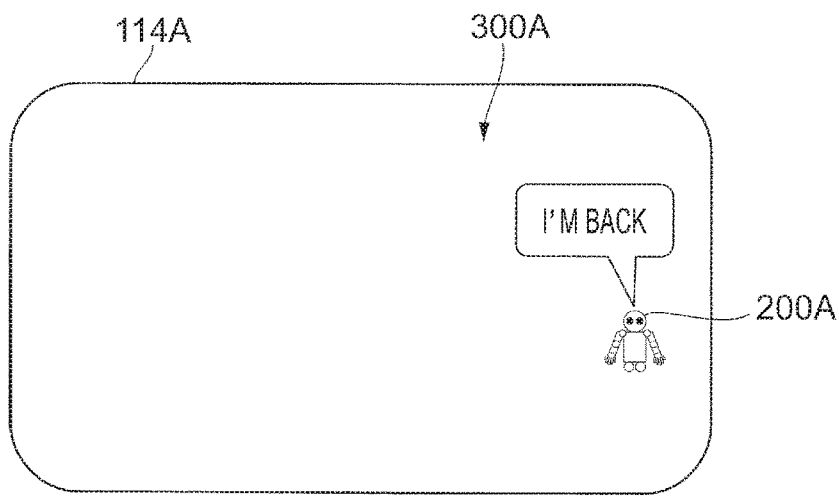

Also, the display image generating unit 1110 may have a function of making an advance notice indicative of that the robot 200 returns to the management area 300, on the display screen. FIGS. 30A to 30C are illustrations explaining an example of a screen for an advance notice about the robot 200 returning to the management area 300, FIG. 30A illustrating the positional relationship between the management area 300 and the robot 200, FIG. 30B illustrating an example of an advance notice screen displayed on the display screen 114A, FIG. 30C illustrating display after the advance notice is displayed. In the example in FIGS. 30A to 30C, a situation in which the robot 200 returns to the management area 300 is indicated by causing the image 200A to appear on the screen together with characters "I'm back." That is, the image 200A is displayed again. Hence, the user 3 may recognize that the robot 200 returns to the management area 300, on the display screen 114A.

Figure 31A:
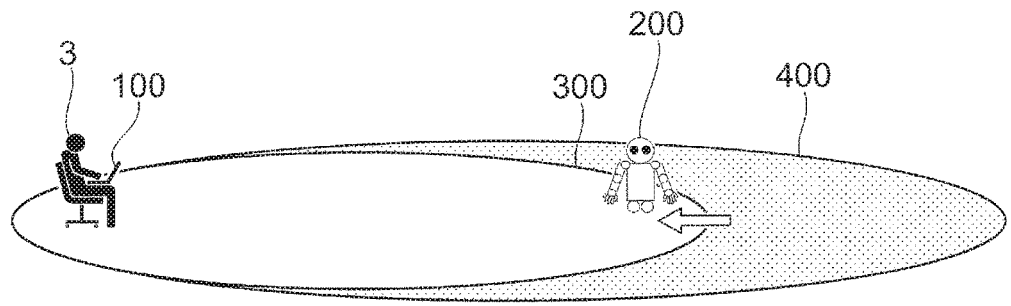
FIGS. 31A to 31C are illustrations explaining another example of a screen for an advance notice about the robot returning to the management area, FIG. 31A illustrating the positional relationship between the management area and the robot, FIG. 31B illustrating an example of an advance notice screen displayed on the display screen, FIG. 31C illustrating display after the advance notice is displayed.
Figure 31B:
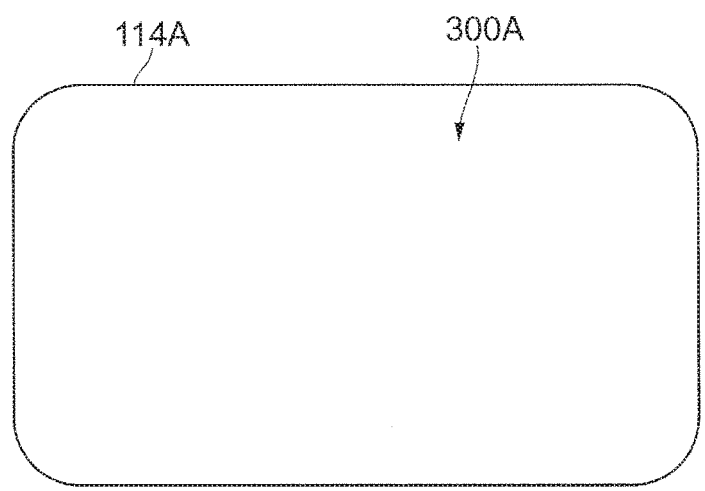
Figure 31C:
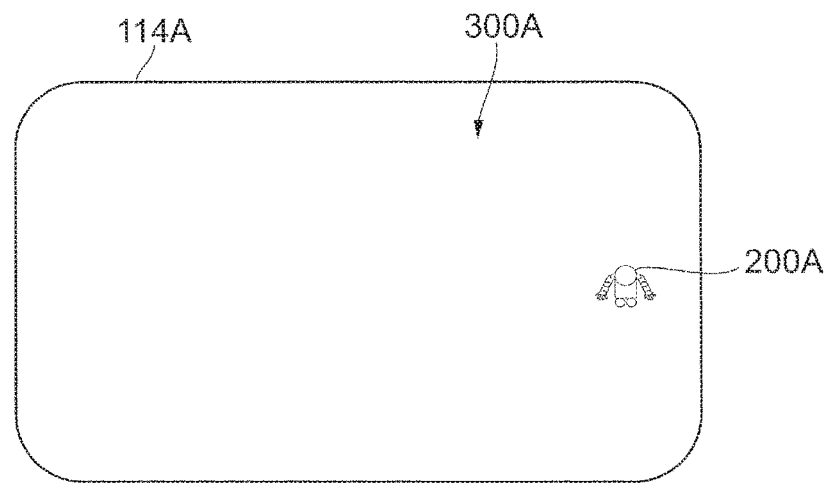

FIGS. 31A to 31C are illustrations explaining another example of a screen for an advance notice about the robot 200 returning to the management area 300, FIG. 31A illustrating the positional relationship between the management area 300 and the robot 200, FIG. 31B illustrating an example of an advance notice screen displayed on the display screen 114A, FIG. 31C illustrating display after the advance notice is displayed. In the example in FIGS. 31A to 31C, a situation in which the robot 200 returns to the management area 300 is indicated by causing a bowing image 200A to appear on the screen. That is, the image 200A is displayed again. Hence, the user 3 may recognize that the robot 200 returns to the management area 300, on the display screen 114A.

Figure 32A:
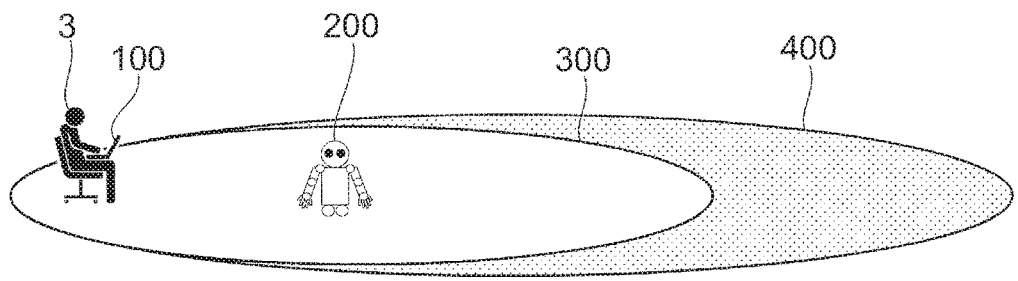
FIGS. 32A to 32C are illustrations explaining a display example when communication with the robot is interrupted at the center of the management area, FIG. 32A illustrating the positional relationship between the management area and the robot, FIG. 32B illustrating an example of a screen for an advance notice about a communication failure, FIG. 32C illustrating display after the advance notice is displayed.
Figure 32B:
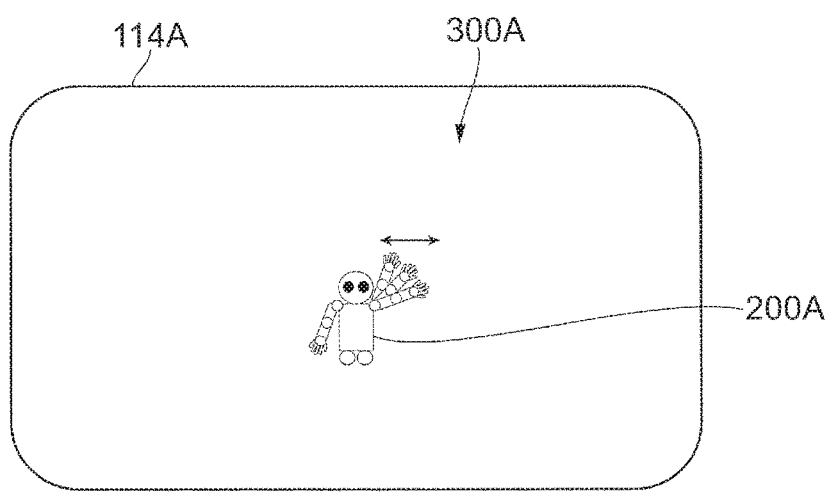
Figure 32C:
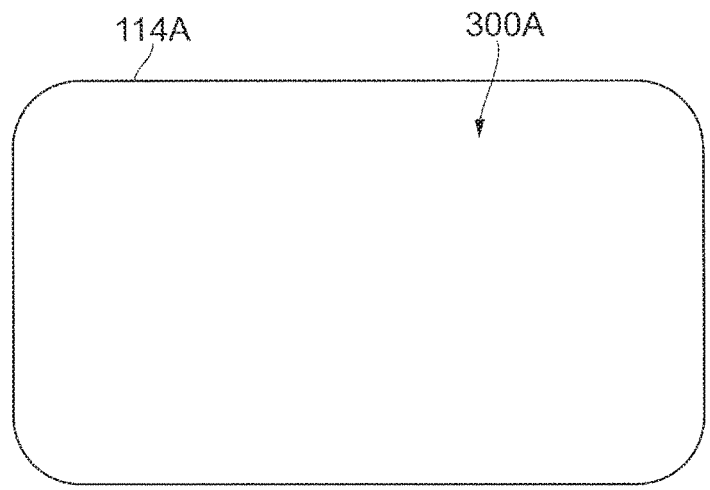

Also, the display image generating unit 1110 may have a function of displaying occurrence of a communication failure even when the robot 200 is in the management area 300. FIGS. 32A to 32C are illustrations explaining a display example when communication with the robot 200 is interrupted at the center of the management area 300, FIG. 32A illustrating the positional relationship between the management area 300 and the robot 200, FIG. 32B illustrating an example of a screen for an advance notice about a communication failure, FIG. 32C illustrating display after the advance notice is displayed. In the example in FIGS. 32A to 32C, interruption of communication with the robot 200 is indicated by a hand waving action, and then, the image 200A disappears from the screen. Since the image 200A associated with the robot 200 disappears after such an action although the robot 200 is located at the center of the virtual management area 300A, the user 3 may recognize the interruption of communication with the robot 200, on the display screen 114A. Alternatively, the communication failure may be displayed on the screen by characters.

Figure 33A:
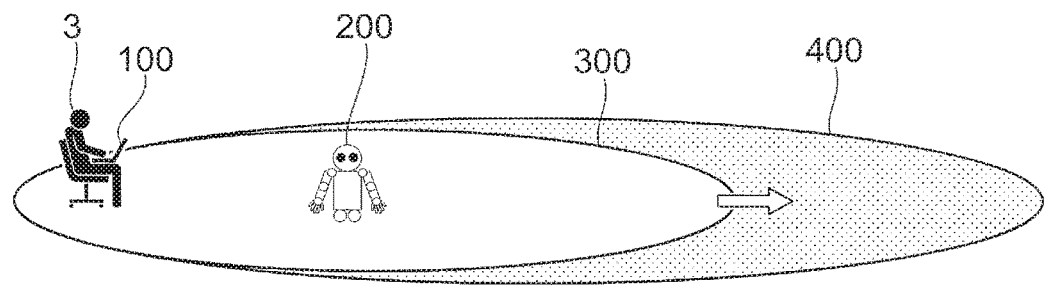
FIGS. 33A to 33C are illustrations explaining a display example when communication with the robot is resumed at the center of the management area, FIG. 33A illustrating the positional relationship between the management area and the robot, FIG. 33B illustrating an example of a screen before the communication is resumed, FIG. 33C illustrating an example of a screen indicating that the communication is resumed.
Figure 33B:
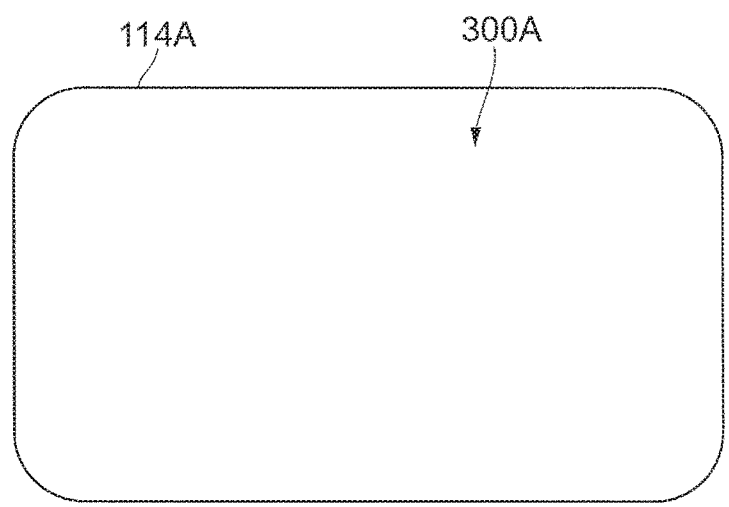
Figure 33C:
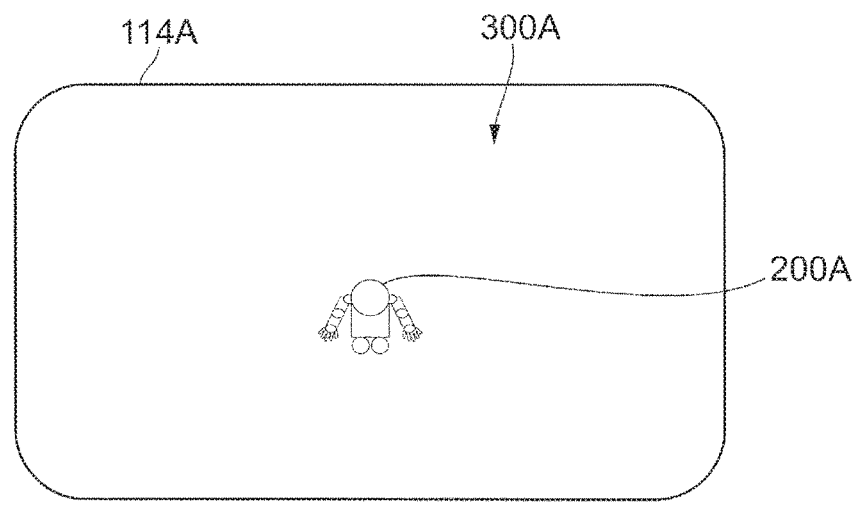

FIGS. 33A to 33C are illustrations explaining a display example when communication with the robot 200 is resumed at the center of the management area 300, FIG. 33A illustrating the positional relationship between the management area 300 and the robot 200, FIG. 33B illustrating an example of a screen before the communication is resumed, FIG. 33C illustrating an example of a screen indicating that the communication is resumed. In the example in FIGS. 33A to 33C, the recovery of the communication with the robot 200 is indicated by appearance of a bowing image 200A. Since the bowing image 200A appears although the robot 200 is located at the center of the virtual management area 300A, the user 3 may recognize that the communication with the robot 200 is resumed, on the display screen 114A. Alternatively, the resumption of the communication may be displayed on the screen by characters. The display size when the display of the image 200A disappears and the display size when the display is recovered are the same.

Referring back to the description on FIG. 10, the controller 110 also has a function as an operational information acquiring unit 1112 that acquires operational information from the robot 200. If the operating state of the robot 200 may be acquired, the operating state of the robot 200 may be displayed on the display screen 114A.

Figure 34A:
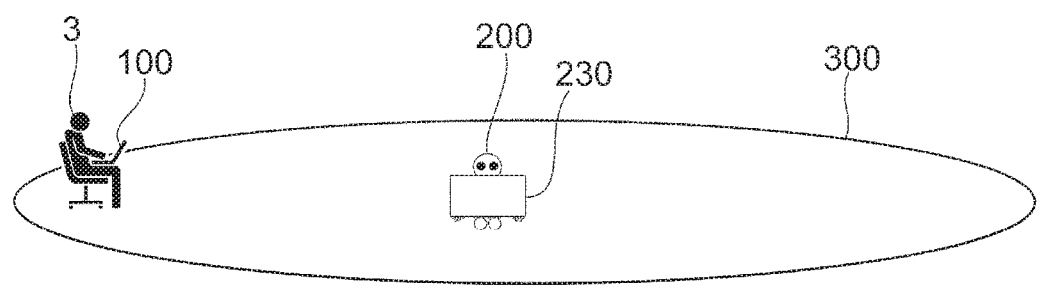
FIGS. 34A and 34B are illustrations explaining a display example by a display image generating unit acquiring operational information from an operational information acquiring unit, FIG. 34A illustrating an operating state of the robot in the real space, FIG. 34B illustrating a display form on the display screen.
Figure 34B:
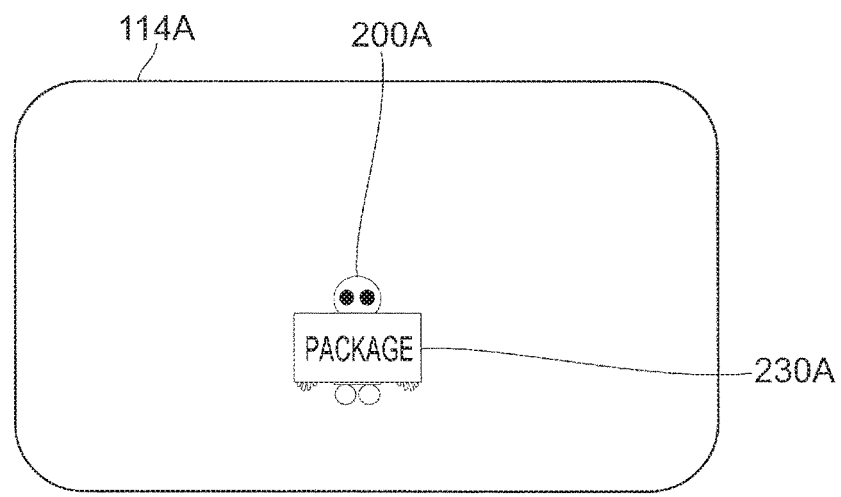

FIGS. 34A and 34B are illustrations explaining a display example by the display image generating unit 1110 acquiring operational information from the operational information acquiring unit 1112, FIG. 34A illustrating an operating state of the robot 200 in the real space, FIG. 34B illustrating a display form on the display screen. FIGS. 34A and 34B illustrates a state in which the robot 200 carries a package 230. Hence, an image 200A carrying a package 230A is displayed on the display screen 114A. With this display, the user 3 may recognize that the robot 200 is carrying the package 230.

Figure 35A:
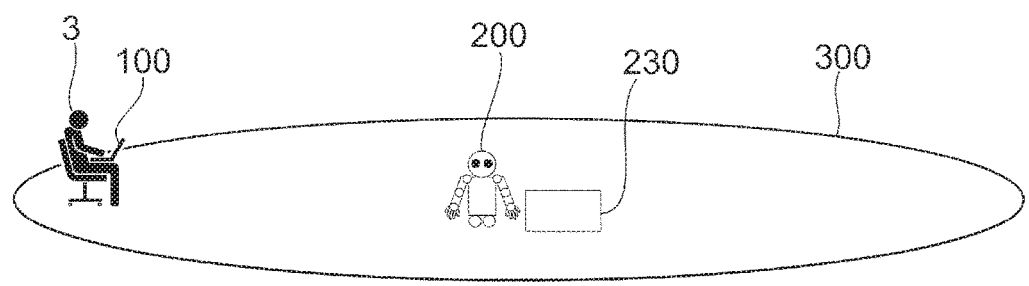
FIGS. 35A and 35B are illustrations explaining another display example by the display image generating unit acquiring operational information from the operational information acquiring unit, FIG. 35A illustrating an operating state of the robot in the real space, FIG. 35B illustrating a display form on the display screen.
Figure 35B:
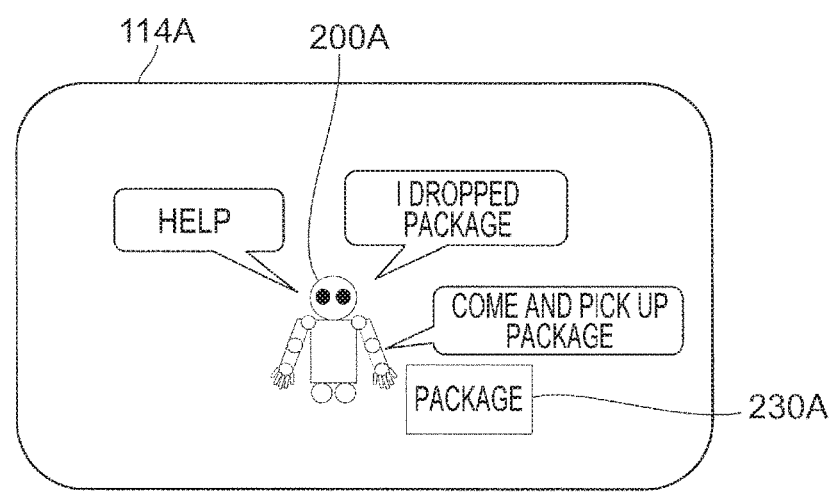

FIGS. 35A and 35B are illustrations explaining another display example by the display image generating unit 1110 acquiring operational information from the operational information acquiring unit 1112, FIG. 35A illustrating an operating state of the robot 200 in the real space, FIG. 35B illustrating a display form on the display screen. FIGS. 35A and 35B illustrate a state in which the robot 200 drops the package 230. In this example, the image 200A without the package 230A is displayed on the display screen 114A, and expressions (characters) appealing for help, such as "Help," "I dropped package," and "Come and pick up package," are displayed. With this display, the user 3 recognizes occurrence of a trouble even through the user 3 is not able to visually check the robot 200, and may perform an appropriate action.

EXAMPLES OF OPERATION SCREENS

Examples of operation screens by the information terminal 100 according to this exemplary embodiment are described below.

Screen Example 1

Figure 36A:
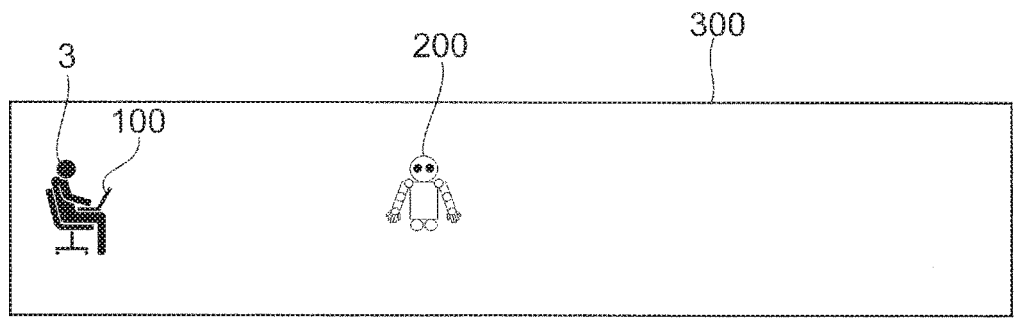
FIGS. 36A and 36B illustrate a display example when the user and the robot are close to each other, FIG. 36A illustrating the positions of the user and the robot in the management area, FIG. 36B illustrating a display example of the positional relationship in the virtual management area.
Figure 36B:
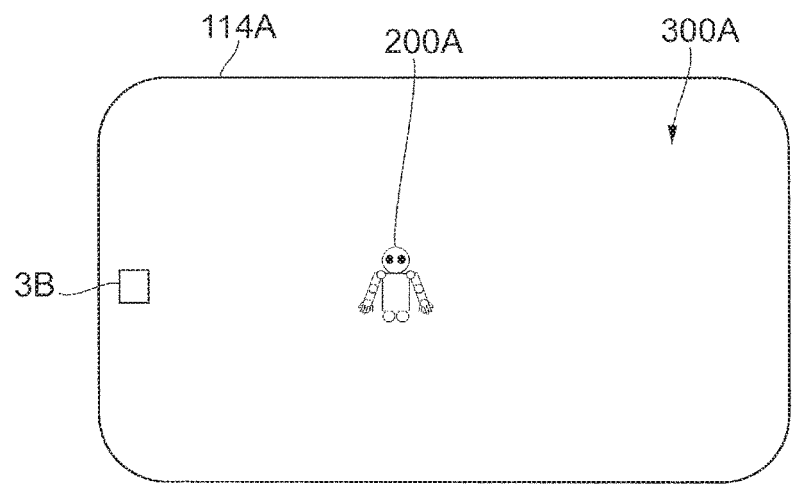

FIGS. 36A and 36B illustrate a display example when the user 3 and the robot 200 are close to each other, FIG. 36A illustrating the positions of the user 3 and the robot 200 in the management area 300, FIG. 36B illustrating a display example of the positional relationship in the virtual management area 300A. Since FIGS. 36A and 36B illustrate the display example when the robot 200 is close to the user 3, an image 200A associated with the robot 200 with a relatively large display size is displayed near an image 3B indicative of the user 3. Referring to FIGS. 36A and 36B, it is found that the robot 200 is located around the center of the management area 300.

Figure 37A:
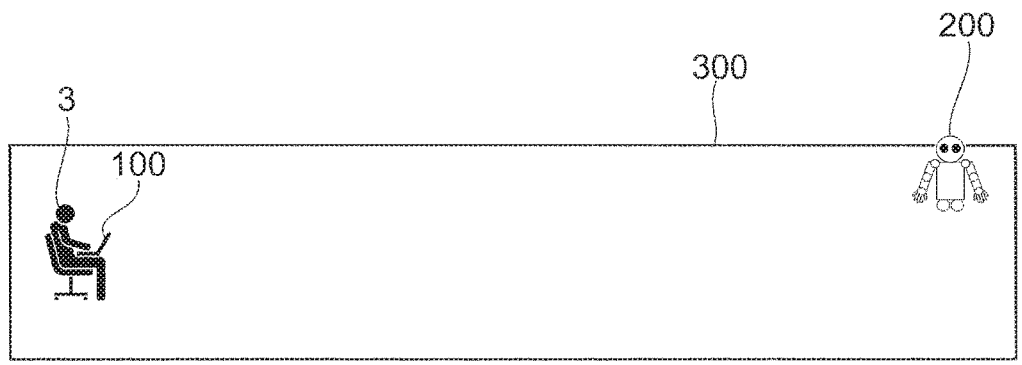
FIGS. 37A and 37B illustrate a display example when the user and the robot are far from each other, FIG. 37A illustrating the positions of the user and the robot in the management area, FIG. 37B illustrating a display example of the positional relationship in the virtual management area.
Figure 37B:
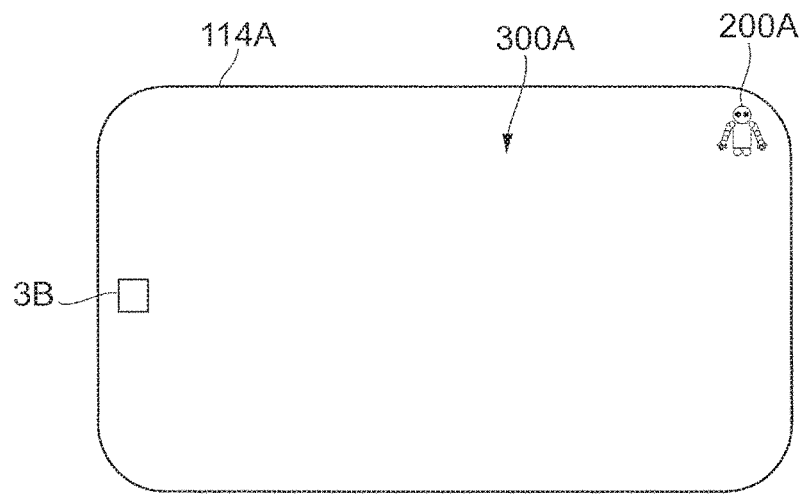

FIGS. 37A and 37B illustrate a display example when the user 3 and the robot 200 are far from each other, FIG. 37A illustrating the positions of the user 3 and the robot 200 in the management area 300, FIG. 37B illustrating a display example of the positional relationship in the virtual management area 300A. Since FIGS. 37A and 37B illustrate the display example when the robot 200 is far from the user 3, an image 200A associated with the robot 200 with a relatively small display size is displayed at a position far from an image 3B indicative of the user 3. Referring to FIGS. 37A to 37B, it is found that the robot 200 is located around a corner of the management area 300.

While the display size of the image 200A associated with the robot 200 is changed in accordance with the distance to the user 3 in FIGS. 36A to 37B, the display sizes may be the same irrespective of the position on the screen.

Screen Example 2

Figure 38A:
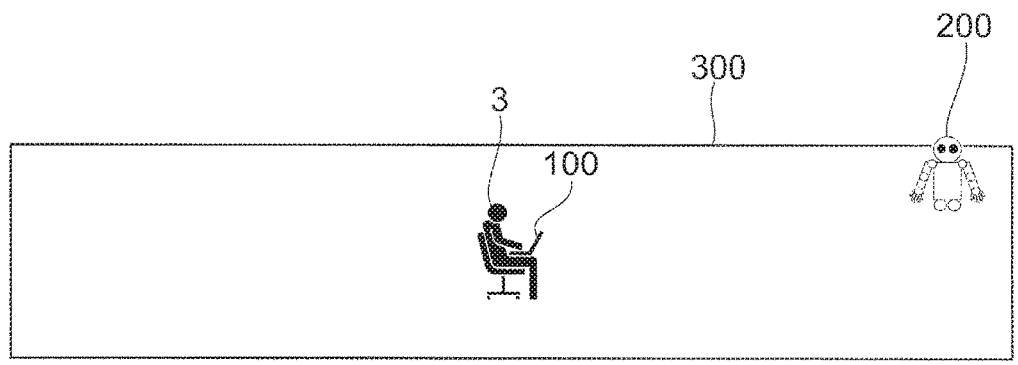
FIGS. 38A and 38B illustrate a display example when the user is located around the center of the management area, FIG. 38A illustrating the positions of the user and the robot in the management area, FIG. 38B illustrating a display example of the positional relationship in the virtual management area.
Figure 38B:
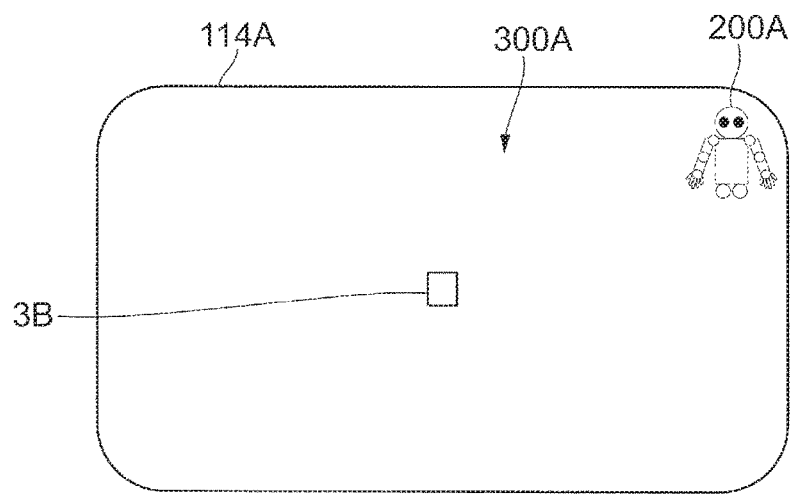

FIGS. 38A and 38B illustrate a display example when the user 3 is located around the center of the management area 300, FIG. 38A illustrating the positions of the user 3 and the robot 200 in the management area 300, FIG. 38B illustrating a display example of the positional relationship in the virtual management area 300A. While FIGS. 38A and 38B illustrate the example similar to the example in FIGS. 37A and 37B for that the robot 200 is located at a corner of the management area 300, the distance between the user 3 and the robot 200 is small, and hence the display size of the image 200A associated with the robot 200 is not markedly decreased.

Screen Example 3

Figure 39A:
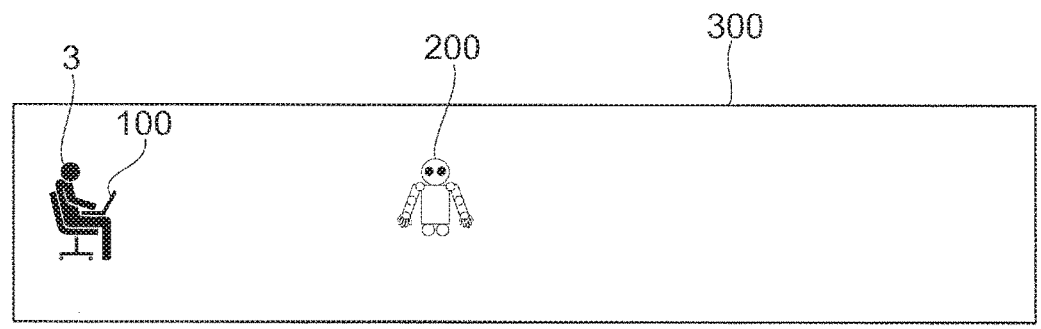
FIGS. 39A and 39B illustrate another display example when the user and the robot are close to each other, FIG. 39A illustrating the positions of the user and the robot in the management area, FIG. 39B illustrating a display example of the positional relationship in the virtual management area.
Figure 39B:
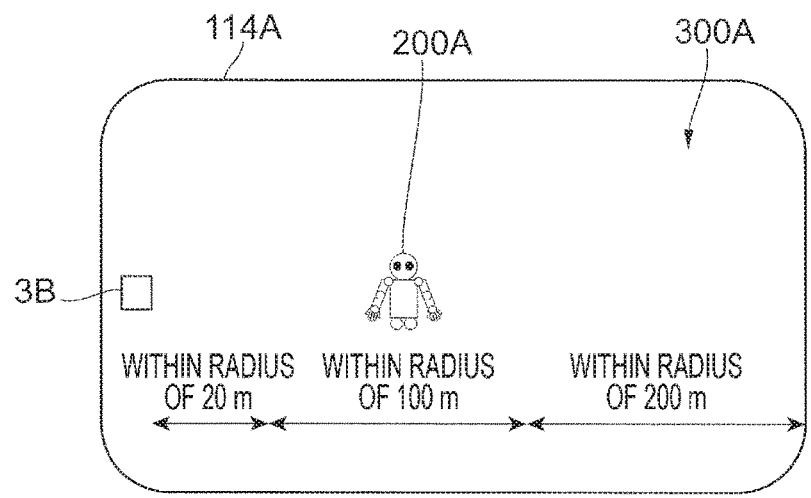

FIGS. 39A and 39B illustrate another display example when the user 3 and the robot 200 are close to each other, FIG. 39A illustrating the positions of the user 3 and the robot 200 in the management area 300, FIG. 39B illustrating a display example of the positional relationship in the virtual management area 300A. The positional relationship between the user 3 and the robot 200 is the same as that in FIGS. 36A and 36B. However, FIGS. 39A and 39B illustrate a guide for the distance corresponding to the display region. For example, in FIGS. 39A and 39B, it is found that the robot 200 is located at a position separated from the user 3 by about 100 m. The user 3 may easily grasp the positional relationship with the robot 200 with reference to the display size of the image 200A associated with the robot 200, and the guide for the distance on the screen.

Screen Example 4

Figure 40A:
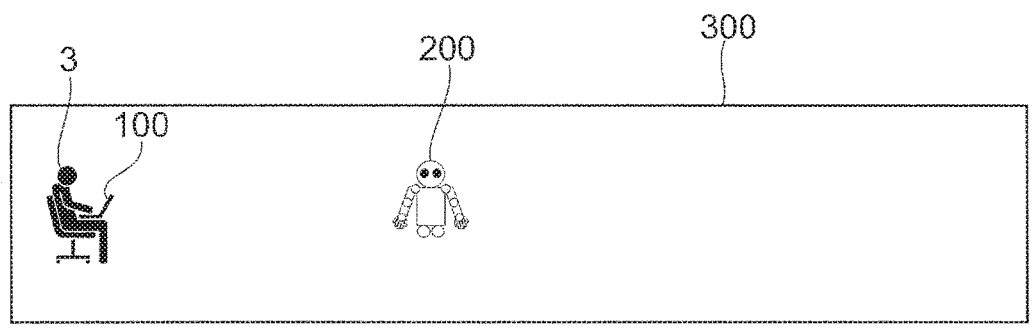
FIGS. 40A and 40B illustrate still another display example when the user and the robot are close to each other, FIG. 40A illustrating the positions of the user and the robot in the management area, FIG. 40B illustrating a display example of the positional relationship in the virtual management area.
Figure 40B:
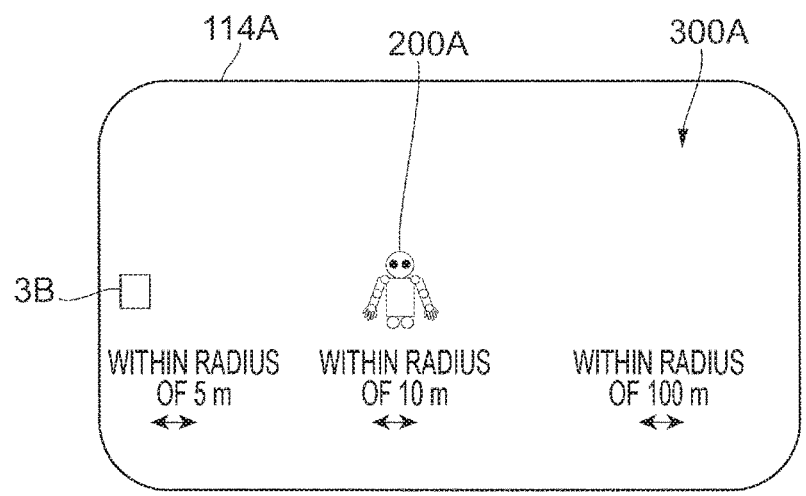

FIGS. 40A and 40B illustrate another display example when the user 3 and the robot 200 are close to each other, FIG. 40A illustrating the positions of the user 3 and the robot 200 in the management area 300, FIG. 40B illustrating a display example of the positional relationship in the virtual management area 300A. The positional relationship between the user 3 and the robot 200 is the same as that in FIGS. 39A and 39B. However, FIGS. 40A and 40B illustrate scale information corresponding to the display region. To be specific, the left portion of the screen corresponds to 5 m, the center portion of the screen corresponds to 10 m, and the right portion of the screen corresponds to 100 m although the lengths of the portions are the same as those in FIGS. 39A and 39B. The user 3 may easily grasp the positional relationship with the robot 200 with reference to the display size of the image 200A associated with the robot 200 and the scale information on the screen.

Screen Example 5

Figure 41A:
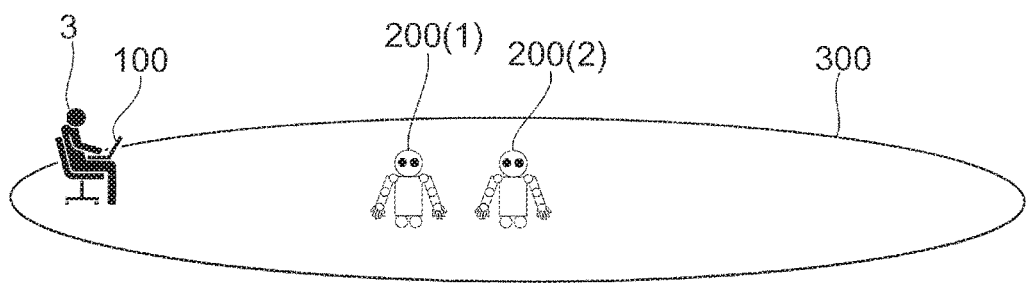
FIGS. 41A and 41B illustrate a display example when plural robots are located in the management area, FIG. 41A illustrating the positional relationship between the user and two robots in the management area, FIG. 41B illustrating a display example of the positional relationship in the virtual management area.
Figure 41B:
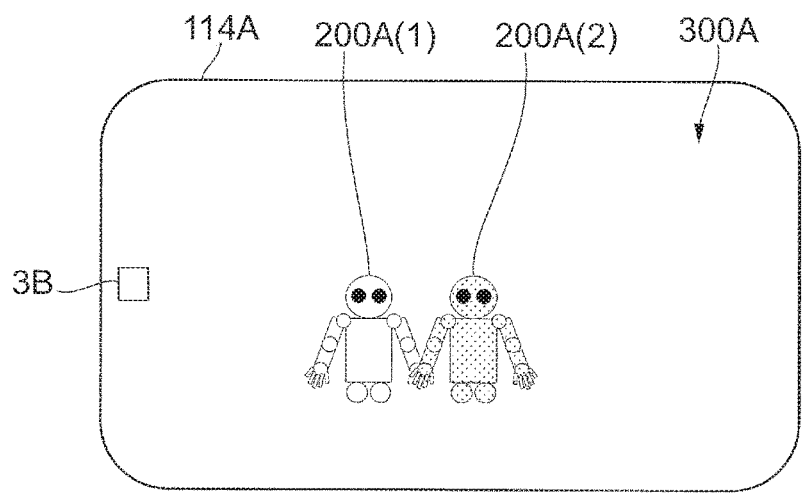

FIGS. 41A and 41B illustrate a display example when plural robots 200 are located in the management area 300, FIG. 41A illustrating the positional relationship between the user 3 and two robots 200(1) and 200(2) in the management area 300, FIG. 41B illustrating a display example of the positional relationship in the virtual management area 300A. In the display example illustrated in FIGS. 41A and 41B, images 200A(1) and 200A(2) indicative of the closely arranged robots 200(1) and 200(2) are displayed with the same display size. However, if the display forms of the images 200A(1) and 200A(2) are the same, the two robots 200(1) and 200(2) may not be distinguished from each other. Therefore, in FIGS. 41A and 41B, the two images 200A(1) and 200A(2) are displayed in different display forms so that the two robots 200(1) and 200(2) may be distinguished from each other. In FIGS. 41A and 41B, the images 200A(1) and 200A(2) are displayed with different colors.

Figure 42A:
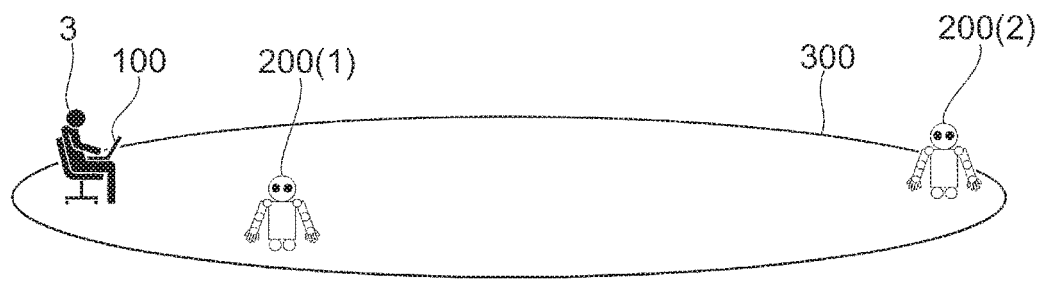
FIGS. 42A and 42B illustrate a display example when the positional relationship between the plural robots is changed in the management area, FIG. 42A illustrating the positional relationship between the user and the two robots in the management area, FIG. 42B illustrating a display example of the positional relationship in the virtual management area.
Figure 42B:
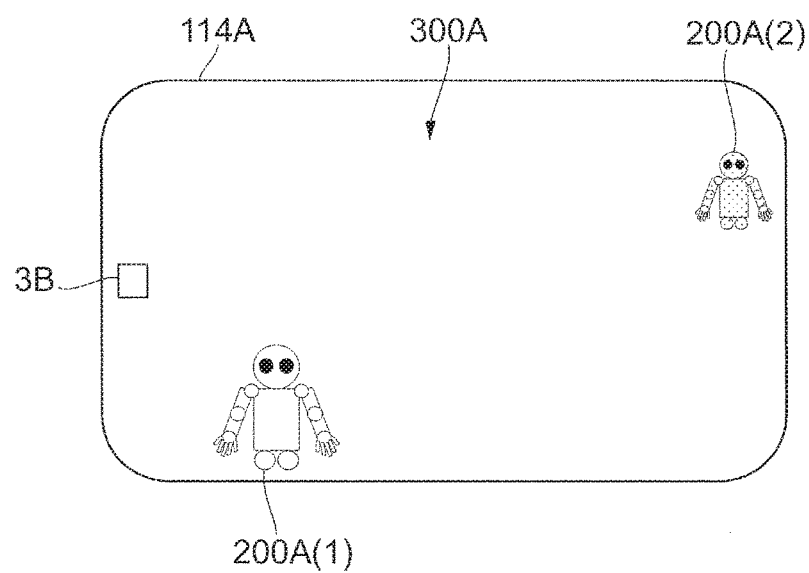

FIGS. 42A and 42B illustrate a display example when the positional relationship between plural robots 200 is changed in the management area 300, FIG. 42A illustrating the positional relationship between the user 3 and two robots 200(1) and 200(2) in the management area 300, FIG. 42B illustrating a display example of the positional relationship in the virtual management area 300A. In the display example illustrated in FIGS. 42A and 42B, the robot 200(1) moves toward the user 3, and the robot 200(2) moves away from the user 3. In addition, in FIGS. 42A and 42B, the display size of the image 200A(1) is changed to be increased, and the display size of the image 200A(2) is changed to be decreased. With the change on display, the user 3 may easily grasp the positional relationship between the two robots 200(1) and 200(2).

Screen Example 6

Figure 43A:
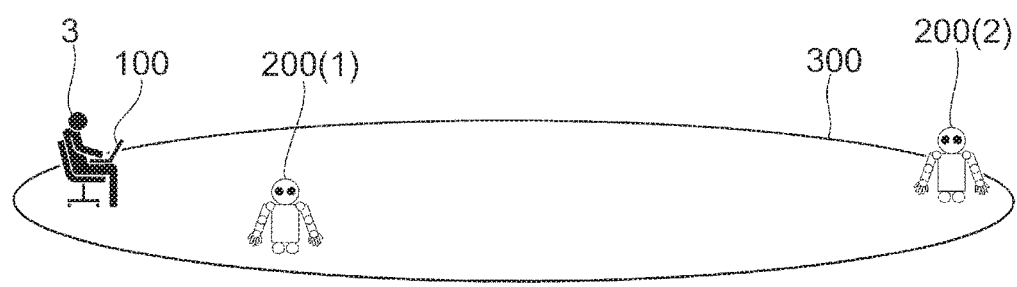
FIGS. 43A and 43B illustrate a display example when another work screen is displayed in the display screen, FIG. 43A illustrating the positional relationship between the user and the two robots in the management area, FIG. 43B illustrating a display example of the positional relationship in the virtual management area.
Figure 43B:
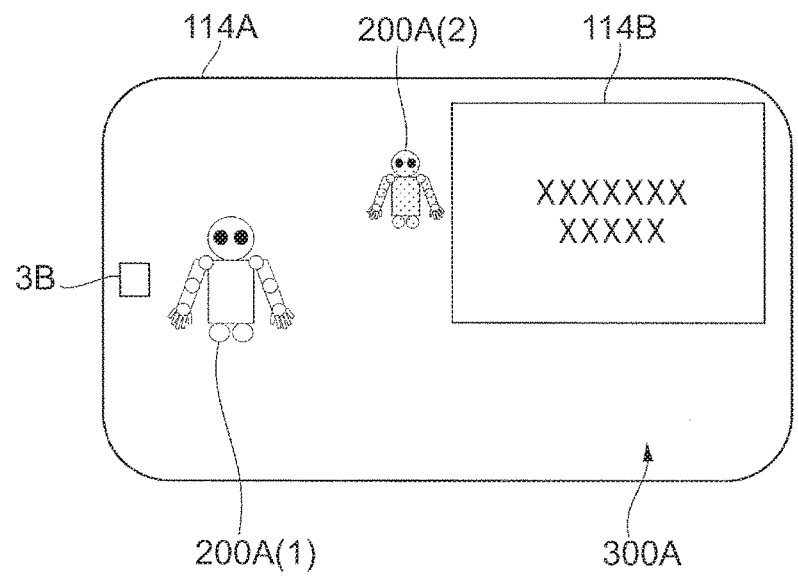

FIGS. 43A and 43B illustrate a display example when another work screen 114B is displayed in the display screen 114A, FIG. 43A illustrating the positional relationship between the user 3 and the two robots 200(1) and 200(2) in the management area 300, FIG. 43B illustrating a display example of the positional relationship in the virtual management area 300A. In FIGS. 43A and 43B, the shape of the virtual management area 300A is deformed to avoid the other work screen 114B. As the result, the image 200A(2) indicating the robot 200(2) is moved to a position around the center of the display screen 114A. The display position corresponds to an end of the management area 300, and hence, the display size of the image 200A(2) indicating the robot 200(2) is markedly smaller than the display size of the image 200A(1) indicating the robot 200(1). Accordingly, the user 3 may easily grasp that the robot 200(1) is close and the robot 200(2) is far.

Screen Example 7

Figure 44A:
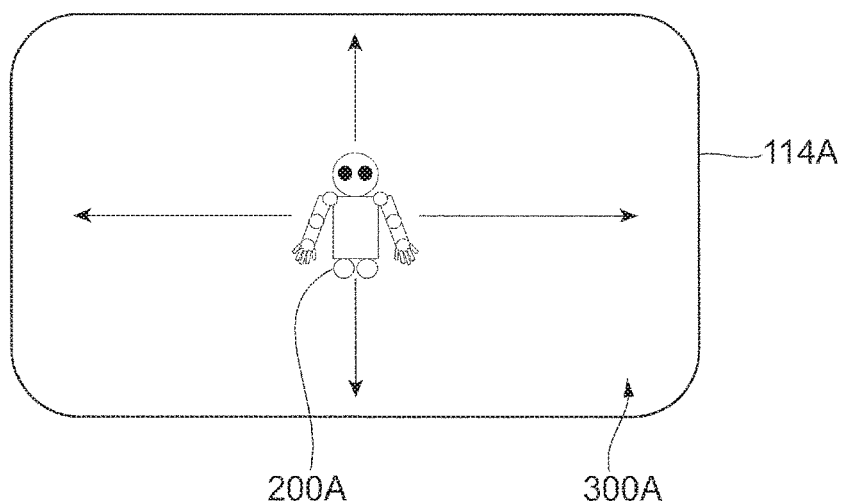
FIGS. 44A to 44C are illustrations explaining a change in shape of the virtual management area when the display size of another work screen is changed, FIG. 44A illustrating a display example before the other work screen is displayed, FIG. 44B illustrating a display example immediately after the other work screen is displayed.
Figure 44B:
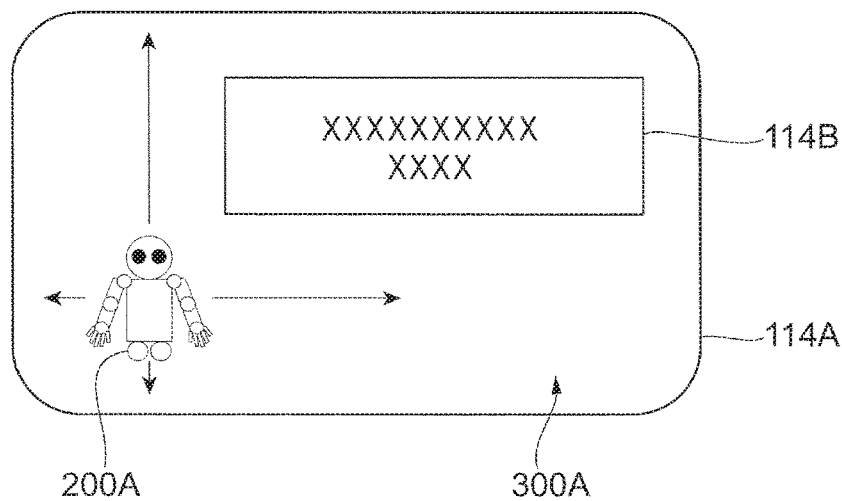
Figure 44C:
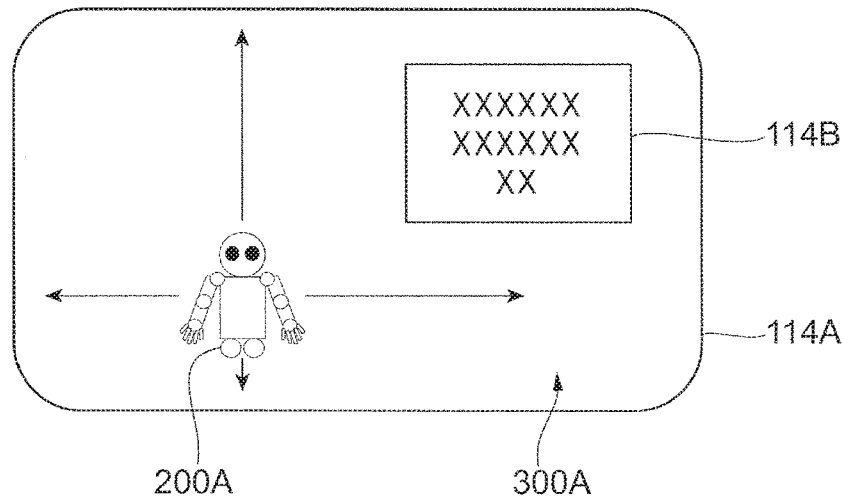

FIGS. 44A to 44C are illustrations explaining a change in shape of the virtual management area 300A when the display size of another work screen 114B is changed, FIG. 44A illustrating a display example before the other work screen 114B is displayed, FIG. 44B illustrating a display example immediately after the other work screen 114B is displayed, FIG. 44C illustrating a display example after the display area of the other work screen 114B is changed. In FIGS. 44A to 44C, the shape of the virtual management area 300A is changed; however, the display size of the image 200A associated with the robot 200 is not changed. The user 3 may easily grasp the position of the robot 200 irrespective of the change in the virtual management area 300A.

Screen Example 8

Figure 45A:
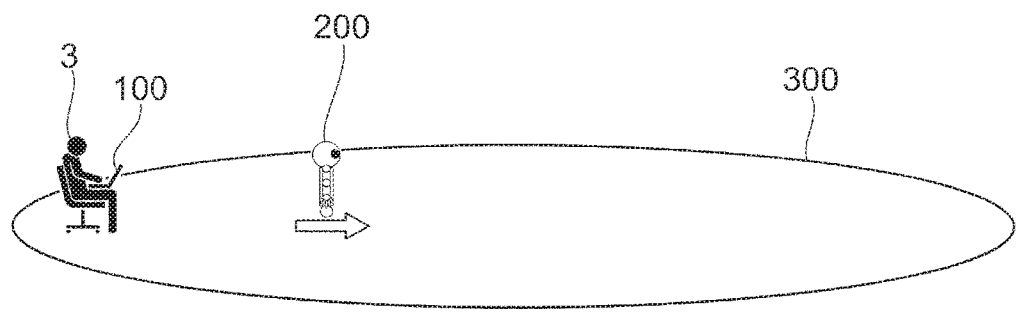
FIGS. 45A to 45C are illustrations explaining display examples when the robot moves away from the user in the management area, FIG. 45A illustrating the positional relationship between the user and the robot in the management area, FIG. 45B illustrating a display example for expressing the state in which the robot moves away from the user, FIG. 45C illustrating another display example for expressing the state in which the robot moves away from the user.
Figure 45B:
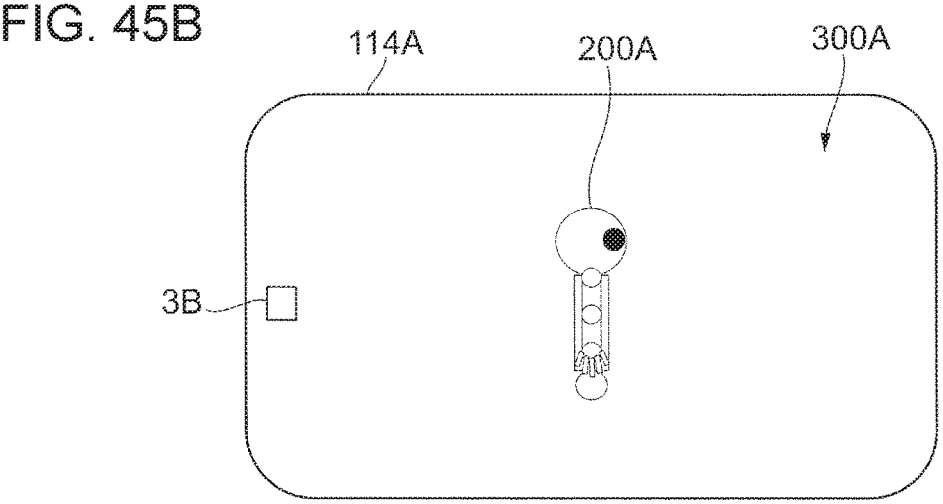
Figure 45C:
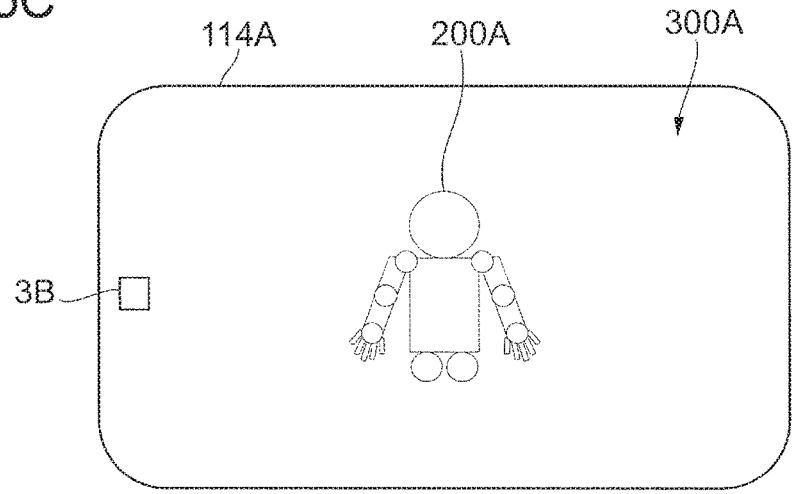

FIGS. 45A to 45C are illustrations explaining display examples when the robot 200 moves away from the user 3 in the management area 300, FIG. 45A illustrating the positional relationship between the user 3 and the robot 200 in the management area 300, FIG. 45B illustrating a display example for expressing the state in which the robot 200 moves away from the user 3, FIG. 45C illustrating another display example for expressing the state in which the robot 200 moves away from the user 3. In FIG. 45B, an image 200A associated with the robot 200 shows its back to an image 3B corresponding to the user 3. In FIG. 45C, an image 200A associated with the robot 200 shows its back to the user 3 who watches the display screen 114A.

Figure 46A:
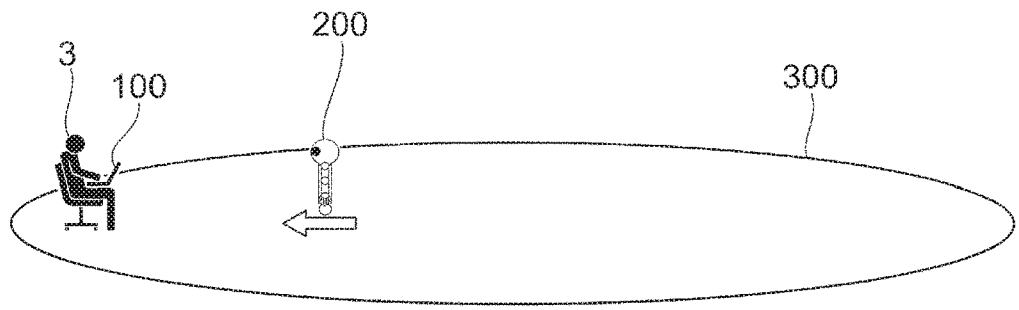
FIGS. 46A to 46C are illustrations explaining display examples when the robot moves toward the user in the management area, FIG. 46A illustrating the positional relationship between the user and the robot in the management area, FIG. 46B illustrating a display example for expressing the state in which the robot moves toward the user, FIG. 46C illustrating another display example for expressing the state in which the robot moves toward the user.
Figure 46B:
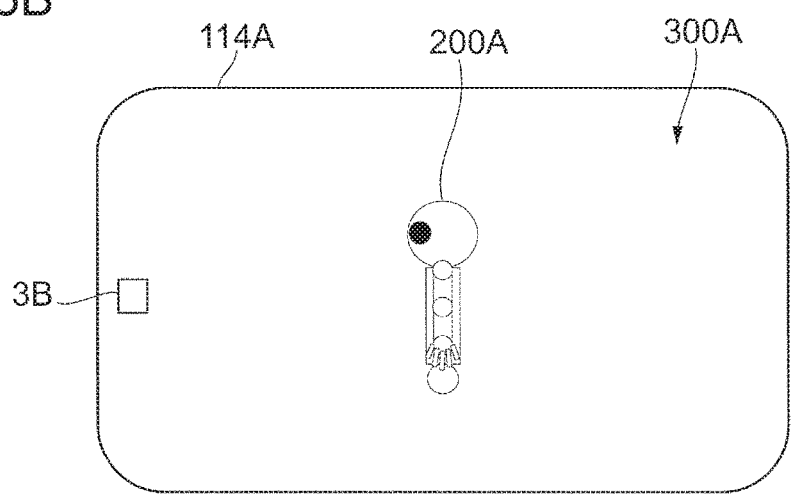
Figure 46C:
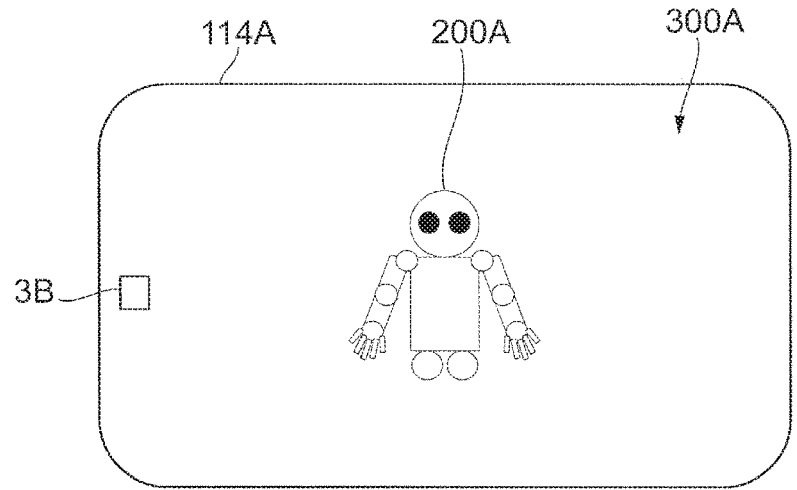

FIGS. 46A to 46C are illustrations explaining display examples when the robot 200 moves toward the user 3 in the management area 300, FIG. 46A illustrating the positional relationship between the user 3 and the robot 200 in the management area 300, FIG. 46B illustrating a display example for expressing the state in which the robot 200 moves toward the user 3, FIG. 46C illustrating another display example for expressing the state in which the robot 200 moves toward the user 3. In FIG. 46B, an image 200A associated with the robot 200 shows its face to an image 3B corresponding to the user 3. In FIG. 46C, an image 200A associated with the robot 200 shows its face to the user 3 who watches the display screen 114A.

Screen Example 9

Figure 47A:
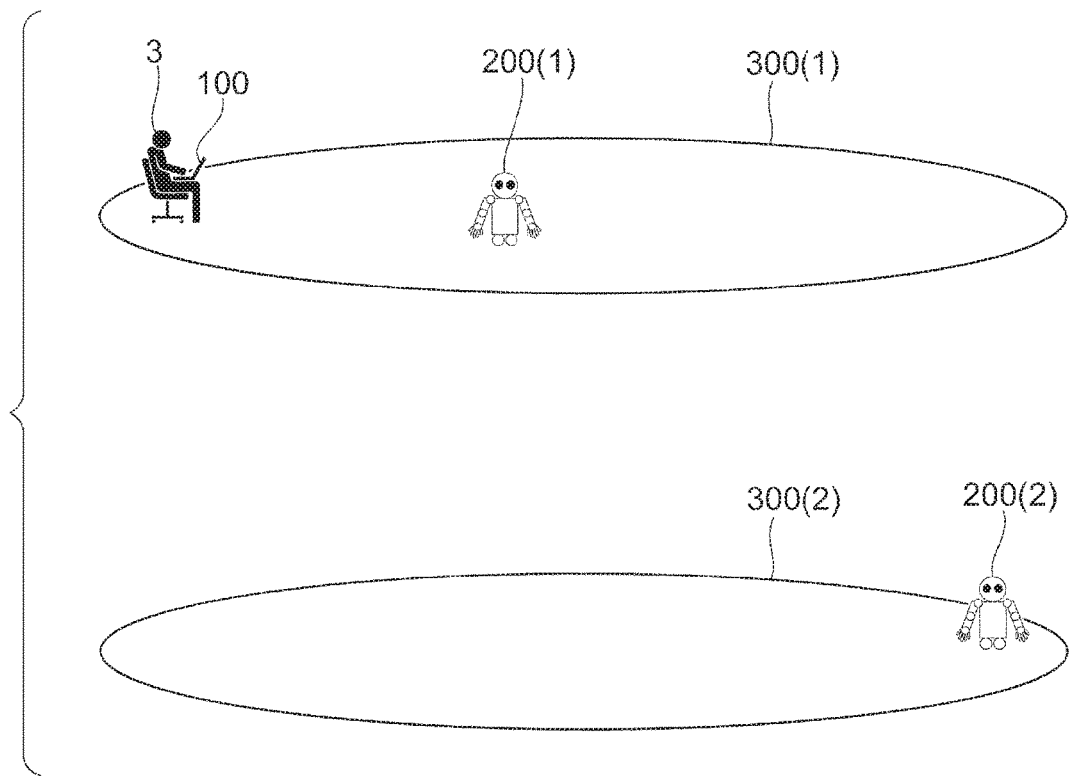
FIGS. 47A and 47B are illustrations explaining a display example when plural robots located in plural management areas are managed in a single display screen, FIG. 47A illustrating the positions of the robots in two management areas, FIG. 47B illustrating a display example of the display screen.
Figure 47B:
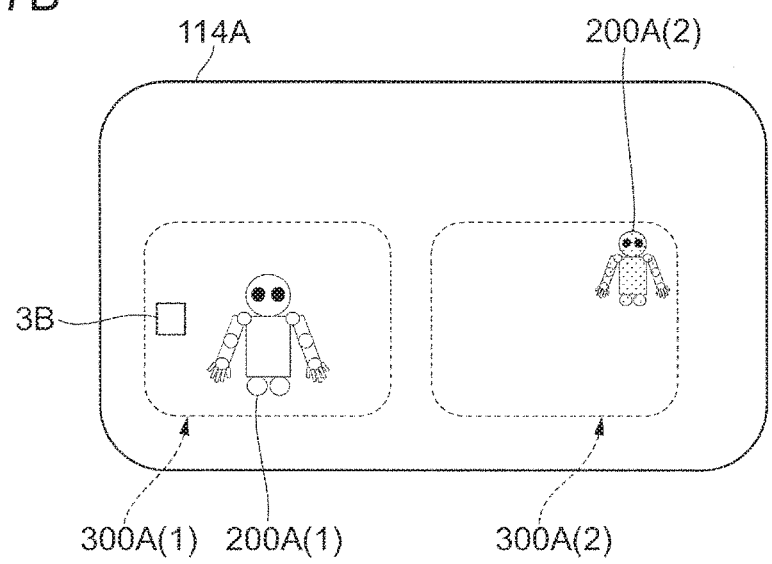

FIGS. 47A and 47B are illustrations explaining a display example when plural robots 200(1) and 200(2) located in plural management areas 300 are managed in a single display screen 114A, FIG. 47A illustrating the positions of the robots 200 in two management areas 300(1) and 300(2), FIG. 47B illustrating a display example of the display screen 114A. On the display screen 114A, two virtual management areas 300A(1) and 300A(2) corresponding to the two management areas 300(1) and 300(2) are displayed side by side. An image 200A(1) corresponding to the robot 200(1) is displayed with a large display size in the virtual management area 300A(1). An image 200A(2) corresponding to the robot 200(2) is displayed with a small display size in the virtual management area 300A(2).

Screen Example 10

Figure 48A:
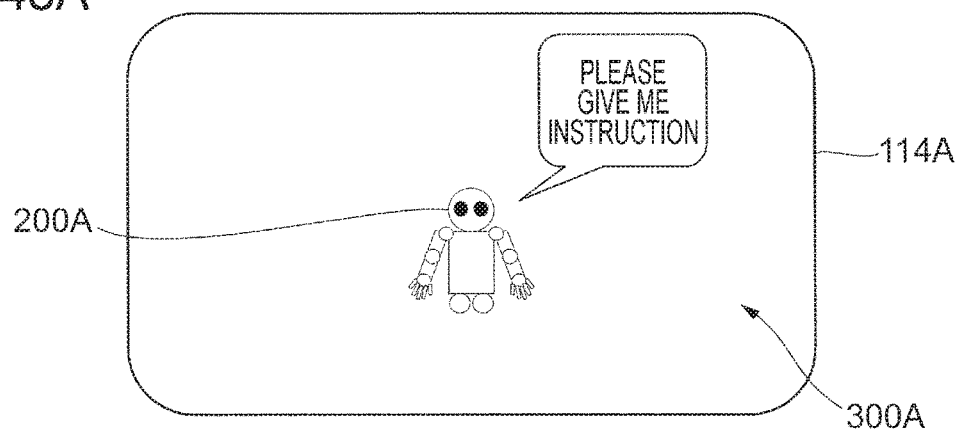
FIGS. 48A to 48C are illustrations explaining a display example when an instruction is given to the robot by using the display screen, FIG. 48A illustrating an example of an instruction request screen from the robot, FIG. 48B illustrating an input example of an instruction from the user, FIG. 48C illustrating an example of a response screen from the robot.
Figure 48B:
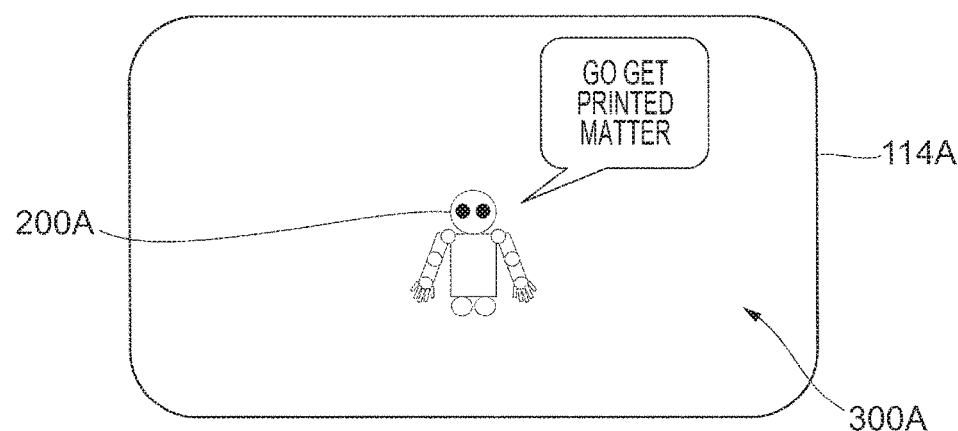
Figure 48C:
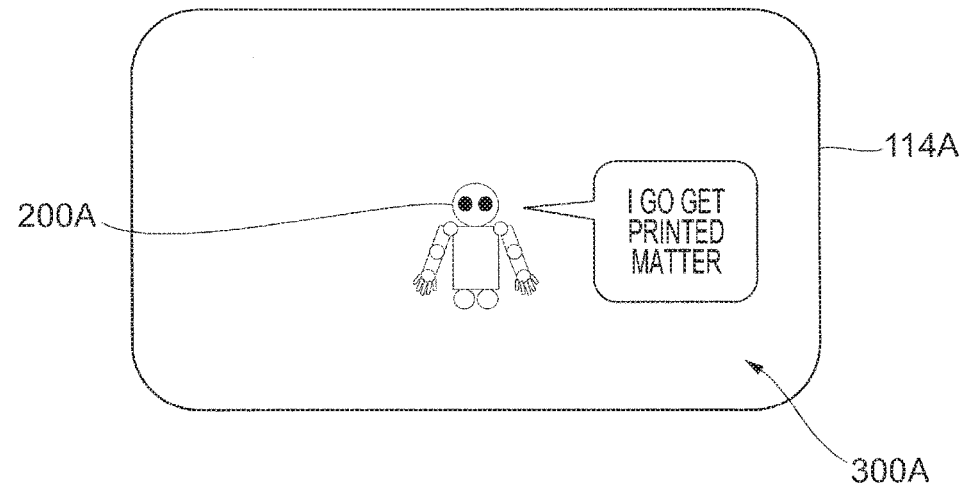

FIGS. 48A to 48C are illustrations explaining a display example when an instruction is given to the robot 200 by using the display screen 114A, FIG. 48A illustrating an example of an instruction request screen from the robot 200, FIG. 48B illustrating an input example of an instruction from the user, FIG. 48C illustrating an example of a response screen from the robot 200. For example, when a cursor is superposed on an image 200A associated with the robot 200 and a right click is made on the image 200A, an instruction request screen is displayed. FIGS. 48A to 48C illustrate an example in which the user 3 requests the robot 200 to deliver a printed matter.

Screen Example 11

Figure 49A:
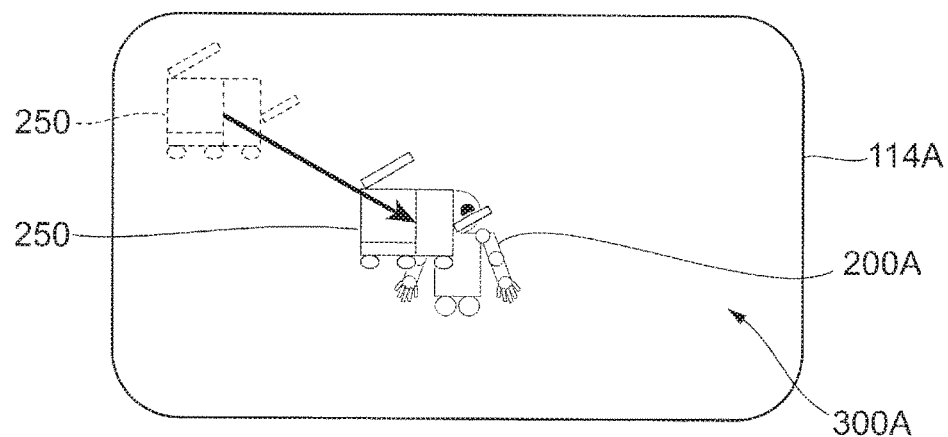
FIGS. 49A to 49C are illustrations explaining a display example of instructing the robot to execute a function by superposing an image indicative of a function to be executed by the robot on an image associated with the robot, FIG. 49A illustrating an execution instruction operation for the function to the robot, FIG. 49B illustrating an example of a response screen from the robot, FIG. 49C illustrating an operational motion of the robot.
Figure 49B:
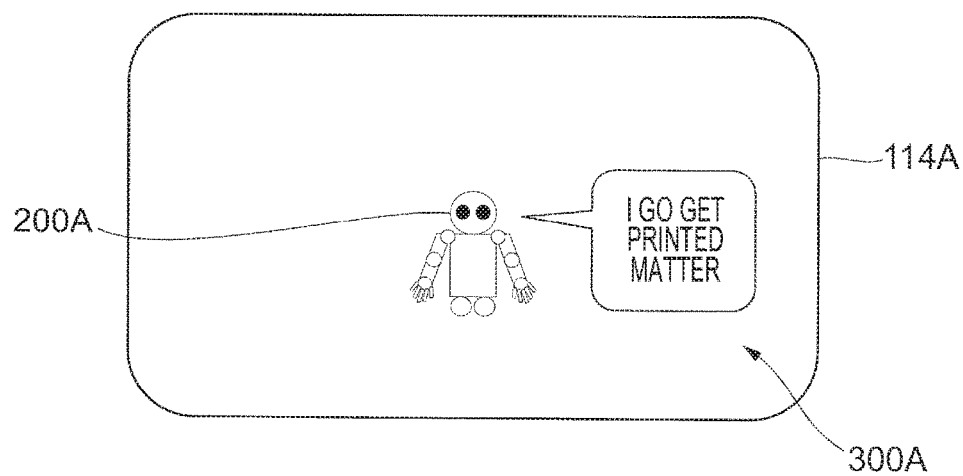
Figure 49C:
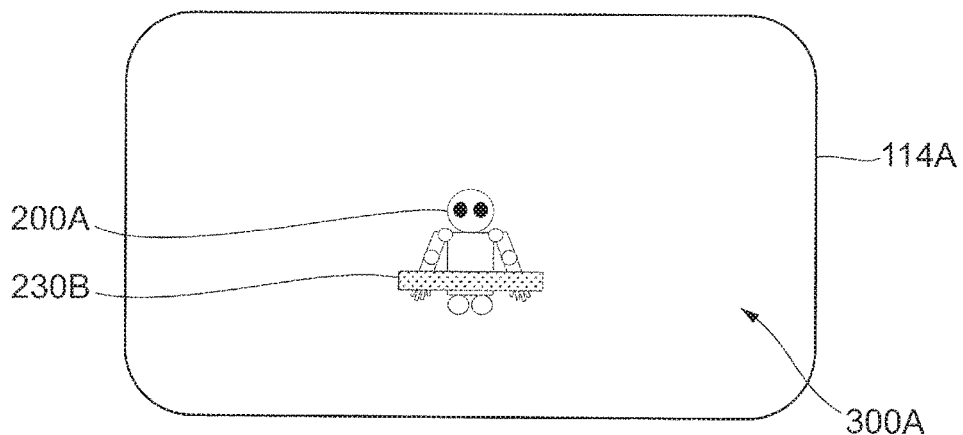

FIGS. 49A to 49C are illustrations explaining a display example of instructing the robot 200 to execute a function by superposing an image 250 indicative of a function to be executed by the robot 200 on an image 200A associated with the robot 200, FIG. 49A illustrating an execution instruction operation for the function to the robot 200, FIG. 49B illustrating an example of a response screen from the robot 200, FIG. 49C illustrating an operating state of the robot 200. FIGS. 49A to 49C illustrate an example in which the user 3 requests the robot 200 to deliver a printed matter. Referring to FIG. 49C, it is found that the image 200A associated with the robot 200 is holding and delivering a printed matter 230B.

Screen Example 12

Figure 50A:
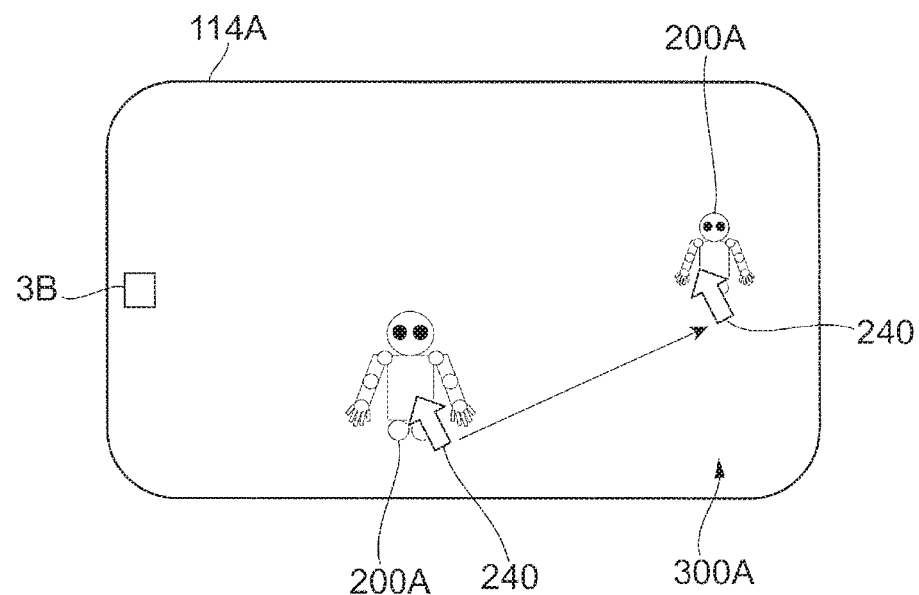
FIGS. 50A and 50B are illustrations explaining a state in which, if a moving operation of moving the position of the image associated with the robot on the display screen is made, the robot is actually moved in the management area, FIG. 50A illustrating a display example of the display screen, FIG. 50B illustrating the movement of the robot in the management area being the real space.
Figure 50B:
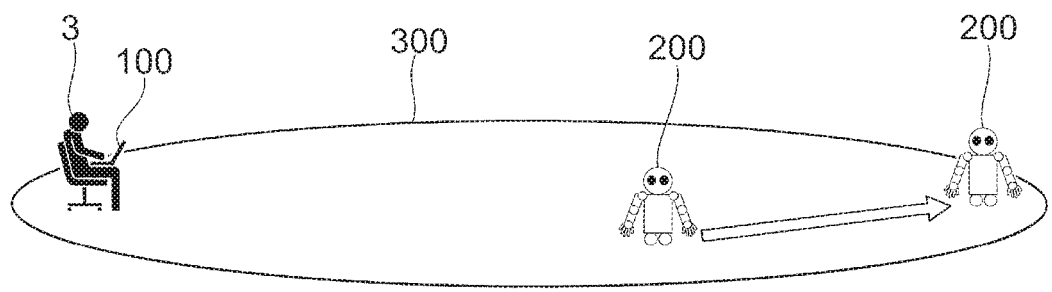

FIGS. 50A and 50B are illustrations explaining a state in which, if a moving operation of moving the position of an image 200A associated with the robot 200 on the display screen 114A is made, the robot 200 is actually moved in the management area 300, FIG. 50A illustrating a display example of the display screen 114A, FIG. 50B illustrating the movement of the robot 200 in the management area 300 being the real space. In the example in FIGS. 50A and 50B, by aligning a cursor 240 on the image 200A associated with the robot 200 and dragging and dropping the image 200A, a moving instruction is transmitted to the robot 200 in the real space. In the example in FIGS. 50A and 50B, the position of the image 200A moves away from the user 3 in the process of dragging, and hence the display size of the image 200A on the display screen 114A is decreased.

Screen Example 13

Figure 51A:
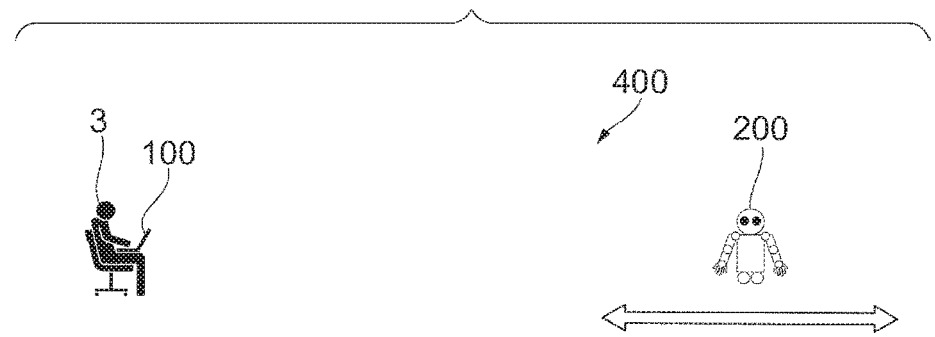
FIGS. 51A to 51C are illustrations explaining a state in which a change amount of an image in the virtual management area corresponding to a moving amount of the robot in the real space is changed in accordance with the shape of the virtual management area, FIG. 51A illustrating the moving amount of the robot in the real space, FIG. 51B illustrating the change amount of the image if the display area of the virtual management area is large, FIG. 51C illustrating the change amount of the image if the display area of the virtual management area is small.
Figure 51B:
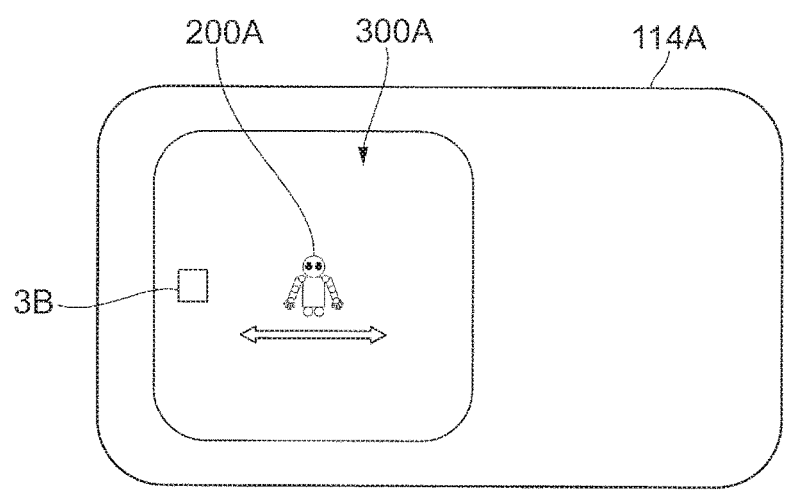
Figure 51C:
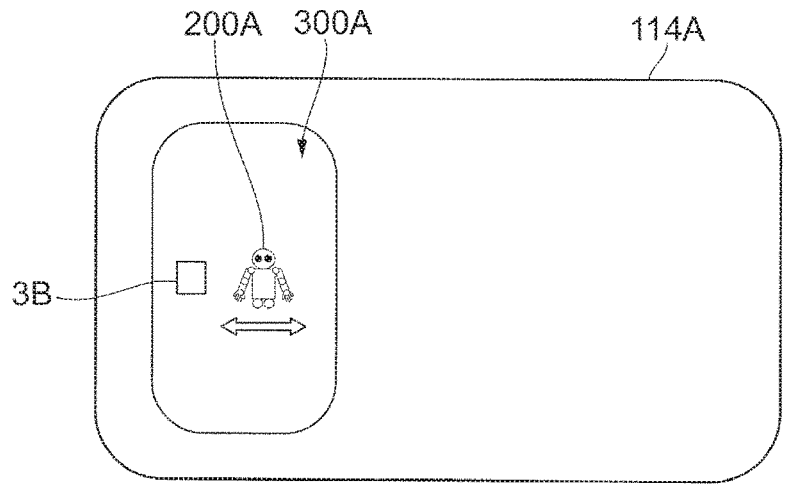

FIGS. 51A to 51C are illustrations explaining a state in which a change amount of an image 200A in the virtual management area 300A corresponding to a moving amount of the robot 200 in the real space 400 is changed in accordance with the shape of the virtual management area 300A, FIG. 51A illustrating the moving amount of the robot 200 in the real space 400, FIG. 51B illustrating the change amount of the image 200A if the display area of the virtual management area 300A is large, FIG. 51C illustrating the change amount of the image 200A if the display area of the virtual management area 300A is small. Each arrow in the figures represents the change amount in the real space 400 or the virtual management area 300A. In the case of FIGS. 51A to 51C, the display size of the image 200A associated with the robot 200 is the same irrespective of the difference in the virtual management area 300A, and only the change amount of the image 200A is changed.

In FIGS. 51A to 51C, since the management area 300 is not set in the real space 400, the virtual management area 300A in FIGS. 51A to 51C corresponds to a peripheral region of the robot 200. The virtual management area 300A in this case is an example of a display region to be used for the position indication of the robot 200. If the management area 300 is not set, the management area information acquiring unit 1104 (see FIG. 10) may acquire map information and layout information about the periphery of the point at which the robot 200 is actually present, from a database or the like. Even in this case, the position indication of the robot 200 is changed in accordance with the shape of the virtual management area 300A in the display screen 114A. Hence the user may easily grasp the position of the movable object.

Screen Example 14

Figure 52A:
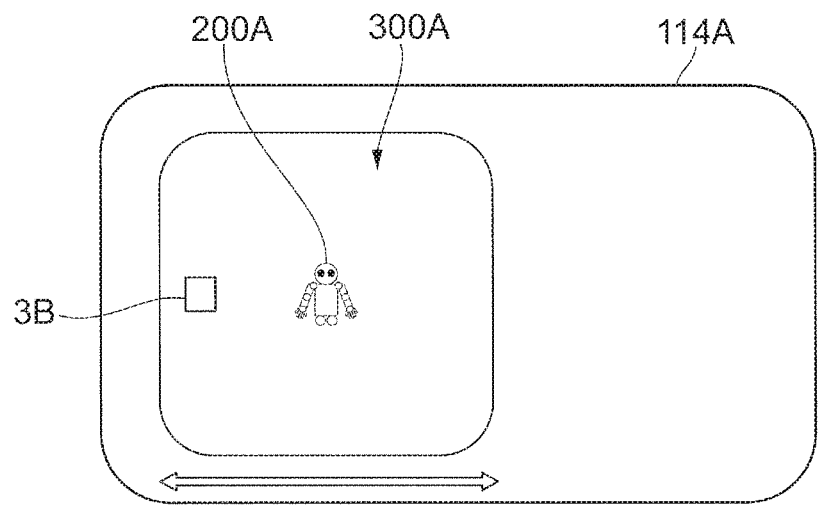
FIGS. 52A and 52B are illustrations explaining that the change range of an image is restricted in accordance with the display size of the virtual management area, FIG. 52A illustrating the change range of the image when the display size of the virtual management area is large, FIG. 52B illustrating the change range of the image when the display size of the virtual management area is small.
Figure 52B:
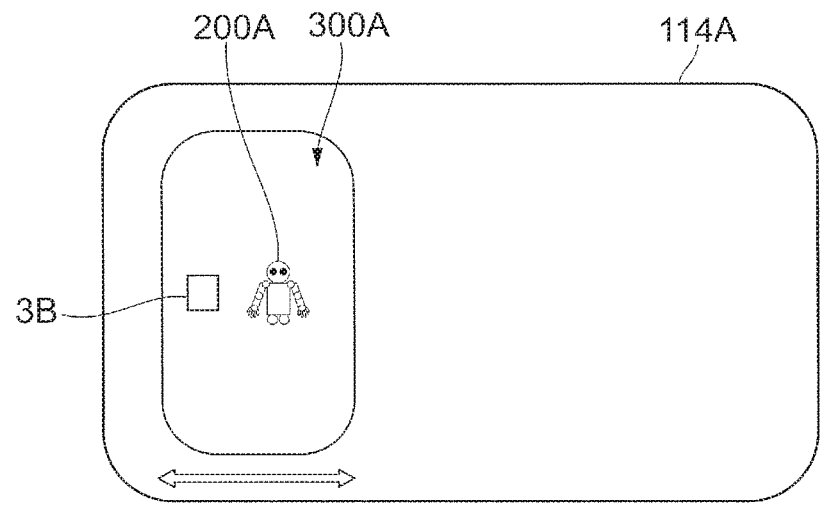

FIGS. 52A and 52B are illustrations explaining that the change range of the image 200A is restricted in accordance with the display size of the virtual management area 300A, FIG. 52A illustrating the change range of the image 200A when the display size of the virtual management area 300A is large, FIG. 52B illustrating the change range of the image 200A when the display size of the virtual management area 300A is small. In the case of FIGS. 52A and 52B, the range in which the image 200A is movable in the left-right direction on the display screen 114A is larger in FIG. 52A than that in FIG. 52B. In this way, the movable range of the image 200A on the display screen 114A is restricted by the display size of the virtual management area 300A. The change range of the display size of the image 200A may be restricted by the display size of the virtual management area 300A.

OTHER EXEMPLARY EMBODIMENTS

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display controller configured to, when position information on a movable object changes, change a display size of an image associated with the movable object and display the image on a display screen,
wherein the display controller is further configured to display a virtual management area on the display screen, virtual management area corresponding to a shape of a physical management area of the movable object, and
wherein, in response to the shape of the physical management area being different from a shape of the display screen, the display controller is further configured to determine the virtual management area by non-linearly deforming the shape of the virtual management area such that an entirety of the physical management area is displayed on the display screen.

2. The information processing apparatus according to claim 1, wherein the display controller is further configured to express a direction of a change in distance of the movable object by a direction of the image.

3. The information processing apparatus according to claim 1, wherein an area determined for management of the movable object is determined with reference to a predetermined object.

4. The information processing apparatus according to claim 1, wherein the display controller is further configured to change the display size of the image associated with the movable object, in accordance with a distance of the movable object with respect to a predetermined object.

5. The information processing apparatus according to claim 4, wherein the display controller is further configured to increase the display size of the image associated with the movable object if the movable object moves toward the object, and the display controller is further configured to decrease the display size of the image associated with the movable object if the movable object moves away from the object.

6. The information processing apparatus according to claim 1, wherein the display controller is further configured to change the display size of the image associated with the movable object, in accordance with a distance from a center of an area determined for management of the movable object to the movable object.

7. The information processing apparatus according to claim 6, wherein the display controller is further configured to change the display size of the image associated with the movable object if the distance exceeds a threshold.

8. The information processing apparatus according to claim 1, wherein the display controller is further configured to delete the image associated with the movable object from a display region in response to a determination that the movable object has moved to a position be fond the physical management area.

9. The information processing apparatus according to claim 8, wherein the display controller is further configured to display again the image associated with the movable object in the display region in response to a determination that the movable object has returned to a position within the physical management area.

10. The information processing apparatus according to claim 1, wherein the display controller is further configured to display a distance indicated by the display size of the image associated with the movable object.

11. The information processing apparatus according to claim 1, wherein the display controller is further configured to display region information indicative of a position of the movable object, together with the image associated with the movable object.

12. The information processing apparatus according to claim 1, wherein the display controller is further configured to move a display position of the image associated with the movable object so that the image does not overlap another work region displayed on the display screen simultaneously with the moved image associated with the movable object.

13. The information processing apparatus according to claim 12, wherein the display controller is further configured to move the display position of the image associated with the movable object over a boundary between the display screen and a non-display virtual space.

14. The information processing apparatus according to claim 12, wherein the display controller is further configured to move the display position of the image associated with the movable object from the display screen to a non-display virtual space.

15. The information processing apparatus according to claim 1, wherein the movable object includes a self-propelled mechanism.

16. The information processing apparatus according to claim 15, wherein the image associated with the movable object is changed in accordance with an operating state of the movable object.

17. The information processing apparatus according to claim 15, wherein the display controller is configured to provide an indication of a request of help for the movable object.

18. The information processing apparatus according to claim 1, wherein, when another image associated with a function to be executed is superposed on the image associated with the movable object, an execution instruction for the function is transmitted to the movable object.

19. The information processing apparatus according to claim 1, wherein the movable object includes a plurality of movable objects.

20. The information processing apparatus according to claim 1, wherein the movable object includes an unfixed mechanism without a stationary base.

21. The information processing apparatus according to claim 1, wherein the image associated with the movable object represents the movable object in the virtual management area.

22. The information processing apparatus according to claim 1, wherein every location in the virtual management area corresponds to a location in the physical management area, and every location in the physical management area corresponds to a location in the virtual management area.

23. The information processing apparatus according to claim 22, wherein the display controller is further configured to determine the virtual management area by compressing a first portion of the virtual management area that protrudes beyond an edge of the display screen and by extending a second portion of the virtual management area that does not extend to an edge of the display screen.

24. The information processing apparatus according to claim 22, wherein, in response to another work region appearing on the display screen, the another work region overlapping the virtual management area, the display controller is further configured to determine the virtual management area such that the virtual management area does not overlap the another work region.

25. The information processing apparatus according to claim 1, wherein a position of the image associated with the movable object on the display screen is independent of a position of the display screen.

26. An information processing system comprising:
   at least one movable object; and
   an information processing apparatus configured to, when position information on the movable object is changed, change a display size of an image associated with the movable object and display the image on a display screen,
   wherein the information processing apparatus is further configured to display a virtual management area on the display screen, a shape of the virtual management area corresponding to a shape of a physical management area of the movable object, and
   wherein, in response to the shape of the physical management area being different from a shape of the display screen, the information processing apparatus is further configured to determine the virtual management area by non-linearly deforming the shape of the virtual management area such that an entirety of the physical management area is displayed on the display screen.

27. A non-transitory computer readable medium storing a program causing a computer to execute a process for information processing, the process comprising:
   displaying a display region to be used for a position indication of a movable object on a display screen;
   when position information on the movable object is changed, changing a display size of an image associated with the movable object and displaying the image on the display screen; and
   displaying a virtual management area on the display screen, a shape of the virtual management area corresponding to a shape of physical management area of the movable object,
   determining, in response to the shape of the physical management area being different from a shape of the display screen, the virtual management area by non-linearly deforming the shape of the virtual management area such that an entirety of the physical management area is displayed on the display screen.

* * * * *